(12) United States Patent  
Garrison et al.

(10) Patent No.: US 7,679,550 B2  
(45) Date of Patent: Mar. 16, 2010

(54) SYSTEM AND METHOD FOR MODEL-BASE COMPRESSION OF GPS EPHEMERIS

(76) Inventors: James L. Garrison, 640-A Ferry St., Lafayette, IN (US) 47901; Brenda E. Eichel, 3729 Fountain St., Pittsburgh, PA (US) 15234

( * ) Notice: Subject to any disclaimer, the term of this patent is extended or adjusted under 35 U.S.C. 154(b) by 0 days.

(21) Appl. No.: 11/709,309

(22) Filed: Feb. 21, 2007

(65) Prior Publication Data

US 2007/0273581 A1    Nov. 29, 2007

Related U.S. Application Data

(60) Provisional application No. 60/775,044, filed on Feb. 21, 2006.

(51) Int. Cl.  
*G01S 1/02* (2006.01)

(52) U.S. Cl. .................. 342/357.01; 342/352

(58) Field of Classification Search ........... 342/352, 342/357.01, 357.06, 357.09, 357.1; 701/207, 701/213, 226  
See application file for complete search history.

(56) References Cited

U.S. PATENT DOCUMENTS

| | | | | |
|---|---|---|---|---|
| 4,445,118 A | * | 4/1984 | Taylor et al. | 342/357.09 |
| 5,390,124 A | * | 2/1995 | Kyrtsos | 701/215 |
| 6,211,819 B1 | * | 4/2001 | King et al. | 342/357.09 |
| 6,411,892 B1 | | 6/2002 | van Diggelen | |
| 6,542,820 B2 | | 4/2003 | LaMance et al. | |
| 6,560,534 B2 | | 5/2003 | Abraham et al. | |

* cited by examiner

*Primary Examiner*—Dao L Phan  
(74) *Attorney, Agent, or Firm*—Maginot, Moore & Beck

(57) ABSTRACT

A method for propagating ephemeris data for a satellite in Earth orbit is provided. The method includes the steps of receiving orbital positional data for a first time period of a satellite's Earth orbit, propagating orbital positional data for the satellite's Earth orbit during a second time period extending beyond the first time period, fitting a Keplerian ephemeris model to the propagated orbital positional data to estimate model coefficients, and sending the estimated model coefficients to receivers for determination of receiver position at a time during the second time period.

22 Claims, 43 Drawing Sheets

```
                    ┌─300
                    ▼
┌─────────────────────────────────────────────────┐ ┌─302
│ receiving orbital positional data for a first    │
│ time period of a satellite's earth orbit         │
└─────────────────────────────────────────────────┘
                    │
                    ▼                               ┌─304
┌─────────────────────────────────────────────────┐
│ propagating orbital positional data for the      │
│ satellite's earth orbit during a second time     │
│ period extending beyond the first time period    │
└─────────────────────────────────────────────────┘
                    │
                    ▼                               ┌─306
┌─────────────────────────────────────────────────┐
│ fitting a Keplerian ephemeris model to the       │
│ propagated orbital positional data to estimate   │
│ model coefficients                               │
└─────────────────────────────────────────────────┘
                    │
                    ▼                               ┌─308
┌─────────────────────────────────────────────────┐
│ sending the estimated model coefficients to      │
│ receivers for determination of receiver position │
│ at a time during the second time period          │
└─────────────────────────────────────────────────┘
```

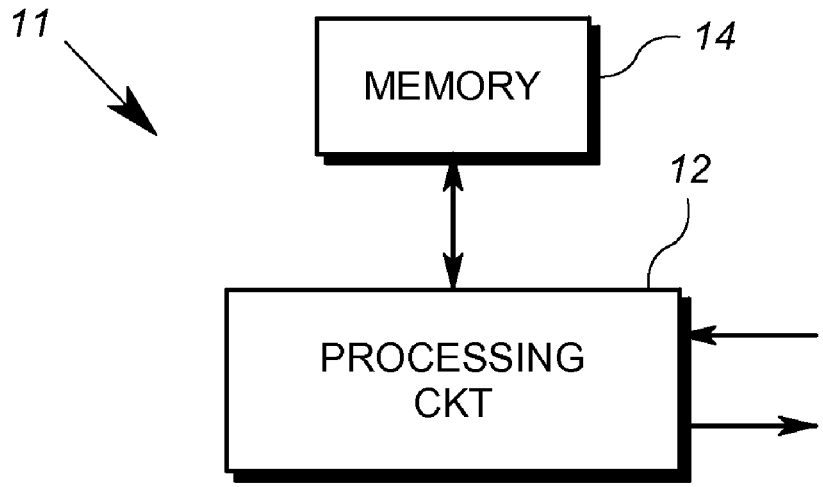
Figure 1.
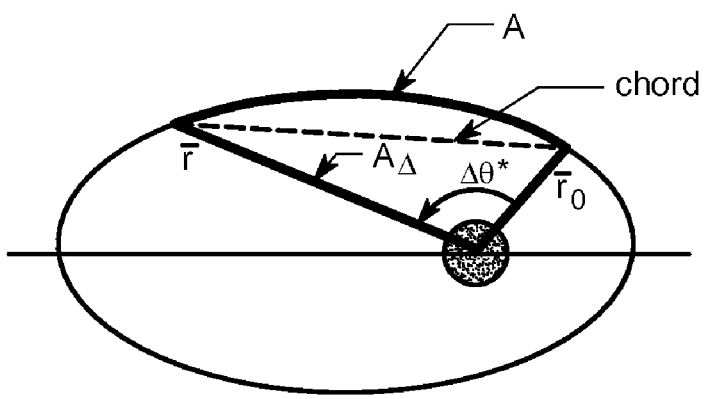
Figure 2.1. Orbit geometry for Lumbert's Problem. The satellite velocities at two orbit positions, r_O and r are found brom two body orbit dynamics.

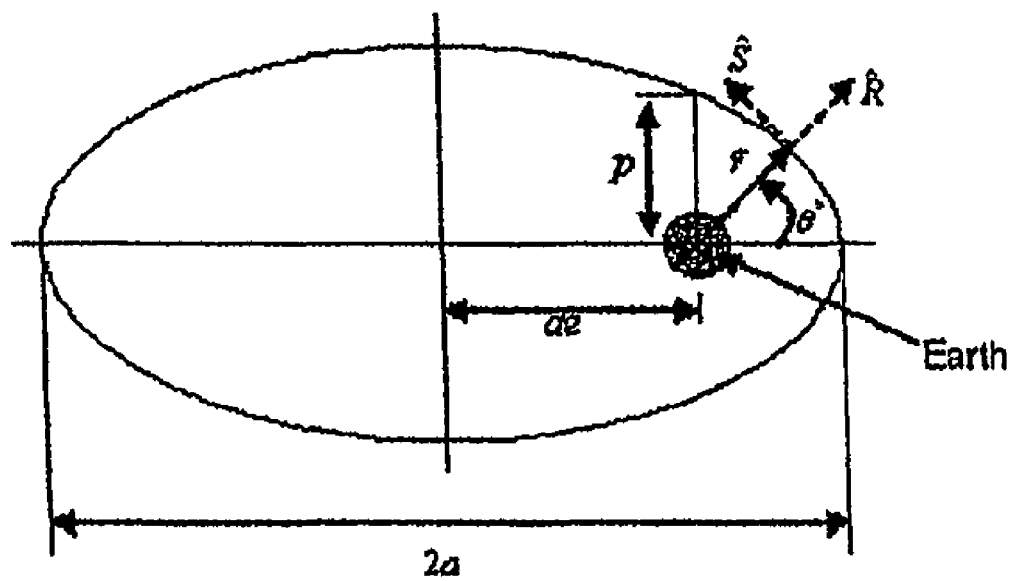
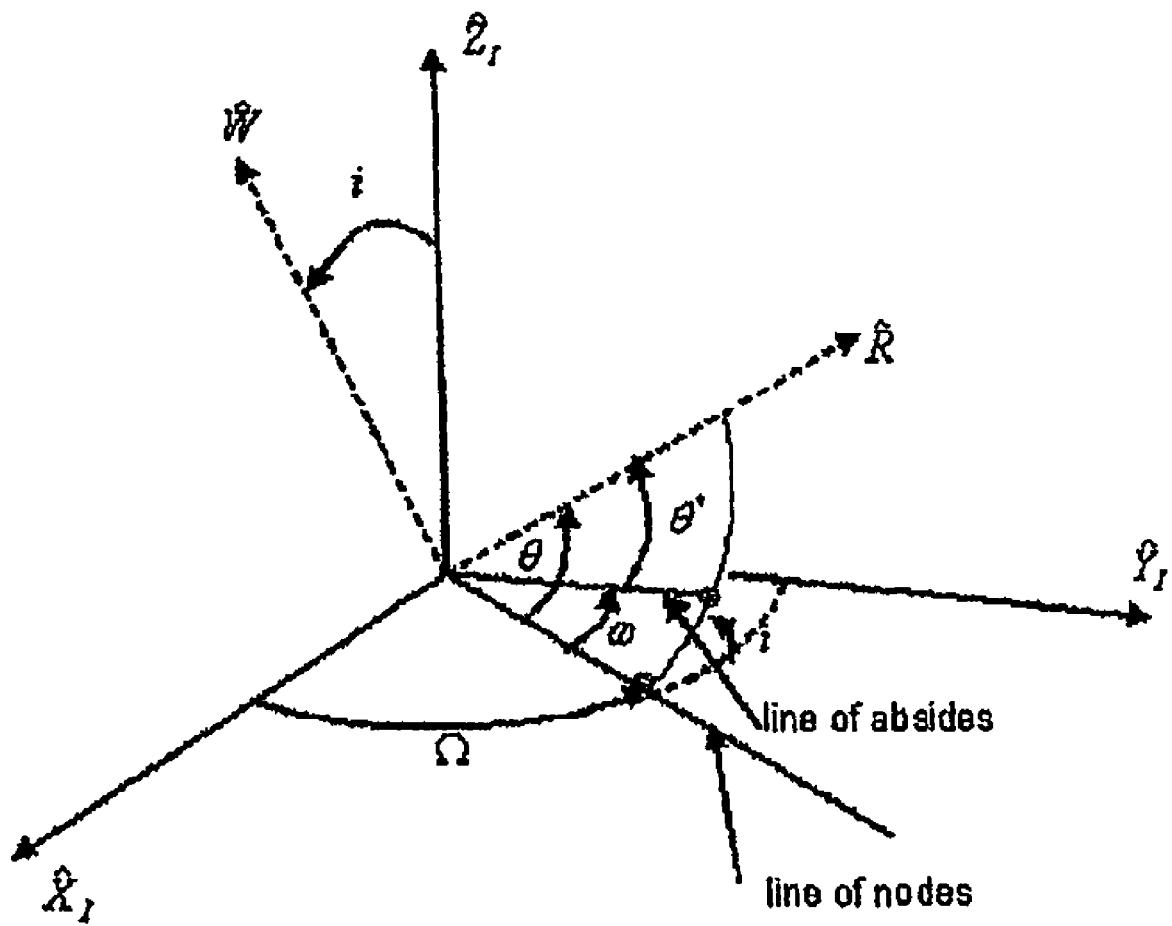
Figure 2.2. Satellite Geometry

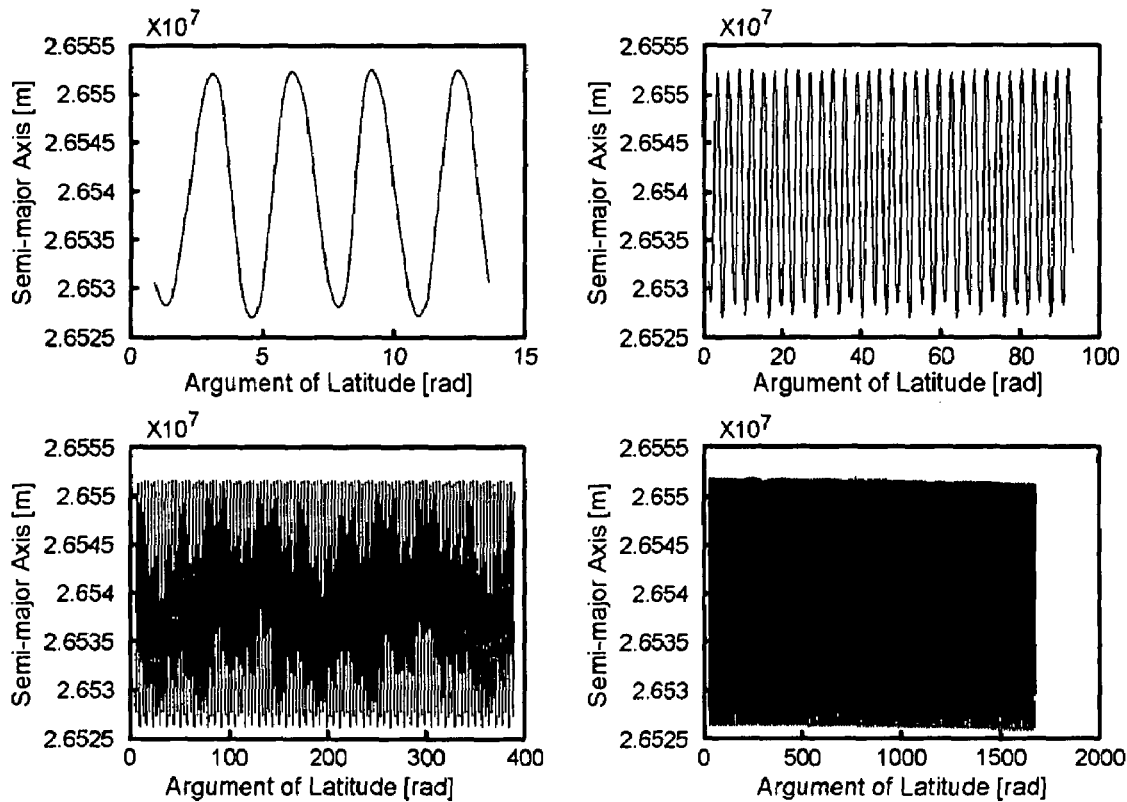
Figure 2.3. Osculating Semi-Major Axis: For 1 day, 1 week, 1 month, and 6 months
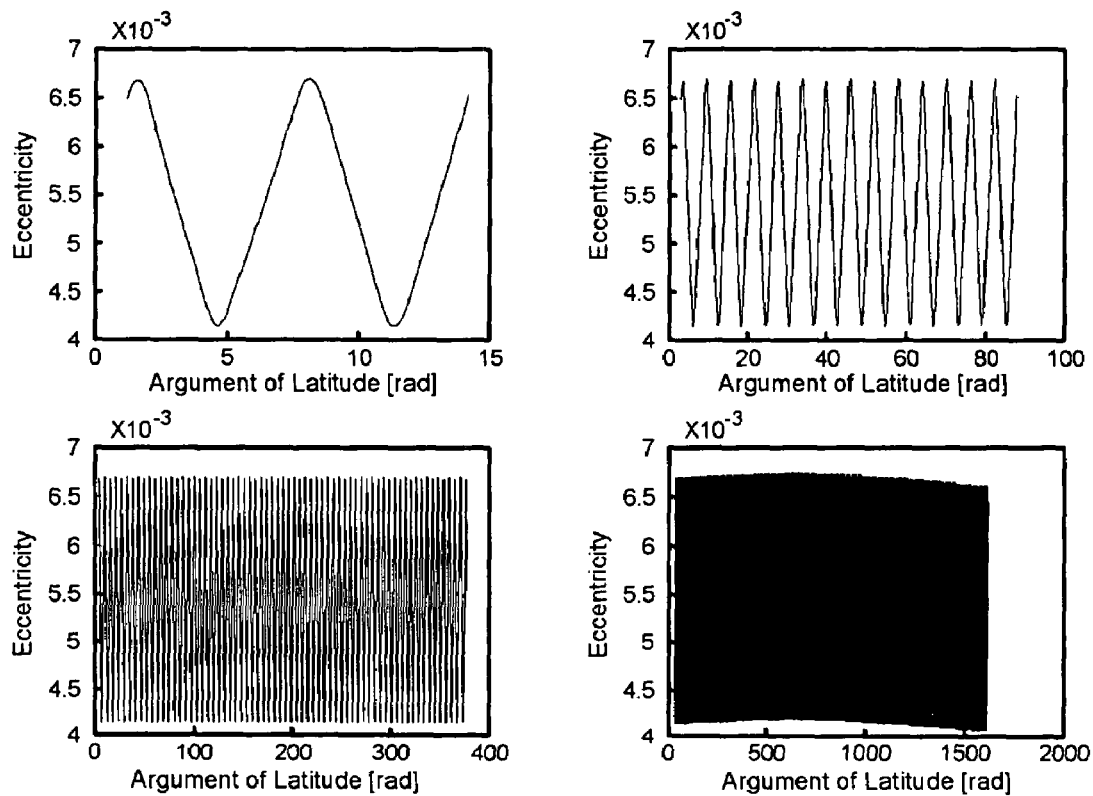
Figure 2.4. Osculating Eccentricity: For 1 day, 1 week, 1 month, and 6 months

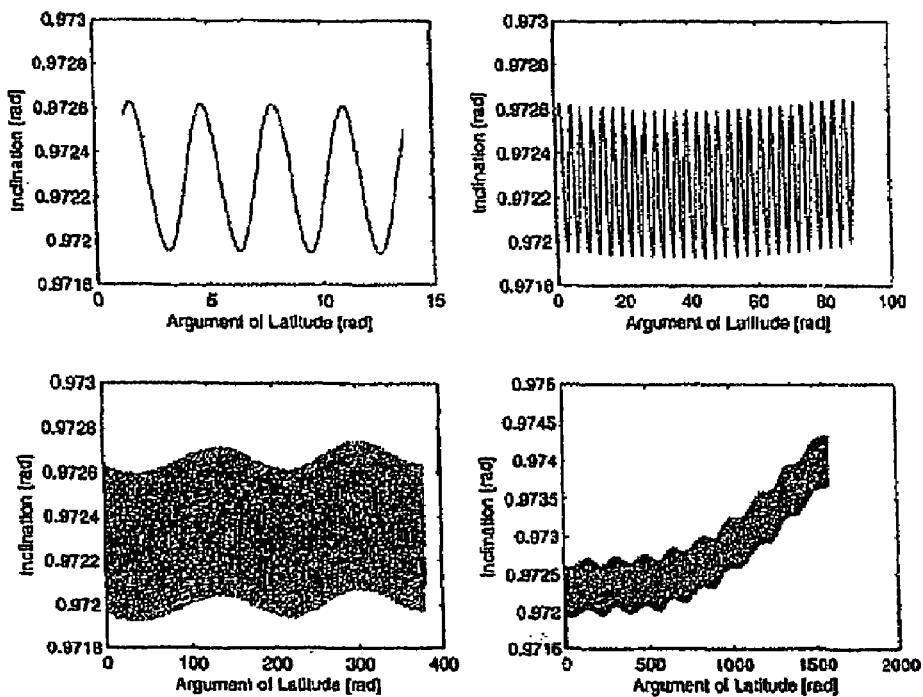
Figure 2.5. Osculating Inclination:For 1 day, 1 week, 1 month, and 6 months
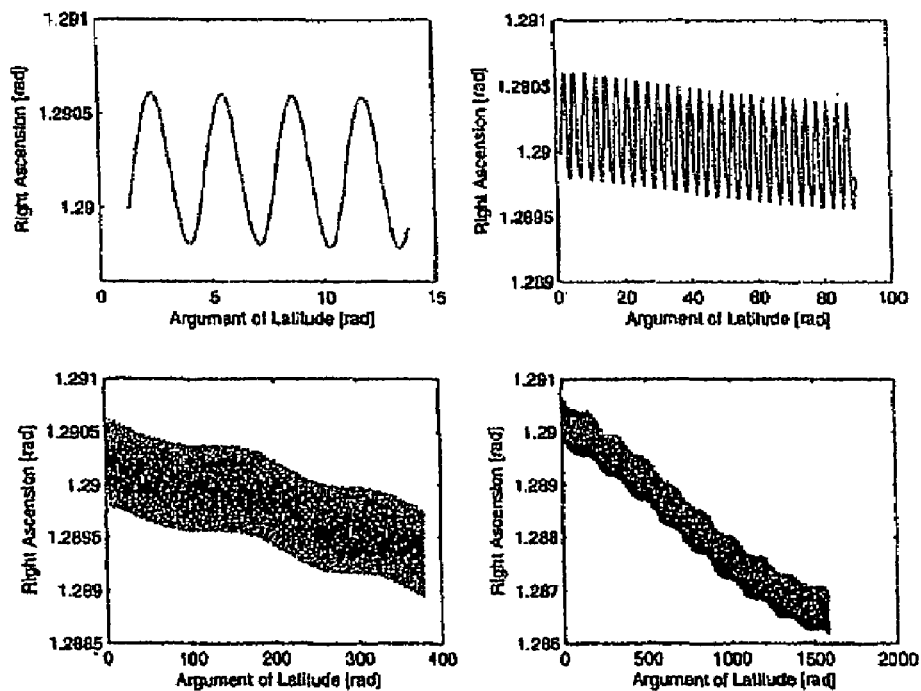
Figure 2.6. Osculating Right Ascension with J2 Secular Trend Removed:For 1 day, 1 week, 1 month, and 6 months

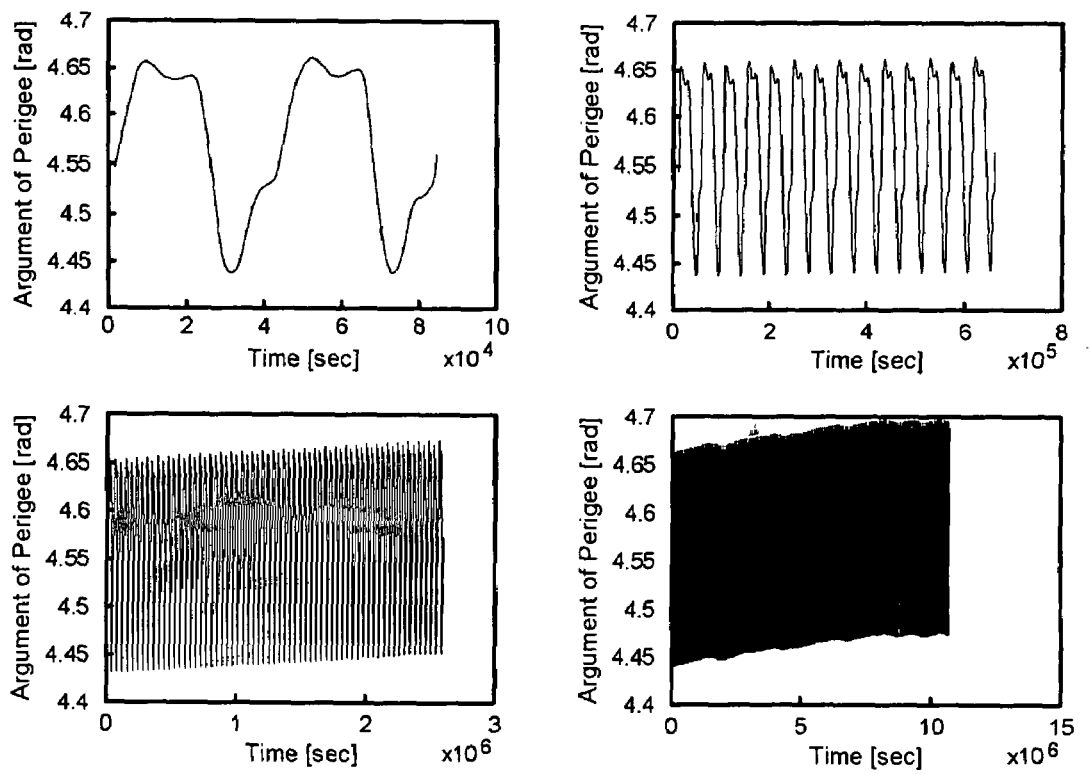
Figure 2.7. Osculating Argument of Perigee: For 1 day, 1 week, 1 month and 6 months
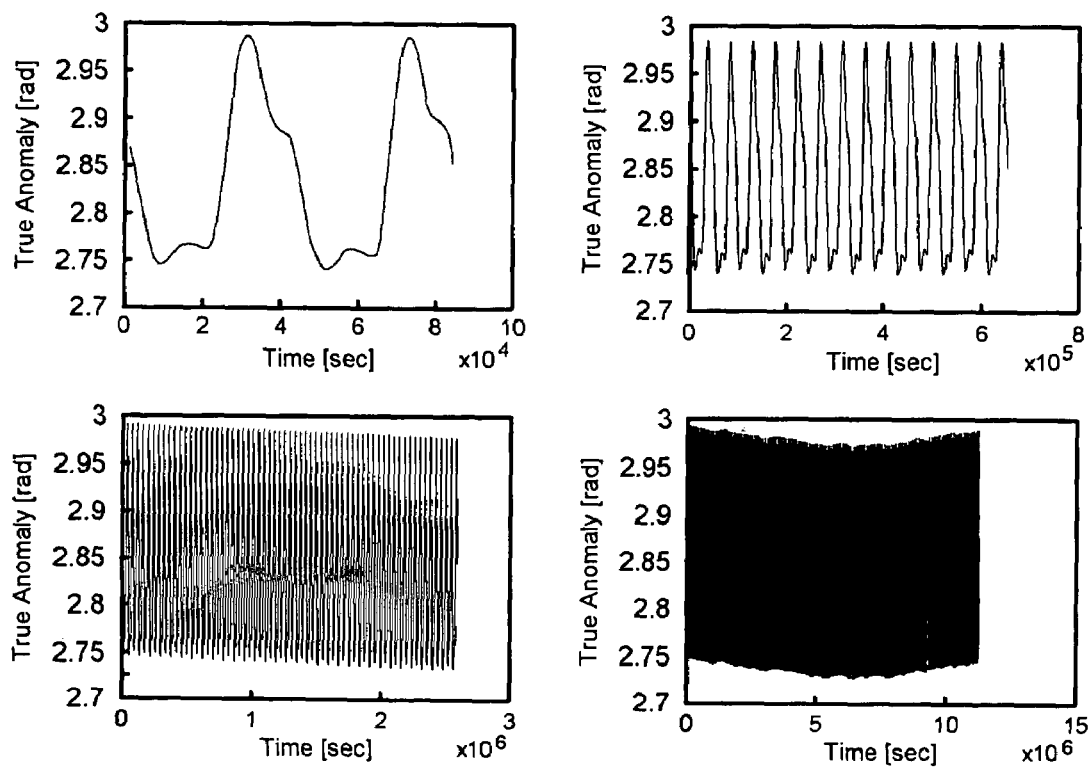
Figure 2.8. Osculating True Anomaly with J2 Secular Trend Removed:
For 1 day, 1 week, 1 month, and 6 months

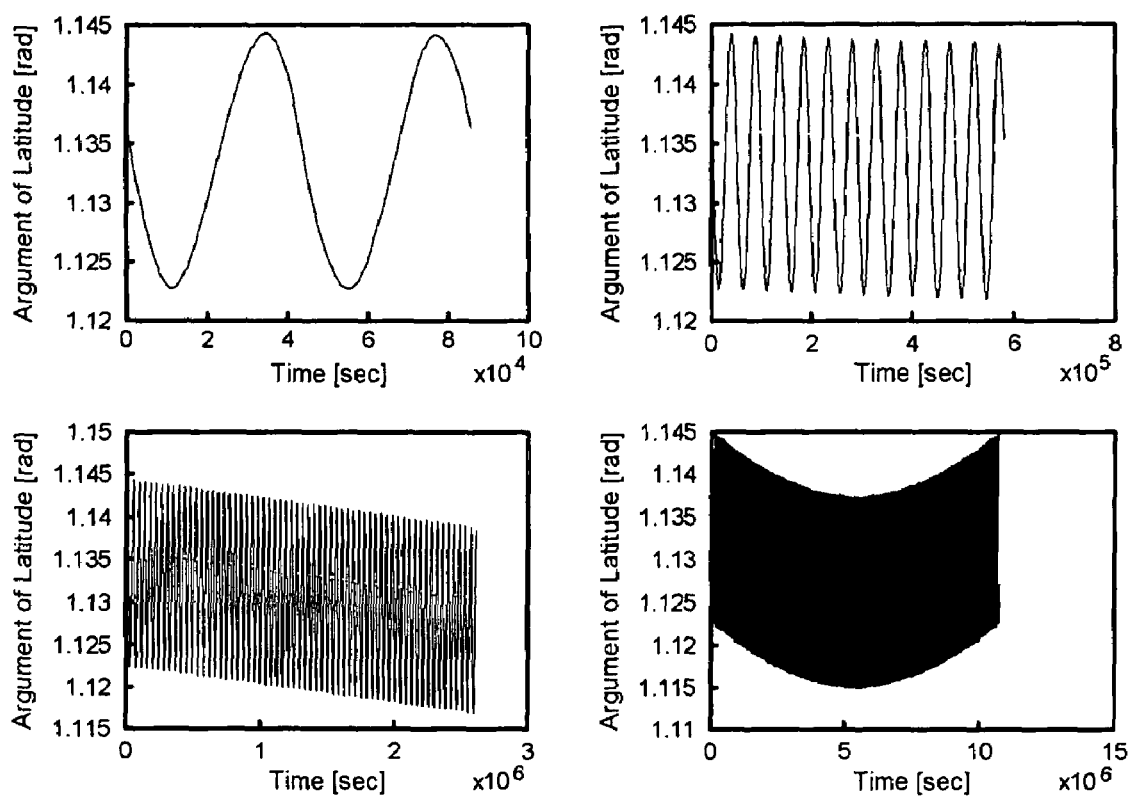
Figure 2.9 Osculating Argument of Latitude with J2 Secular Trend Removed:
For 1 day, 1 week, 1 month, and 6 months

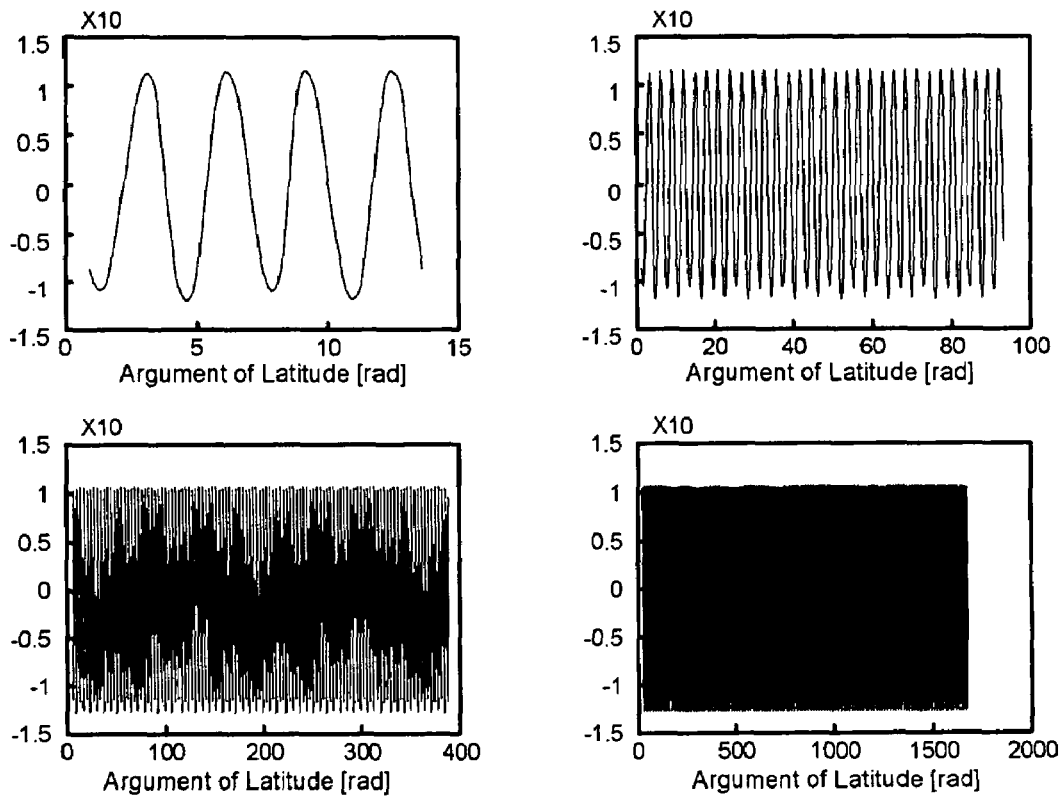
Figure 3.1. Detrended Semi-Major Axis
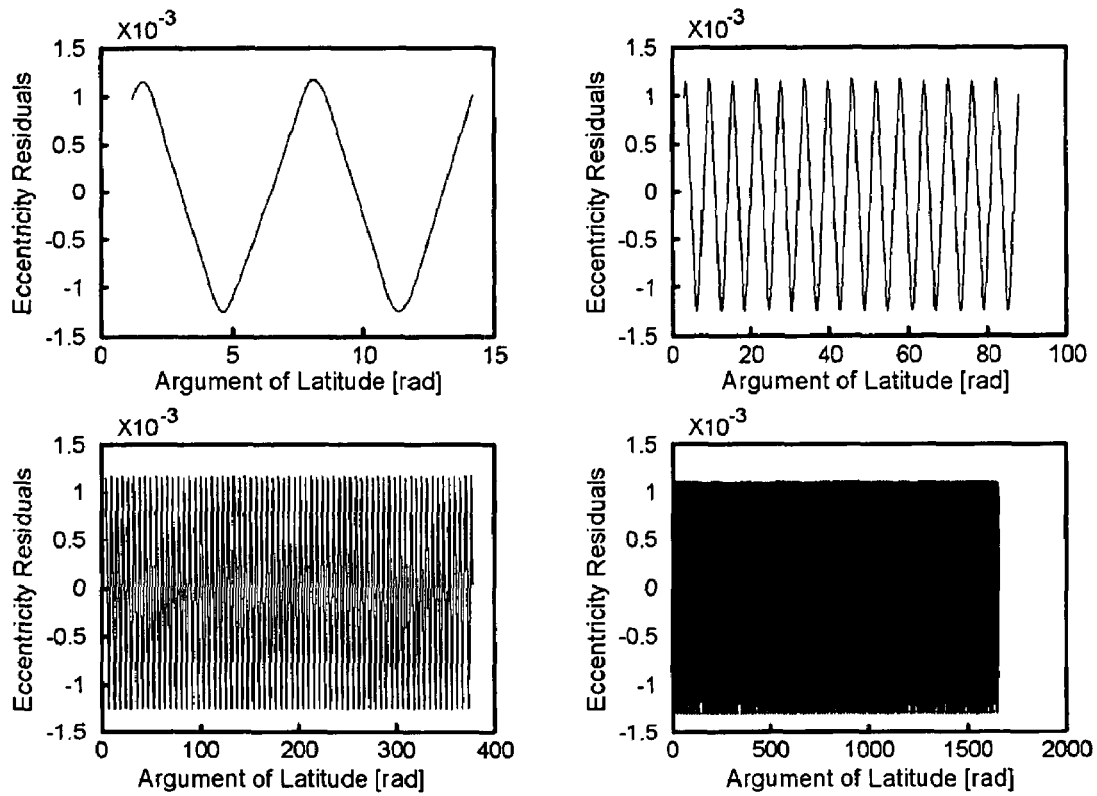
Figure 3.2. Detrended Eccentricity

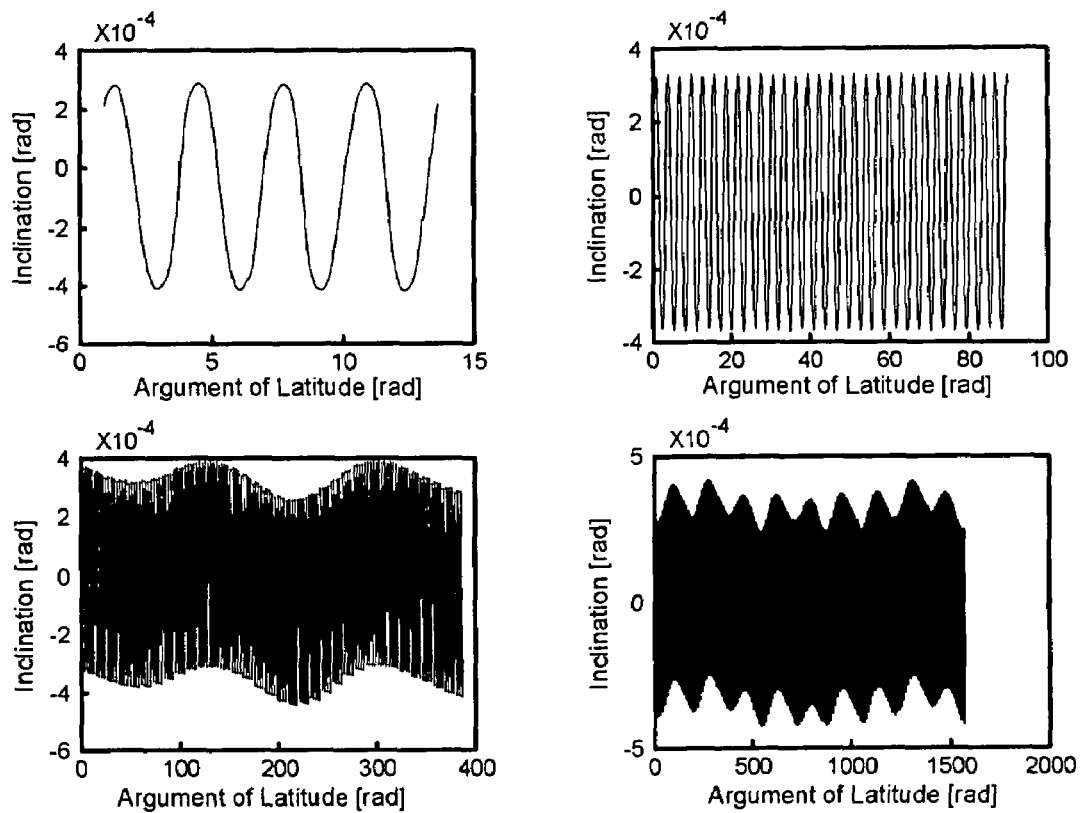
Figure 3.3. Detrended Inclination
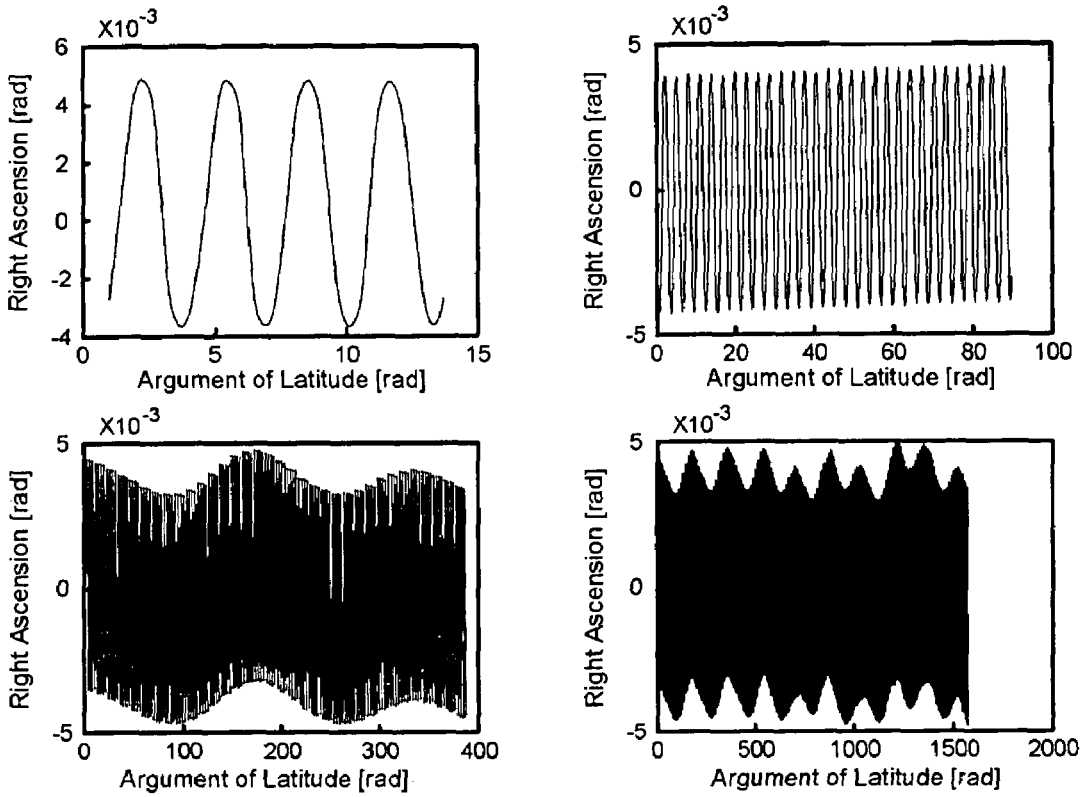
Figure 3.4. Detrended Right Ascension

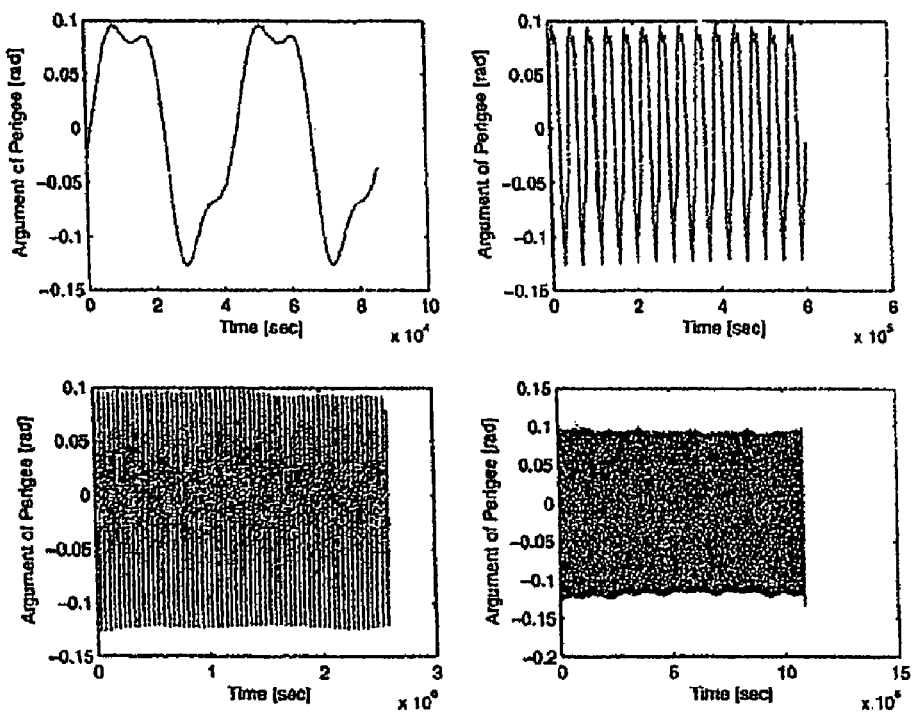
Figure 3.5. Detrended Argument of Perigee
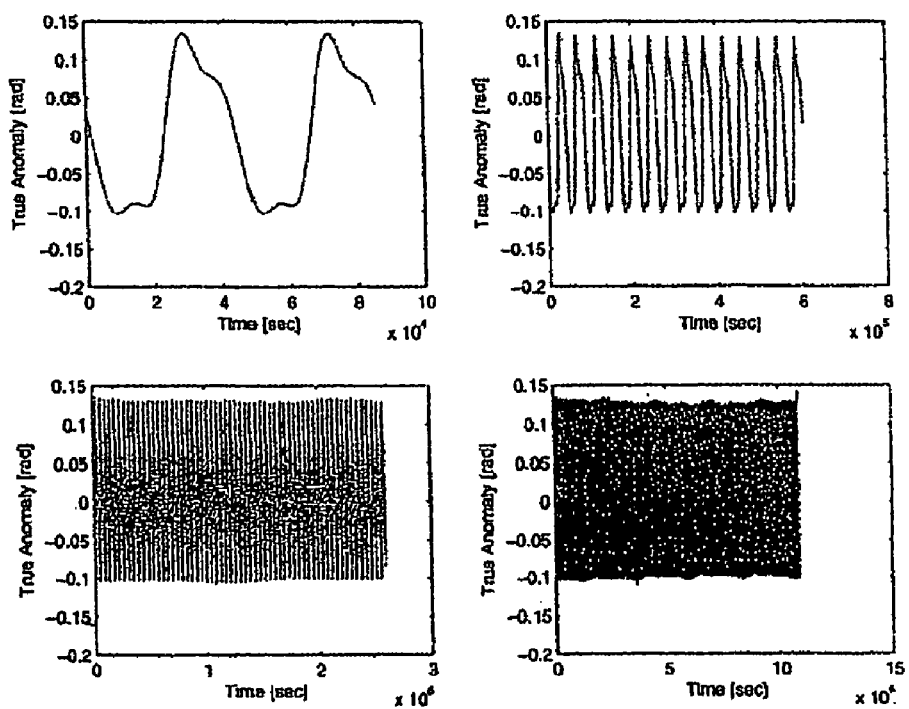
Figure 3.6. Detrended True Anomaly

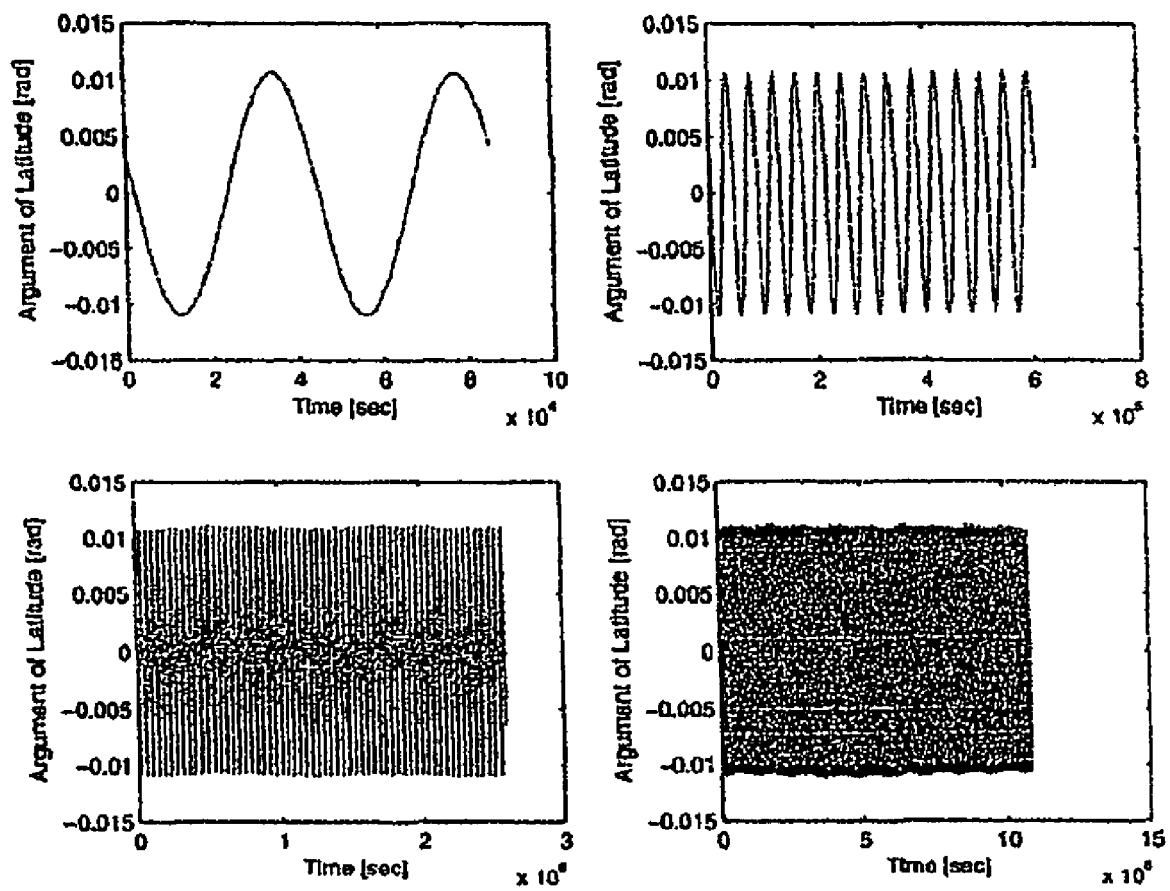
Figure 3.7. Detrended Argument of Latitude

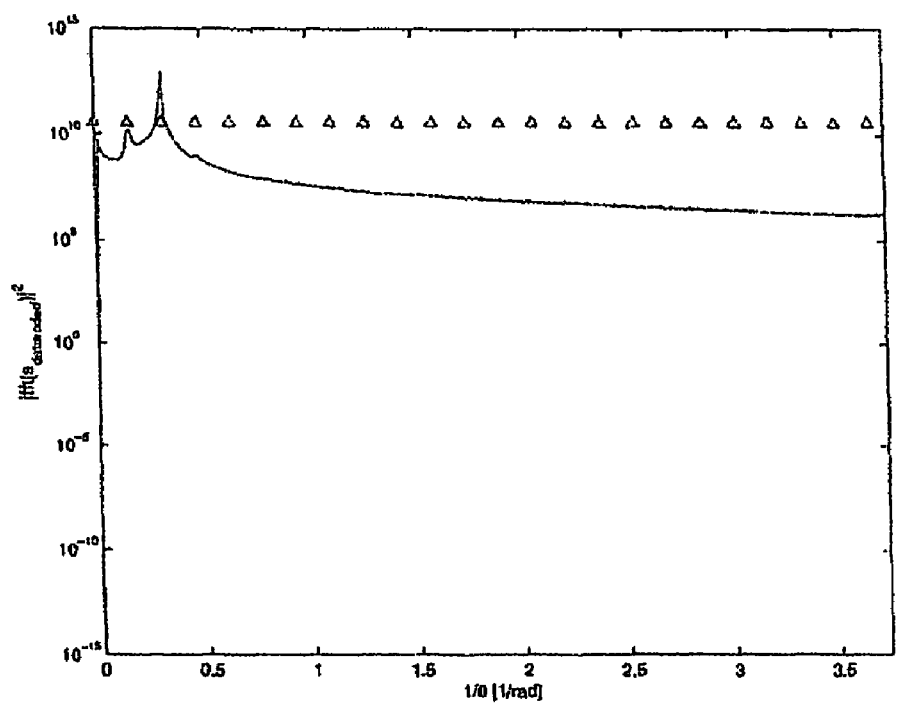
Figure 3.8. FFT of Detrended Semi-Major Axis
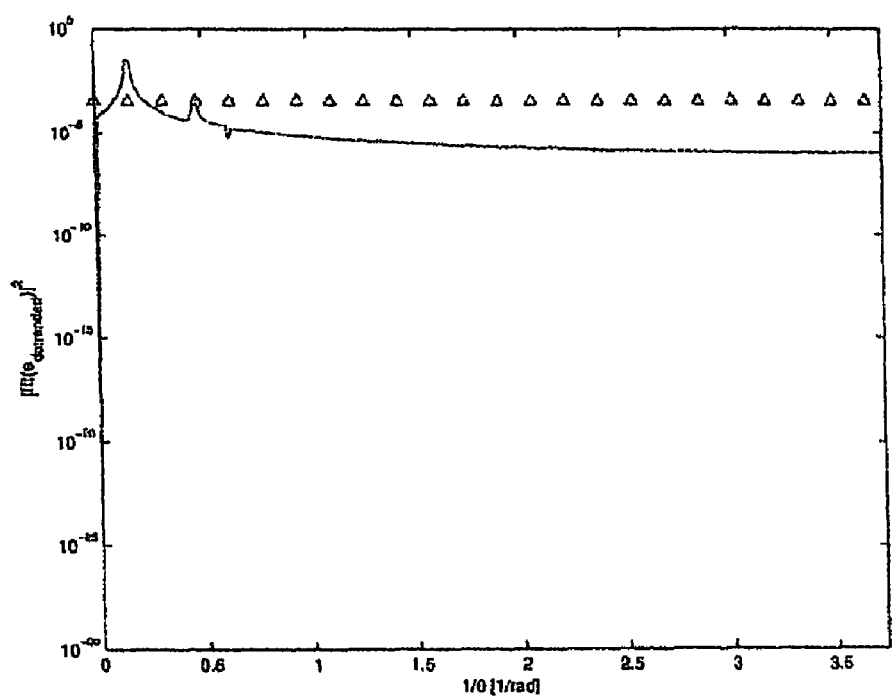
Figure 3.9. FFT of Detrended Eccentricity

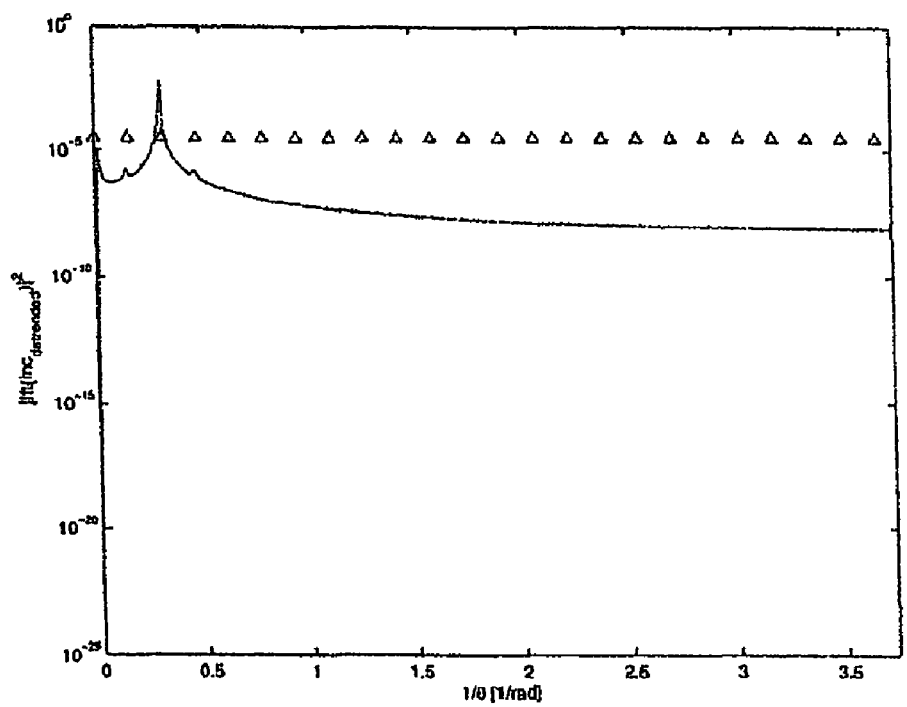
Figure 3.10. FFT of Detrended Inclination
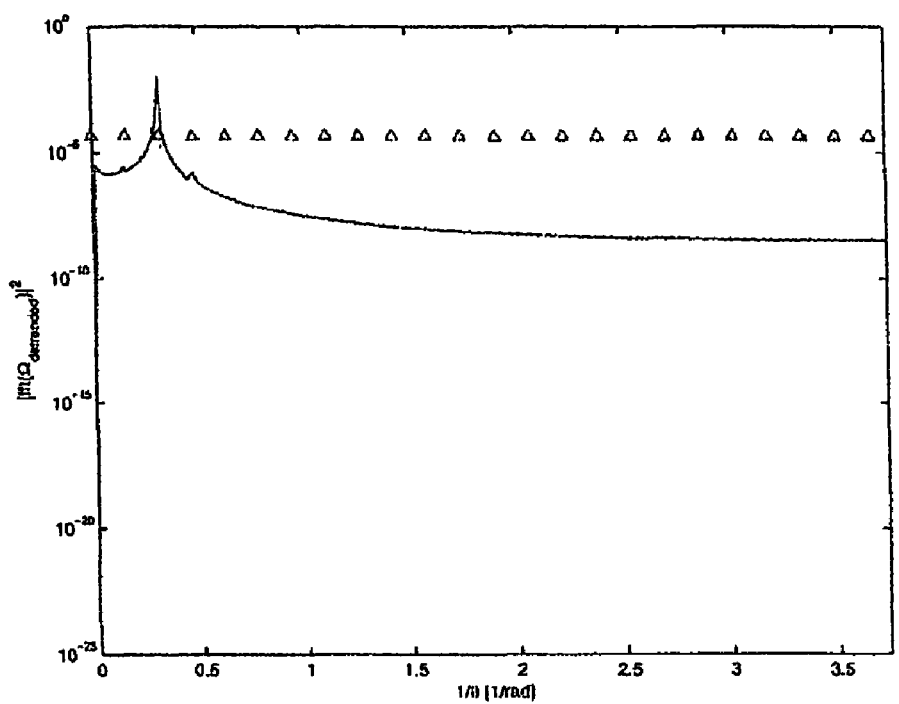
Figure 3.11. FFT of Detrended Right Ascension

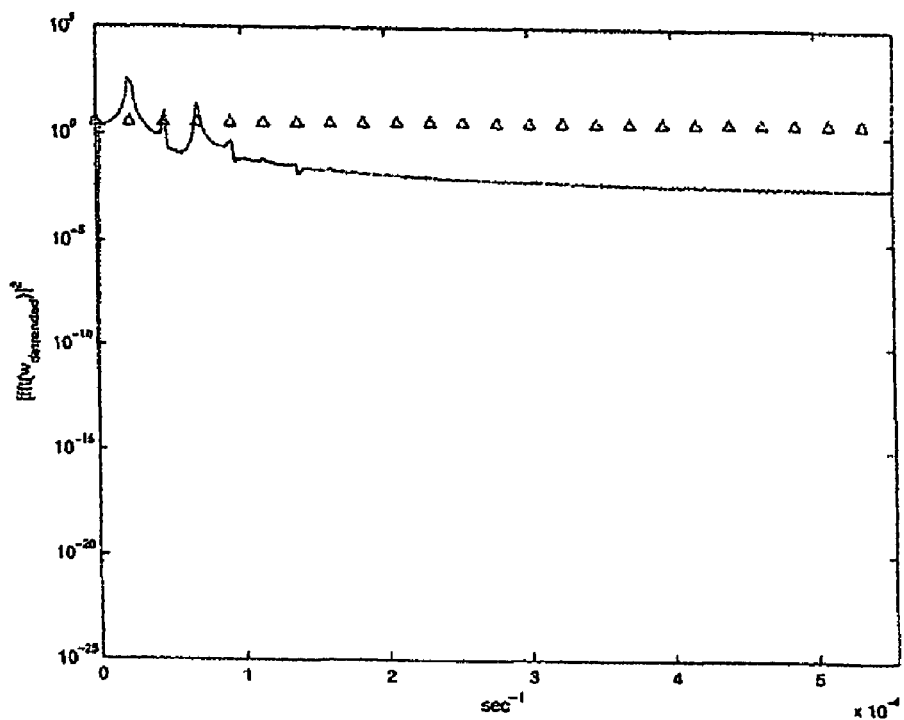
Figure 3.12. FFT of Detrended Argument of Perigee
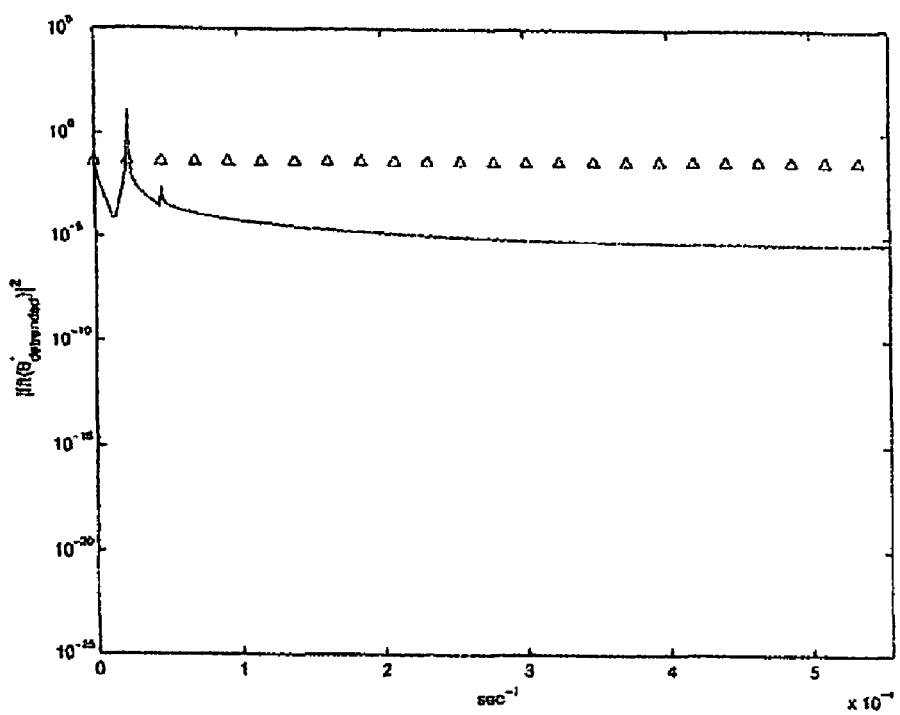
Figure 3.13. FFT of Detrended True Anomaly

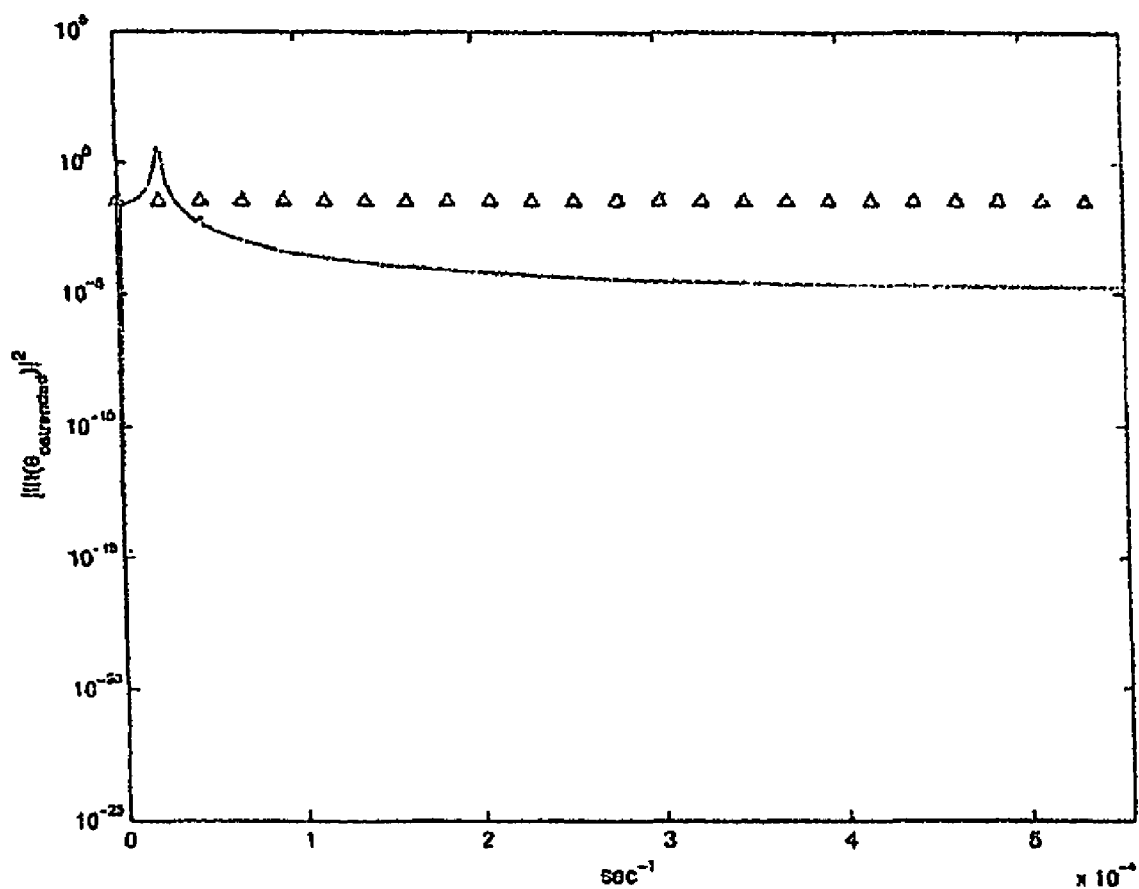
Figure 3.14. FFT of Detrended Argument of Latitude

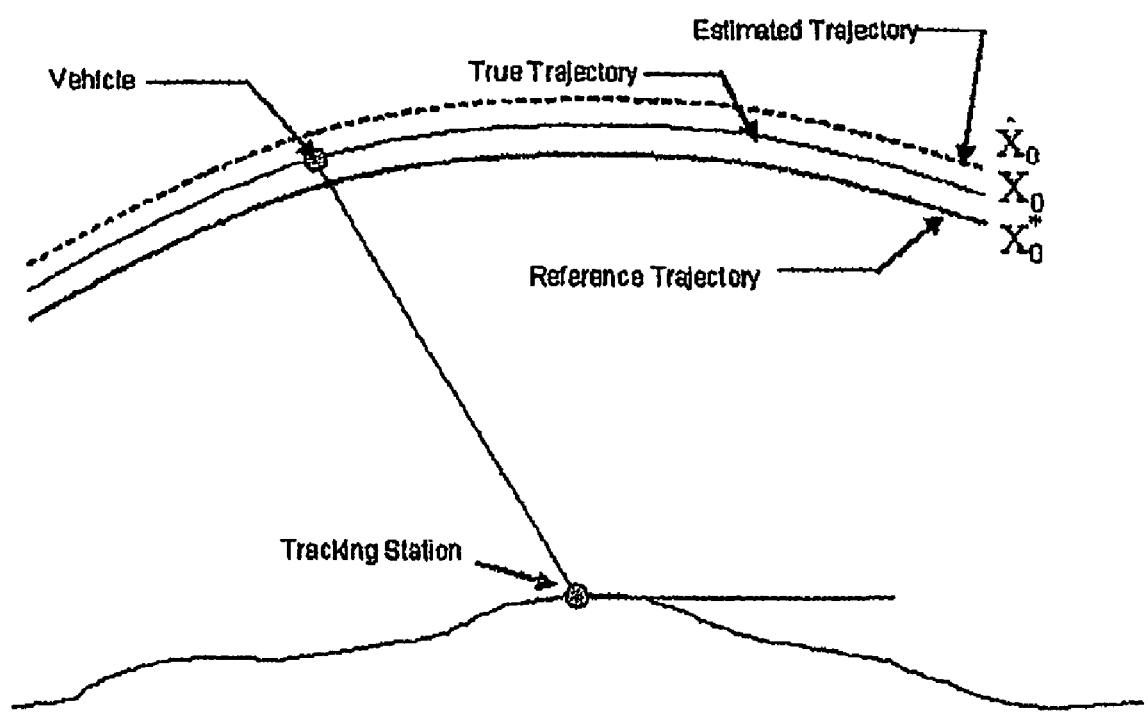
Figure 4.1. Linearization About Reference Trajectory

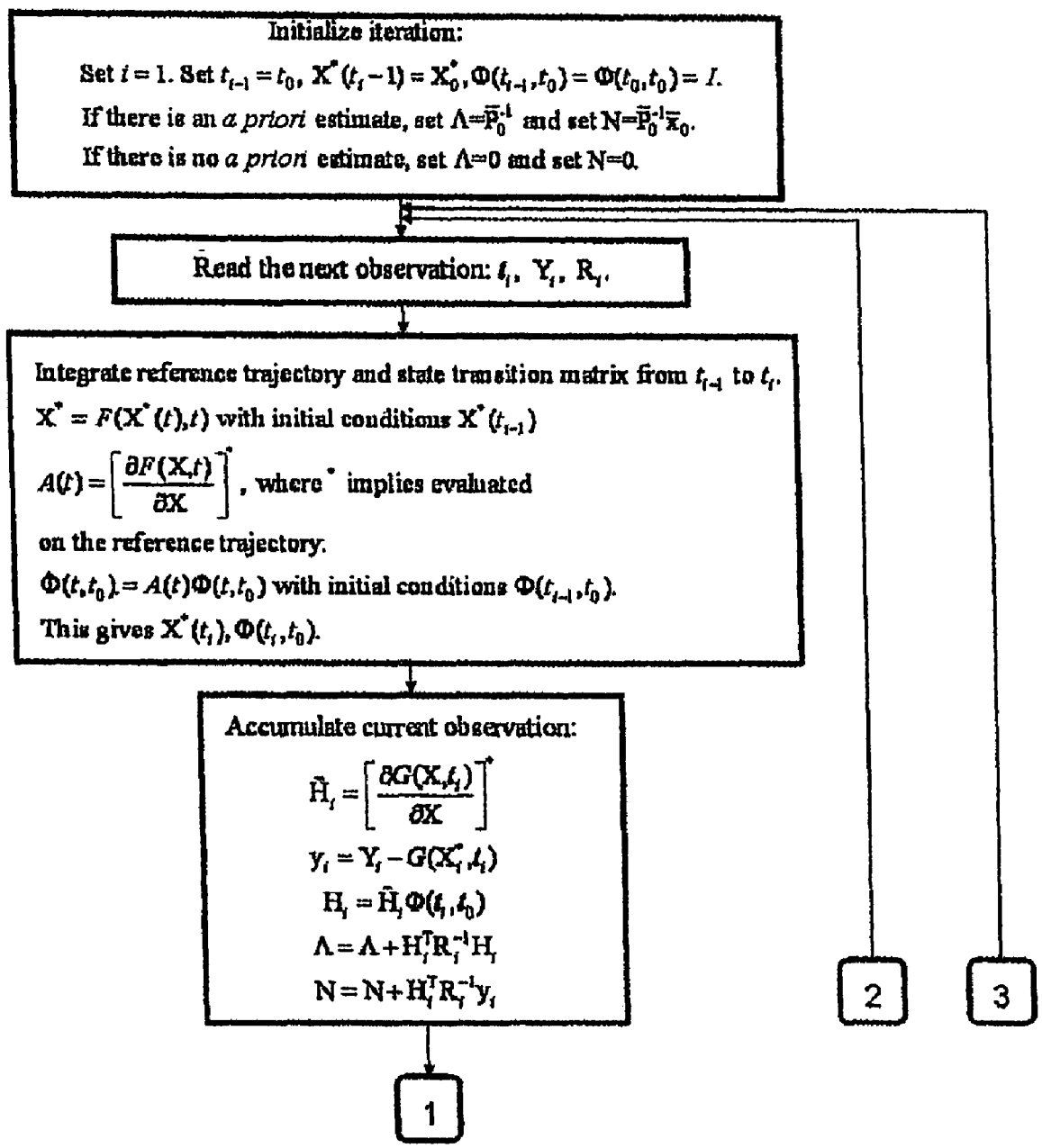
Figure 4.2. Batch Processor Algorithm Flow Chart

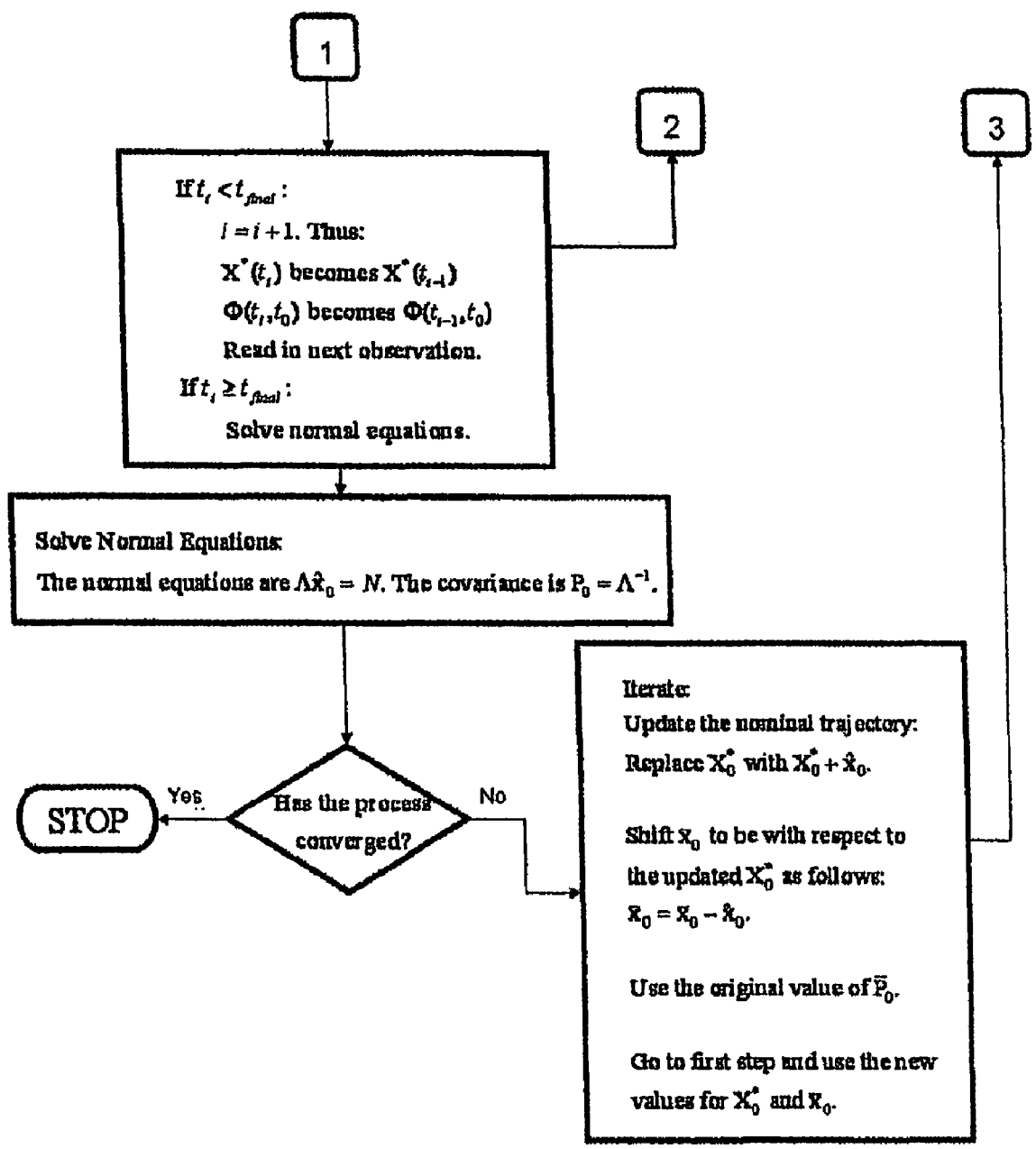
Figure 4.3. Batch Processor Algorithm Flow Chart(cont.)

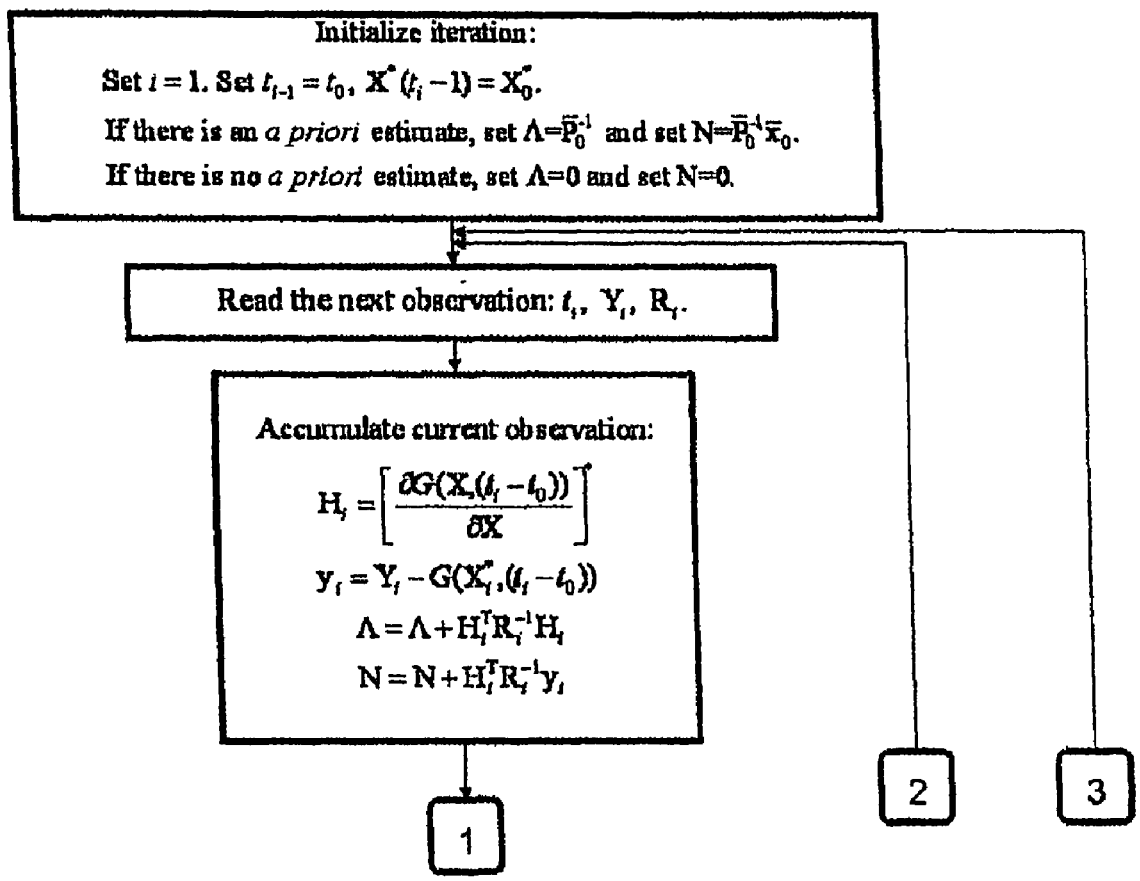
Figure 4.4. Adapted from Tapley, Schultz and Born, "Statistical Orbit Determination," Elsevier, 2004. Pg.196-197.

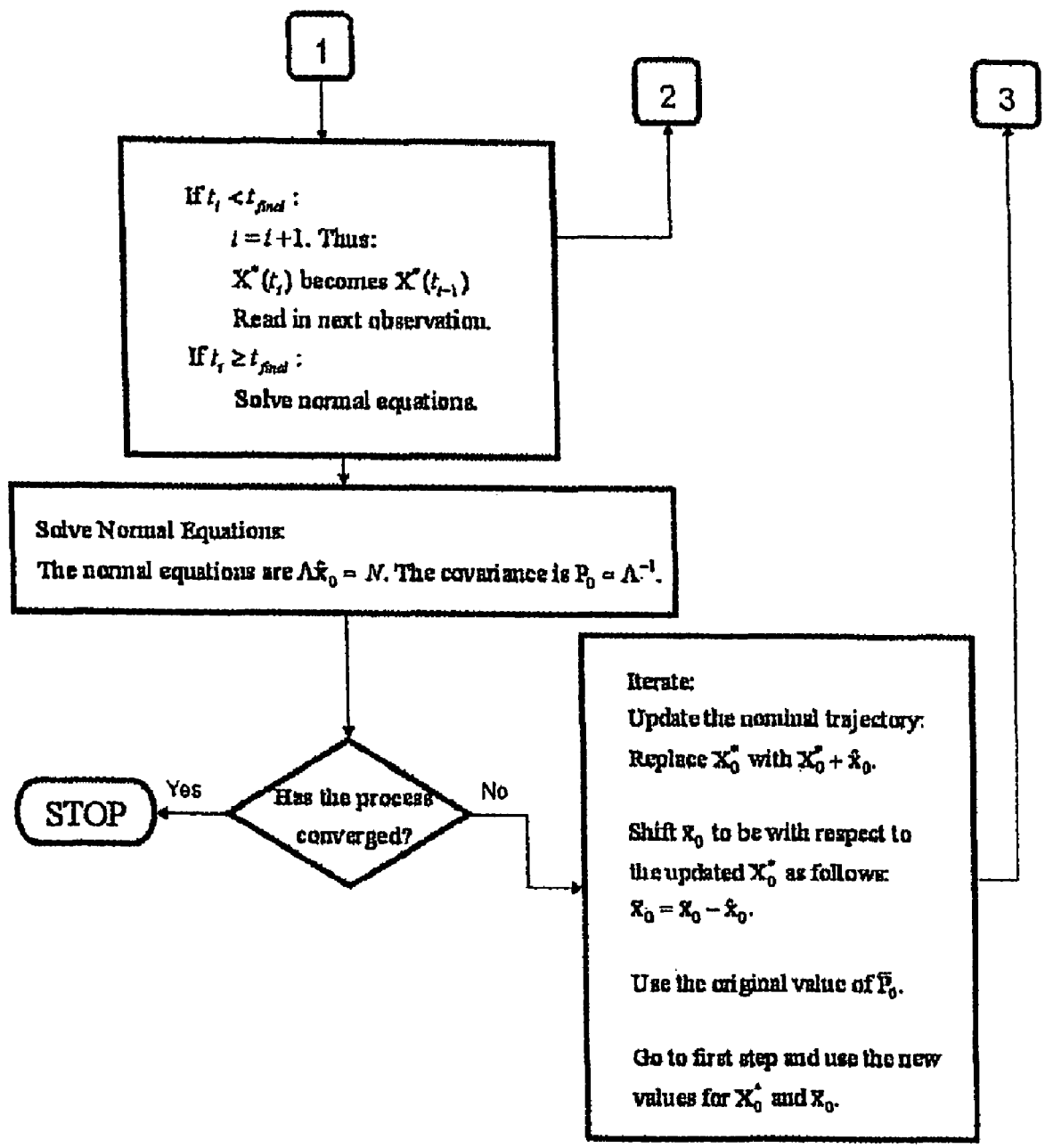
Figure 4.5. Implemented Batch Processor Algorithm Flow Chart(cont.)

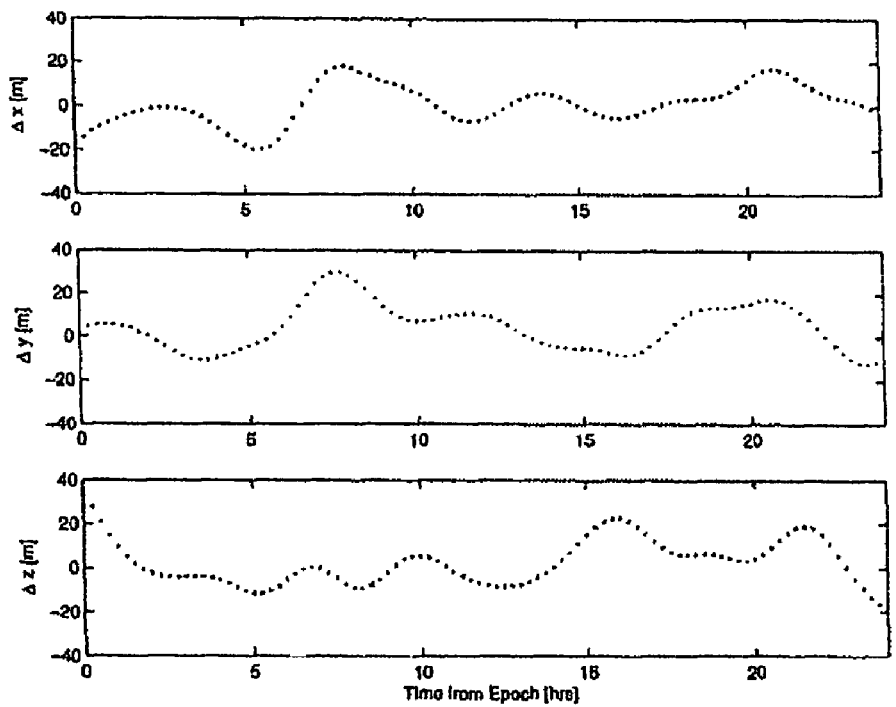
Figure 5.1. Position Residuals for 24 Hour Fit in ECEF Frame
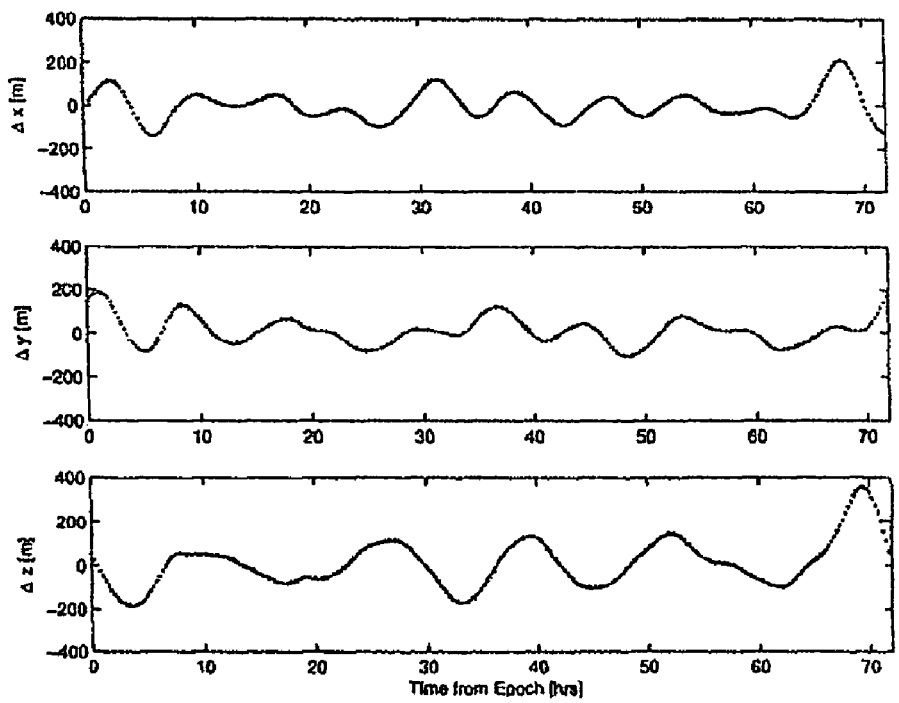
Figure 5.2. Position Residuals for 72 Hour Fit in ECEF Frame

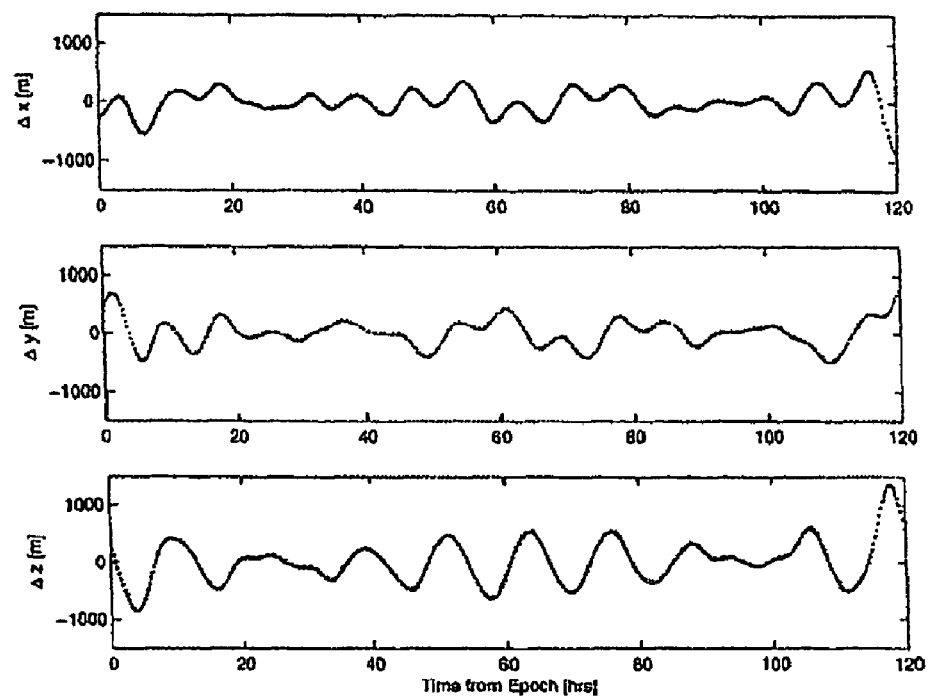
Figure 5.3. Position Residuals for 120 Hour Fit in ECEF Frame
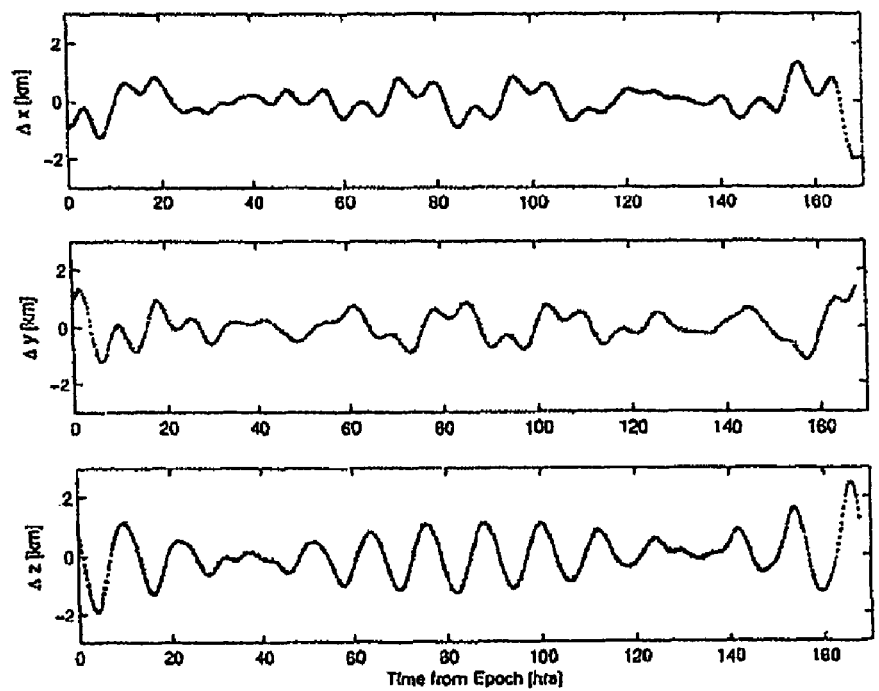
Figure 5.4. Position Residuals for 168 Hour Fit in ECEF Frame

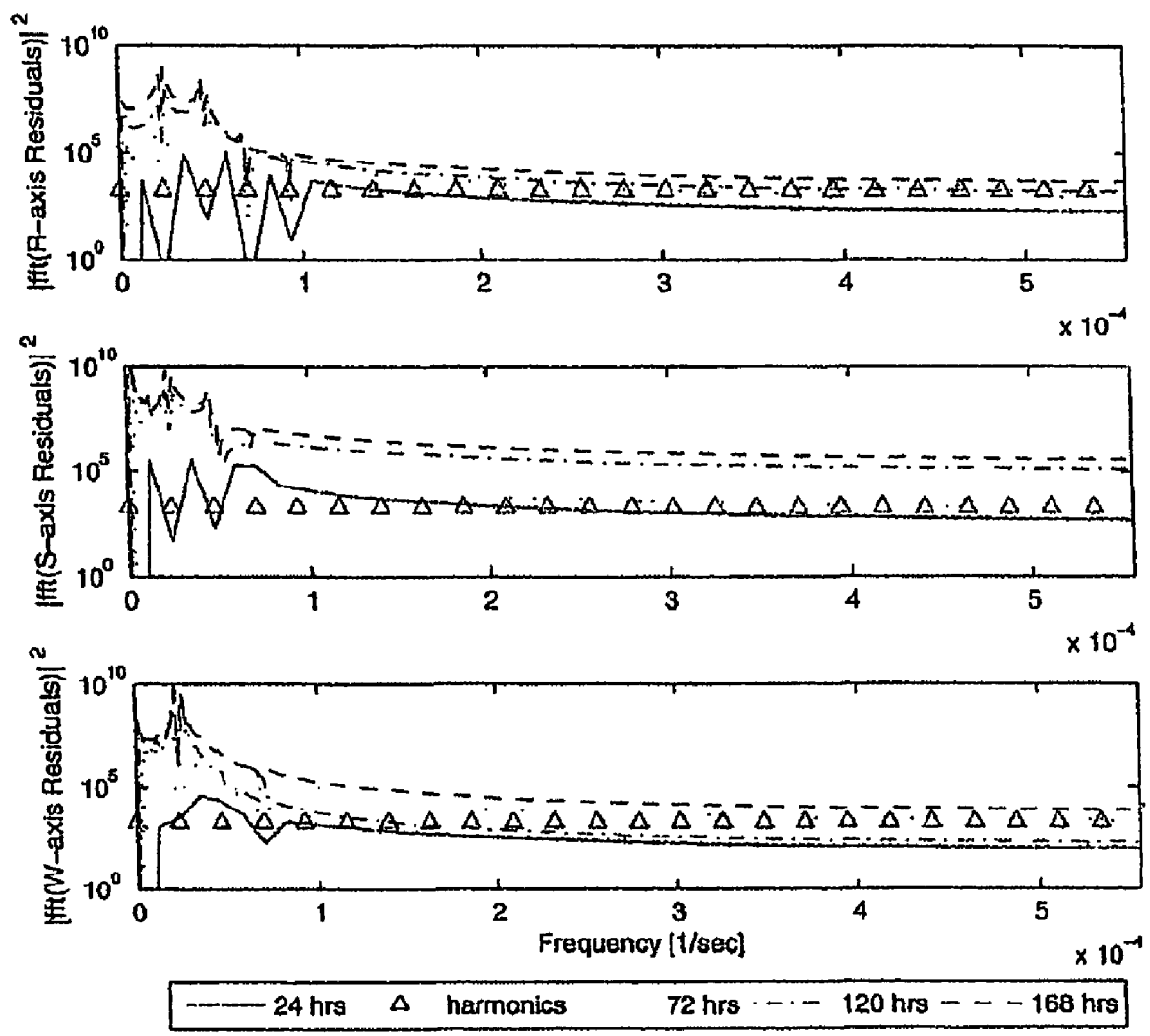
Figure 5.5. FFT of Position Residuals for Several Fit Intervals

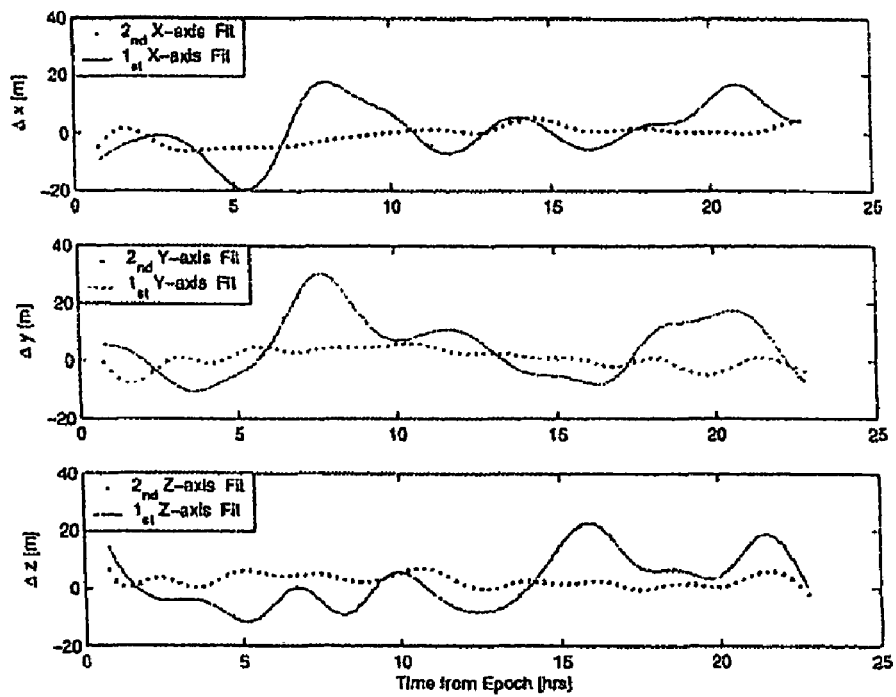
Figure 5.6. 2nd Fit Position Residuals for 24 Hours in ECEF Frame
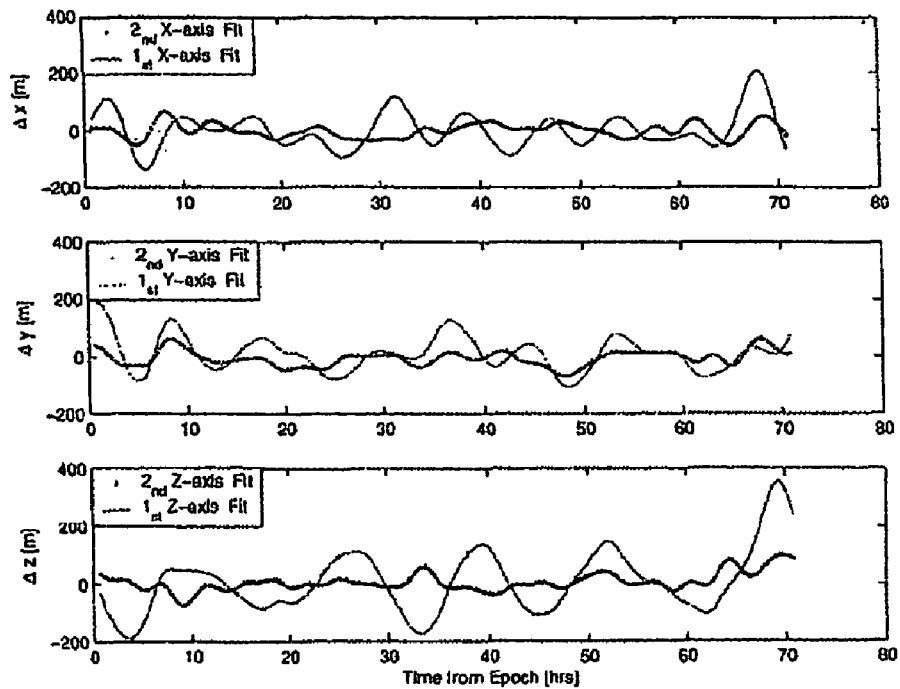
Figure 5.7. 2nd Fit Position Residuals for 72 Hours in ECEF Frame

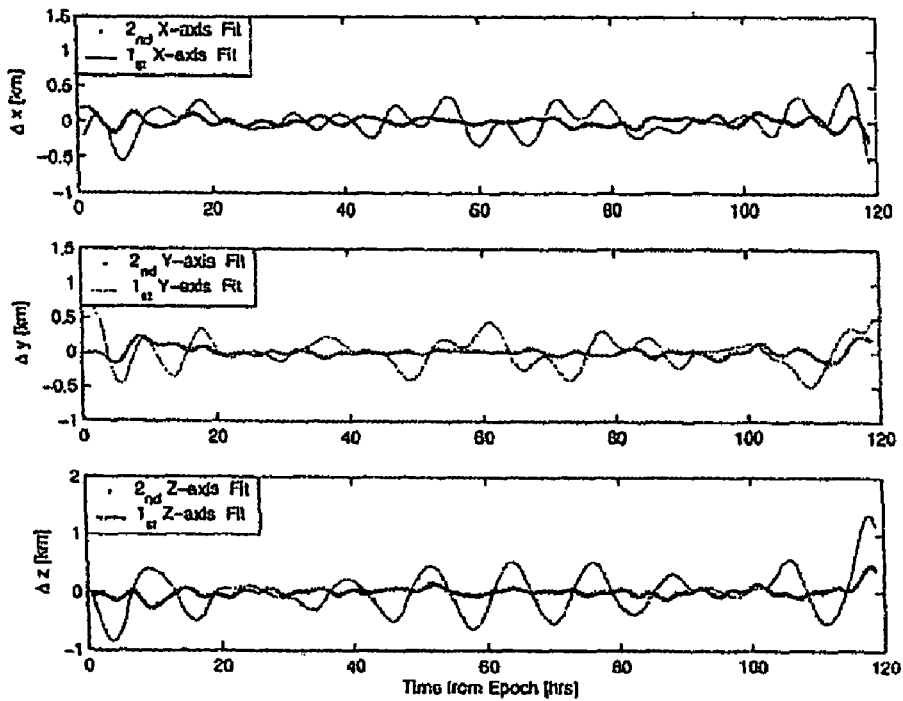
Figure 5.8. 2nd Fit Position Residuals for 120 Hours in ECEF Frame
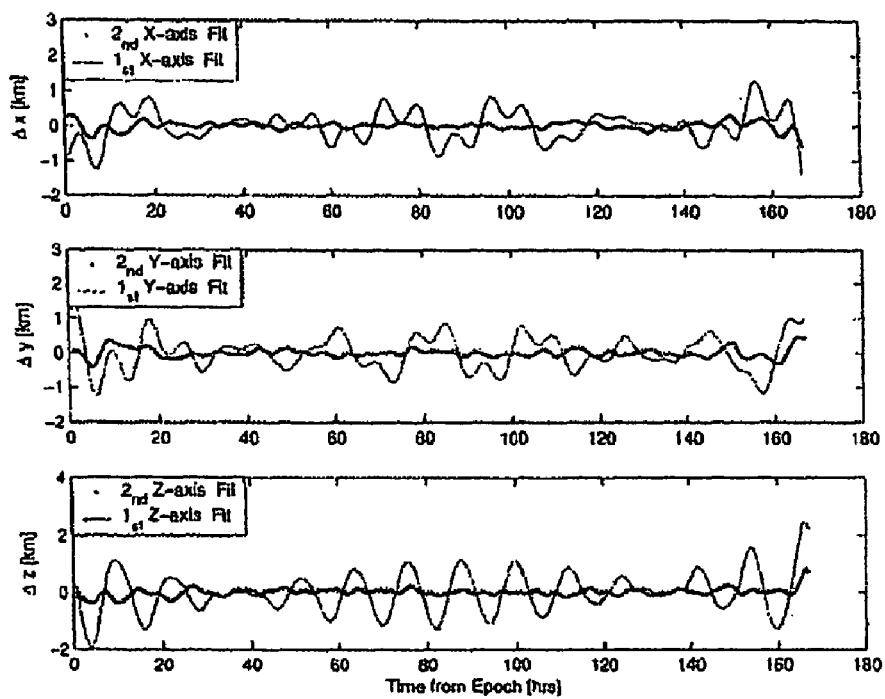
Figure 5.9. 2nd Fit Position Residuals for 168 Hours in ECEF Frame

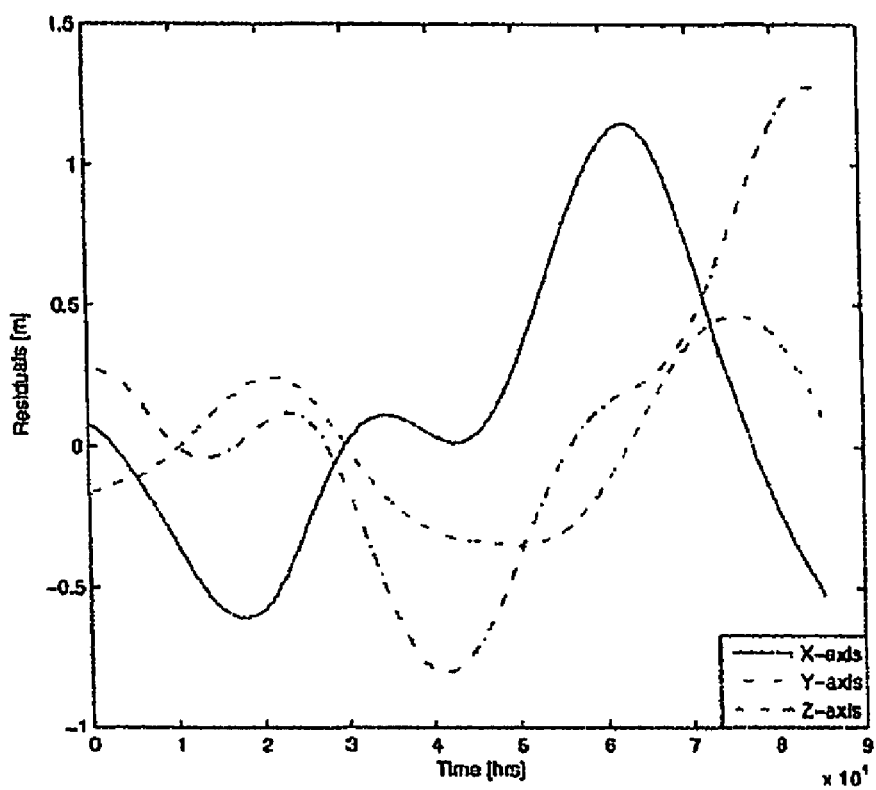
Figure 5.10. Residuals Between Final and Ultra Rapid IGS Products in ECEF Frame

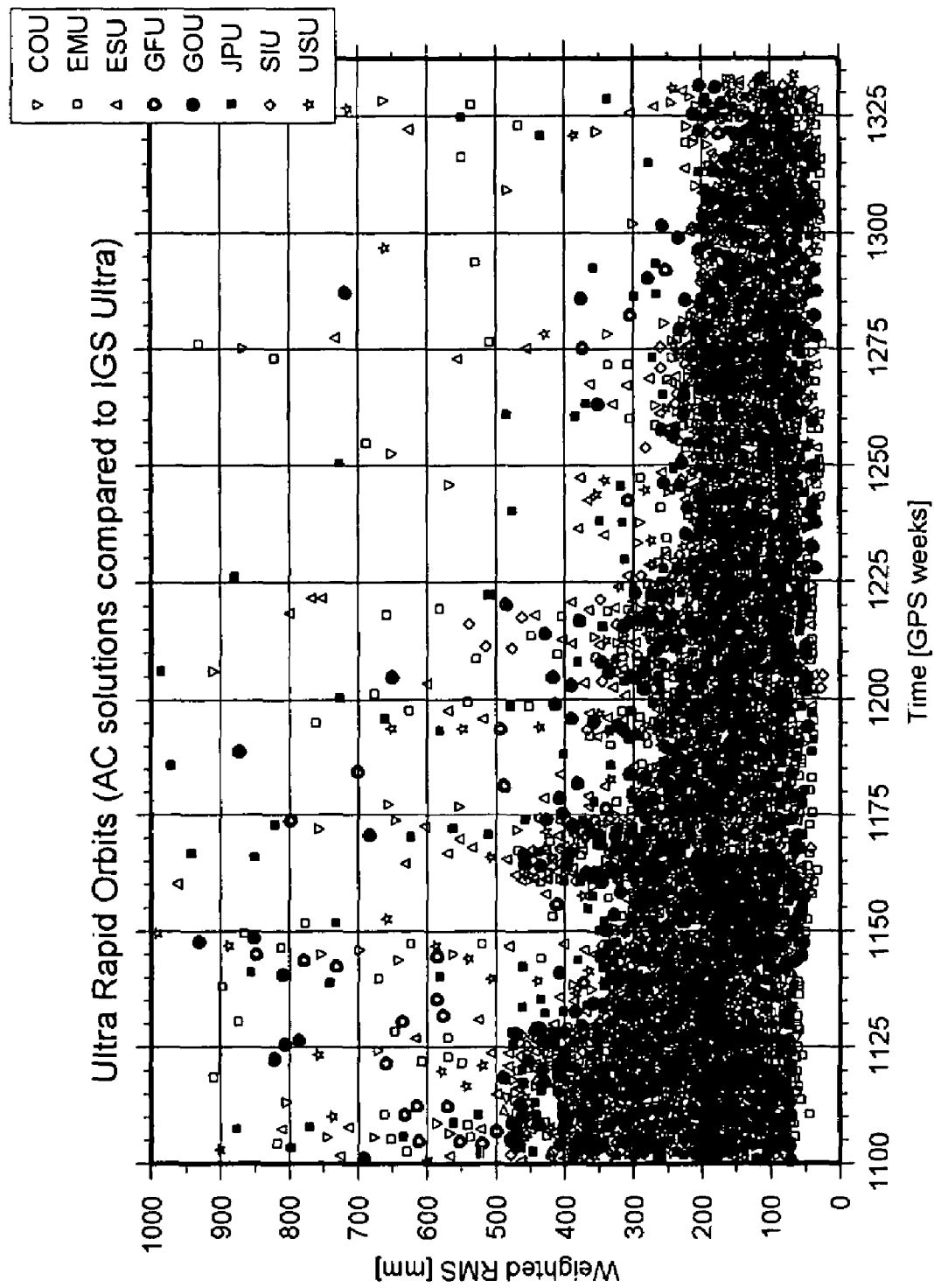
Figure 5.11. Residuals Between Final and Ultra Rapid IGS Products [16]

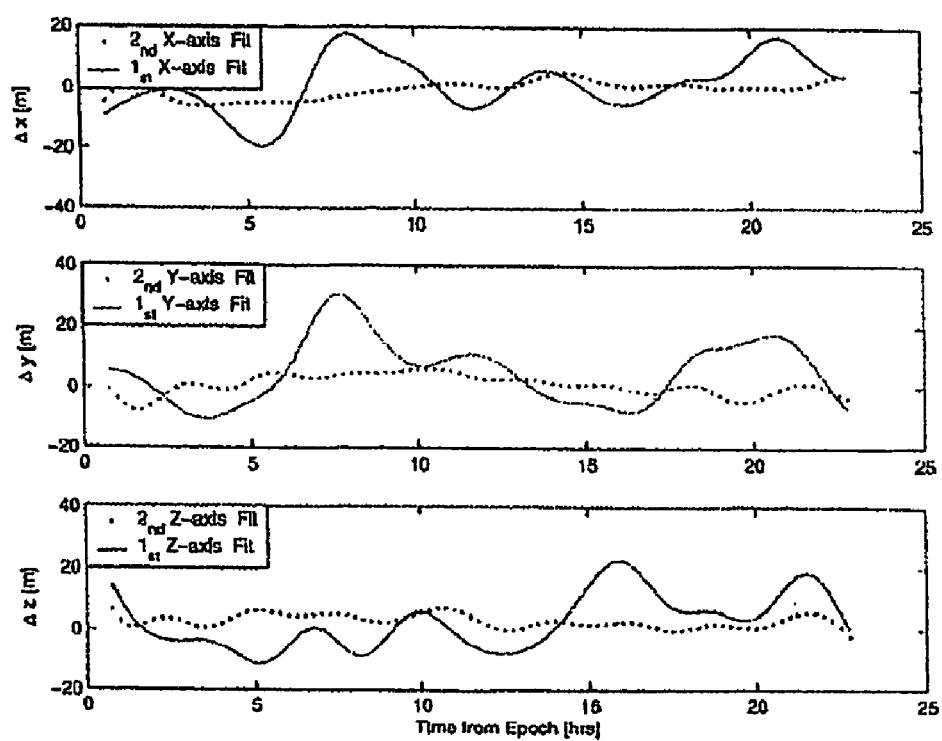
Figure 5.12. Residuals Using Ultra Rapid IGS Products in ECEF Frame

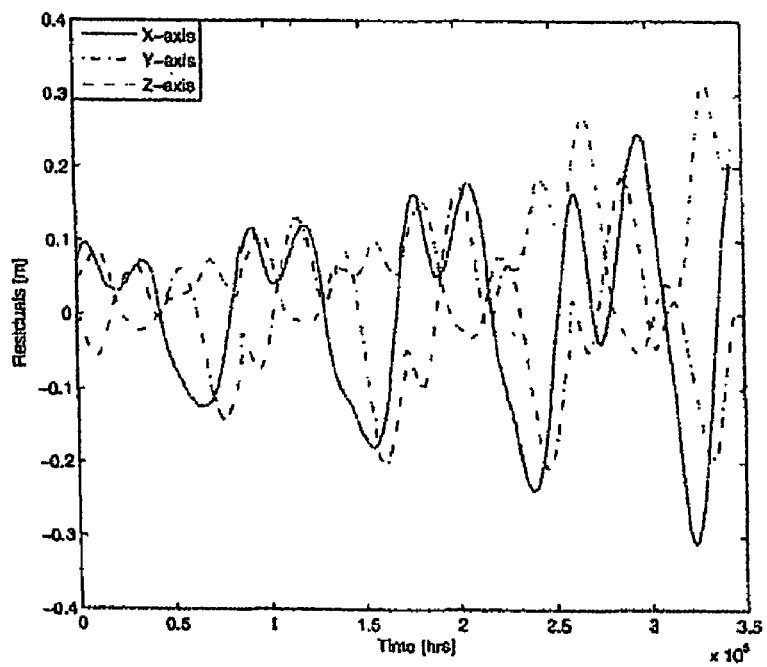
Figure 5.13. Residuals Between CODE Predicted Orbits and Rapid Products in ECEF Frame
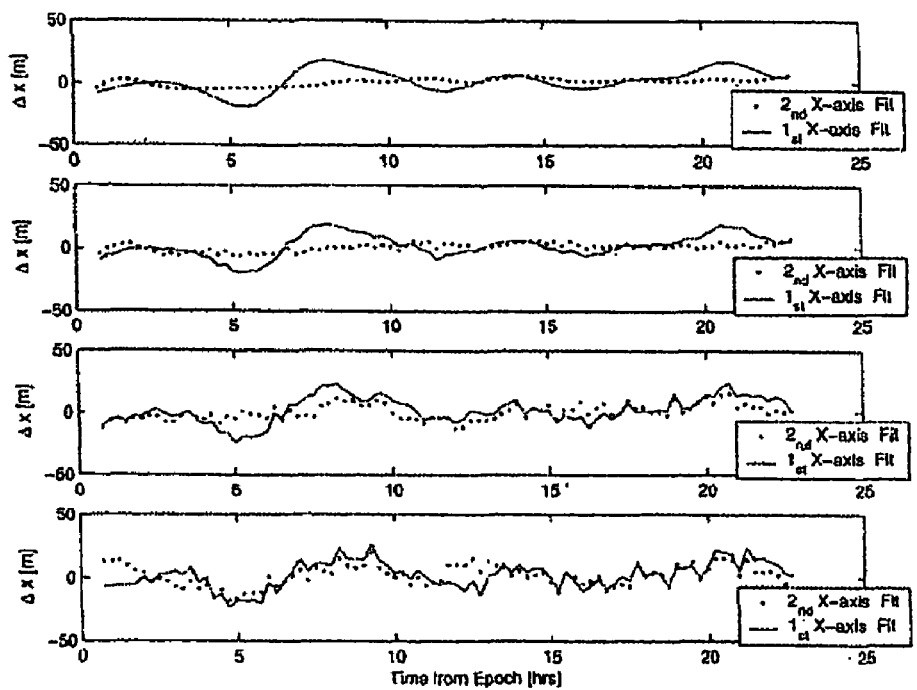
Figure 5.14. 2nd Fit Position Residuals for 24 Hours in ECEF Frame

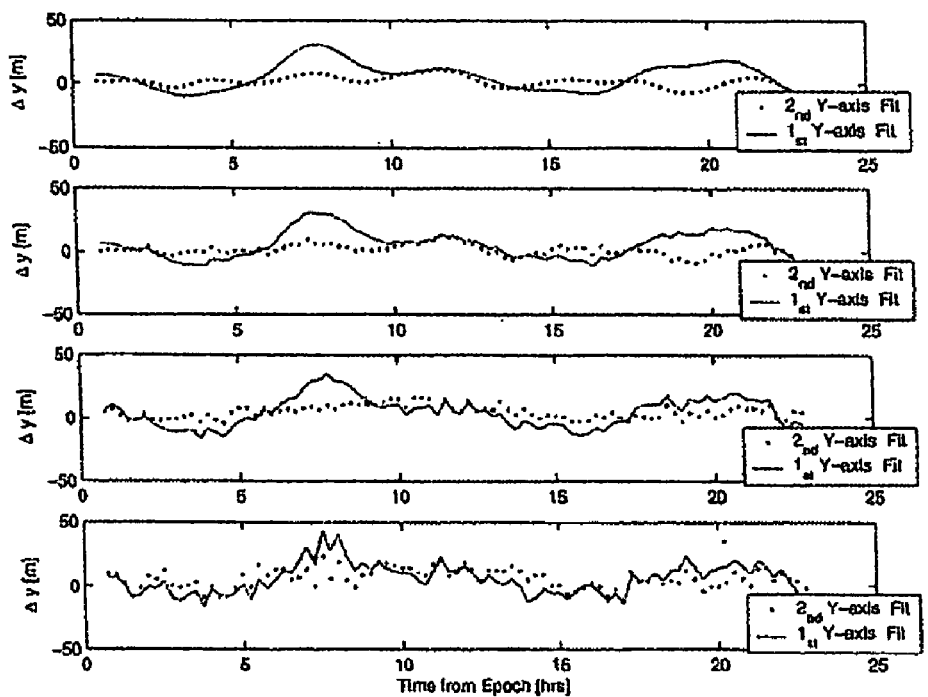
Figure 5.15. 2nd Fit Position Residuals for 72 Hours in ECEF Frame
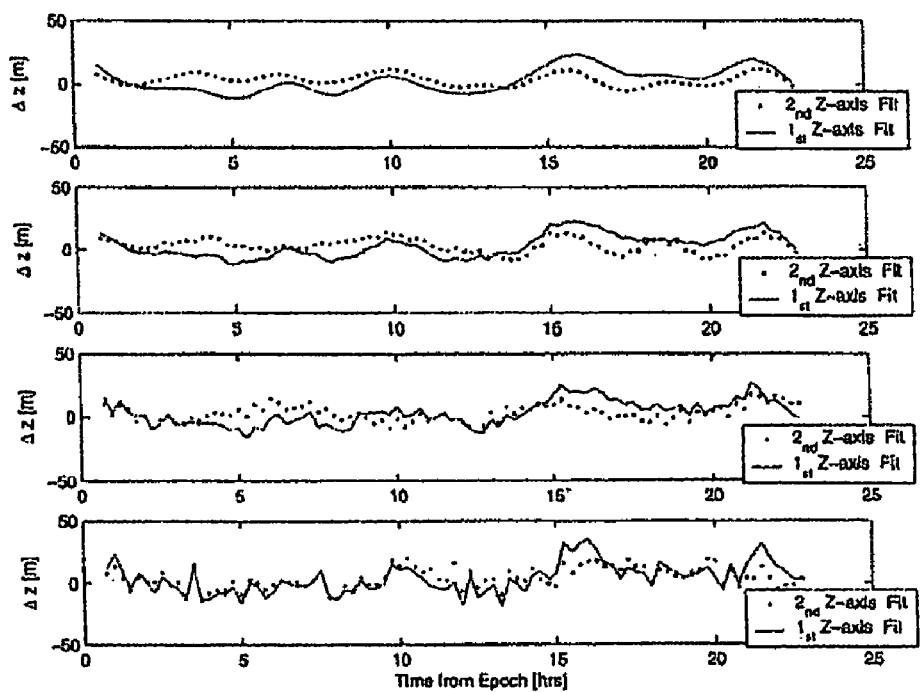
Figure 5.16. 2nd Fit Position Residuals for 120 Hours in ECEF Frame

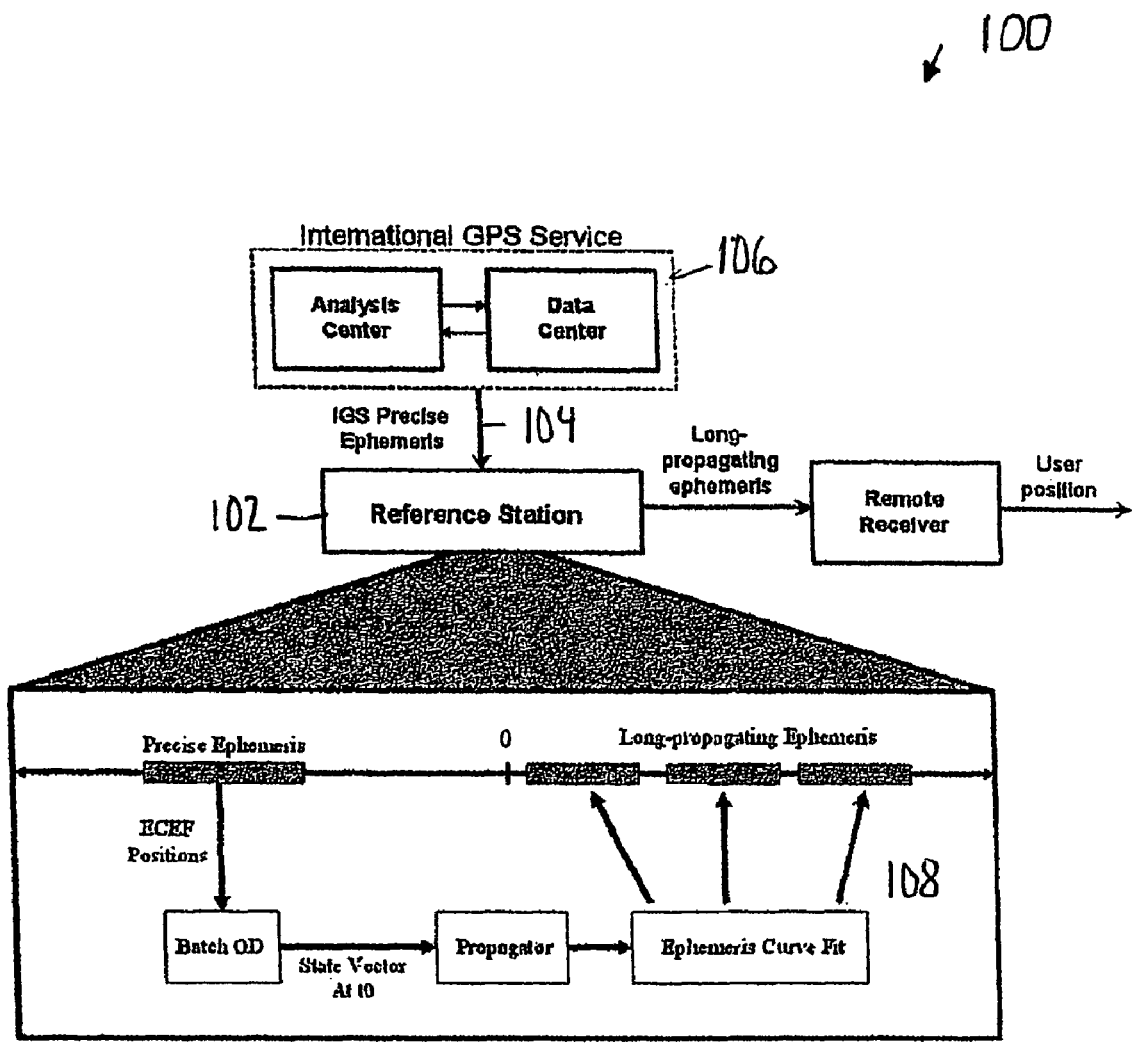
Figure 6.1. Prototype Ground Interaction

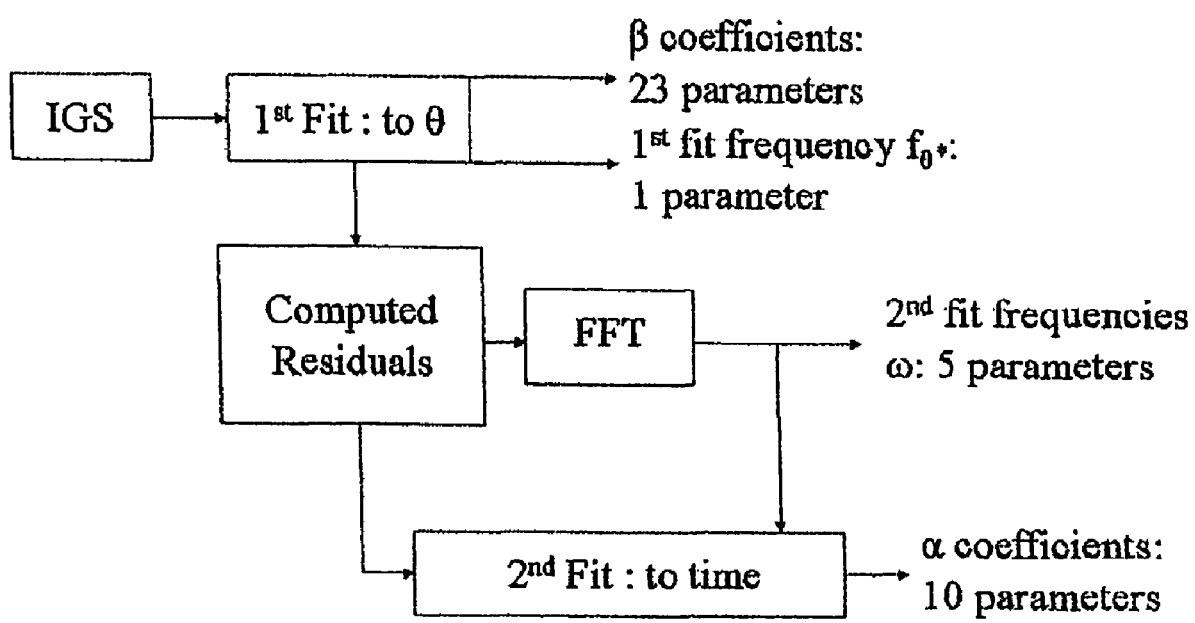
Figure 6.2. Flow Chart of Reference Station Parameter Fit

GPS OPERATIONAL ADVISORY    186
SUBJ: GPS STATUS    05 JUL 2005

1. SATELLITES, PLANES, AND CLOCKS (CS=CESIUM RB=RUBIDIUM):
A. BLOCK I : NONE
B. BLOCK II: PRNS 1, 2, 3, 4, 5, 6, 7, 8, 9, 10, 11, 13, 14, 15
  PLANE  : SLOT F6, D7, C2, D4, B4, C1, C4, A3, A1, E3, D2, F3, F1, D5
  CLOCK  :    CS, RB, CS, RB, CS, RB, RB, CS, CS, CS, RB, RB, RB, CS
  BLOCK II: PRNS 16, 18, 19, 20, 21, 22, 23, 24, 25, 26, 27, 28, 29, 30
  PLANE  : SLOT B1, E4, C3, E1, D3, E2, F4, D1, A2, F2, A4, B3, F5, B2
  CLOCK  :    RB, RB, RB, RB, RB, RB, RB, CS, CS, RB, RB, RB, RB, RB
  BLOCK II: PRNS 31
    PLANE  : SLOT C5
    CLOCK  : CS
2. CURRENT ADVISORIES AND FORECASTS:

| A. FORECASTS: | FOR SEVEN DAYS AFTER EVENT CONCLUDES: | | | |
|---|---|---|---|---|
| NANU | MSG DATE/TIME | PRN | TYPE | SUMMARY (JDAY/ZULU TIME START - STOP) |
| 2005095 | 101841Z JUN 2005 | 02 | FCSTDV | 167/1115-167/2315 |
| 2005097 | 162033Z JUN 2005 | 02 | FCSTSUMM | 167/1131-167/2029 |

→ Planned Outages

| B. ADVISORIES: | | | | |
|---|---|---|---|---|
| NANU | MSG DATE/TIME | PRN | TYPE | SUMMARY (JDAY/ZULU TIME START - STOP) |
| 2005055 | 141648Z APR 2005 | 31 | UNUSUFN | 104/1634-/ |
| 2005093 | 090452Z JUN 2005 | 26 | UNUSUFN | 160/0337-/ |
| 2005096 | 132326Z JUN 2005 | 26 | UNUSABLE | 160/0354-164/2321 |
| 2005098 | 222100Z JUN 2005 | 15 | UNUSUFN | 173/2028-/ |
| 2005099 | 222103Z JUN 2005 | 15 | UNUSABLE | 173/2028-173/2034 |

→ Un-Planned Outages

C. GENERAL
NANU    MSG DATE/TIME    PRN TYPE    SUMMARY (JDAY/ZULU TIME START - STOP)

2005089  161445Z MAY 2005   GENERAL  /-/
2005094  090433Z JUN 2005   GENERAL  /-/
3. REMARKS:
A. THE POINT OF CONTACT FOR GPS MILITARY OPERATIONAL SUPPORT IS THE GPS
SUPPORT CENTER AT (719)567-2541 OR DSN 560-2541.
B. CIVILIAN: FOR INFORMATION, CONTACT US COAST GUARD NAVCEN AT
COMMERCIAL (703)313-5900 24 HOURS DAILY AND INTERNET
HTTP://WWW.NAVCEN.USCG.GOV
C. MILITARY SUPPORT WEBPAGES CAN BE FOUND AT THE FOLLOWING
HTTP://WWW.SCHRIEVER.AF.MIL/GPS OR HTTP://WWW.SCHRIEVER.AF.MIL/GPSSUPPORTCENTER

Figure 6.3. GPS Operational Advisory

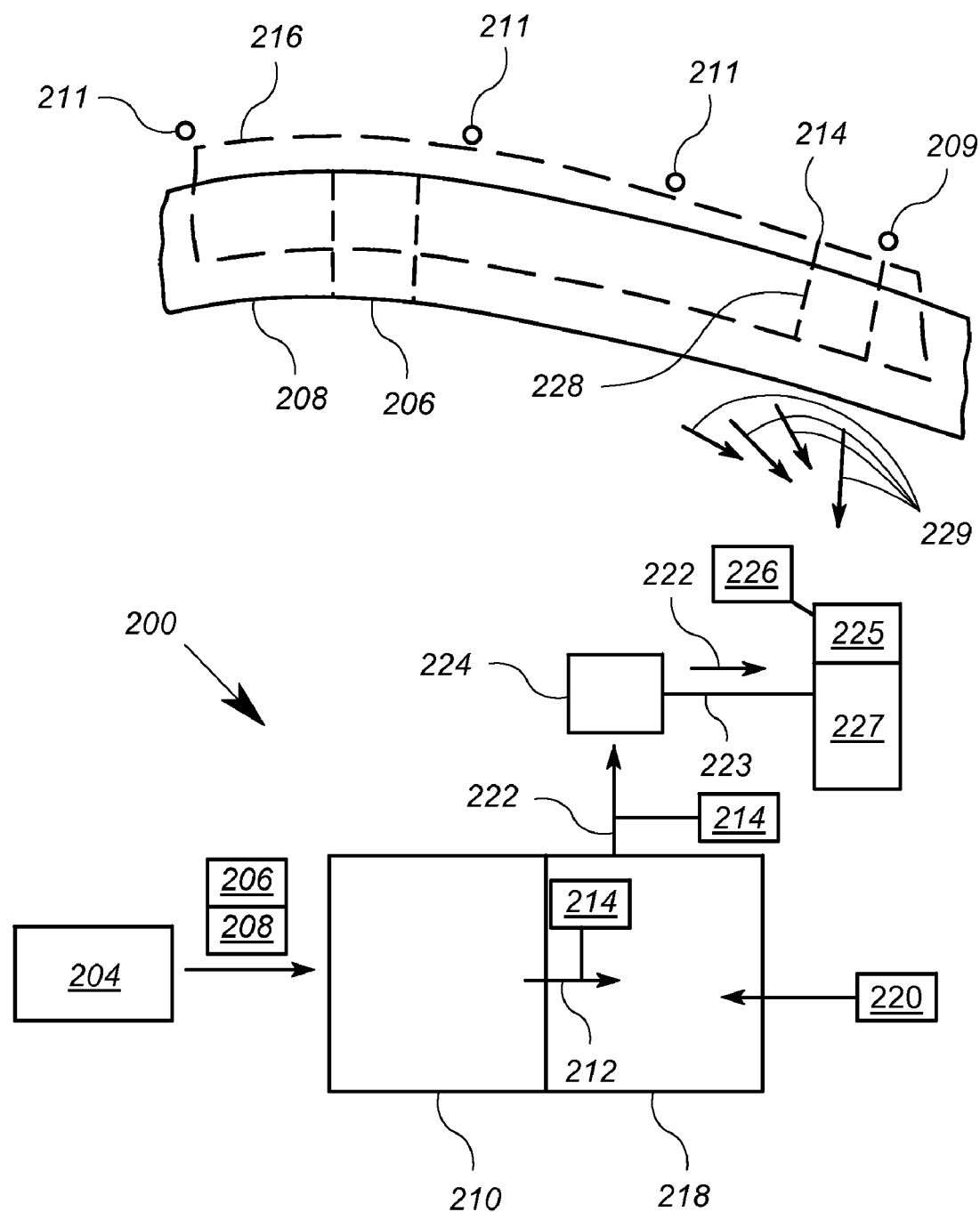
Figure 6.4.

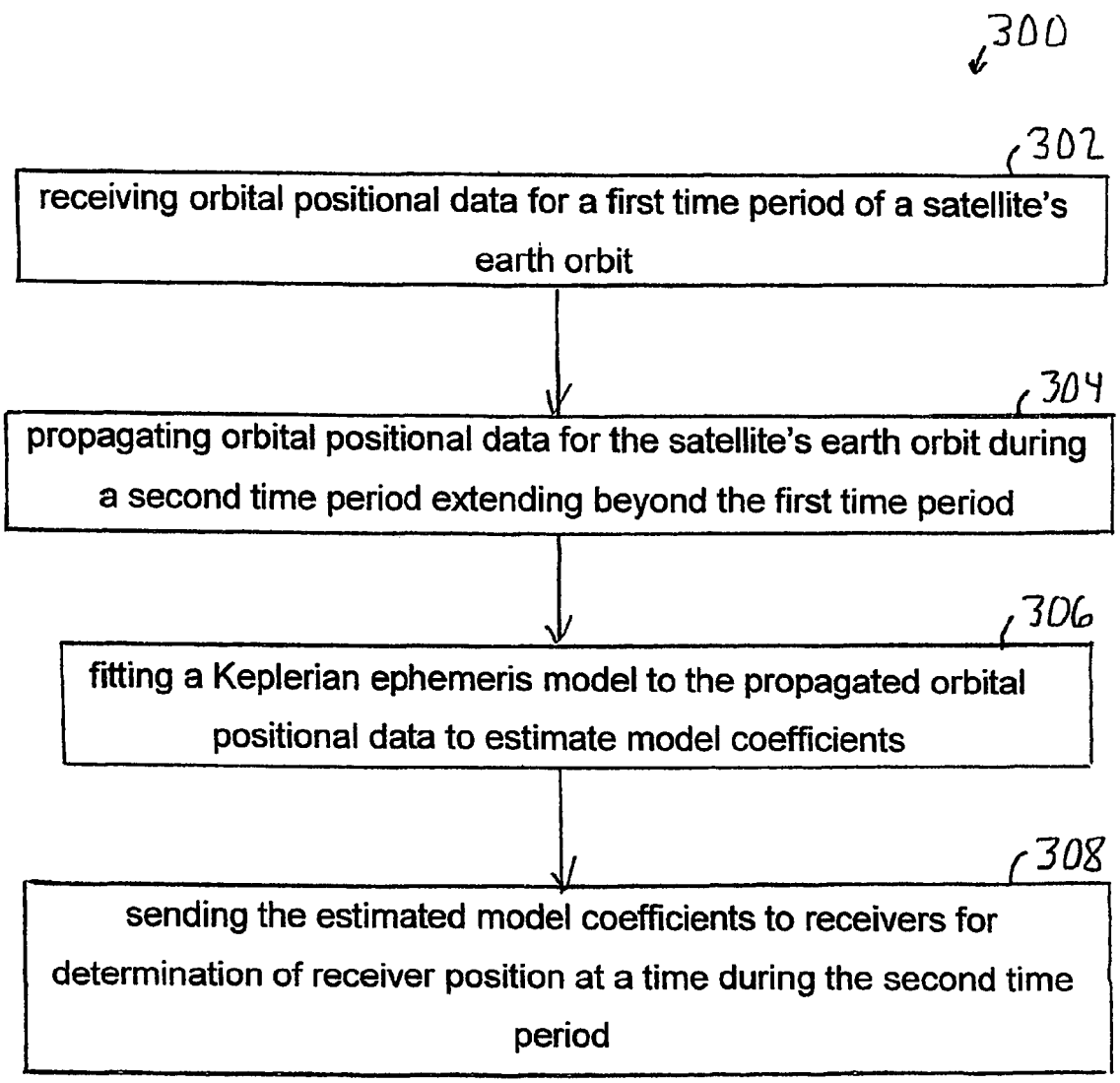
FIG. 6.5

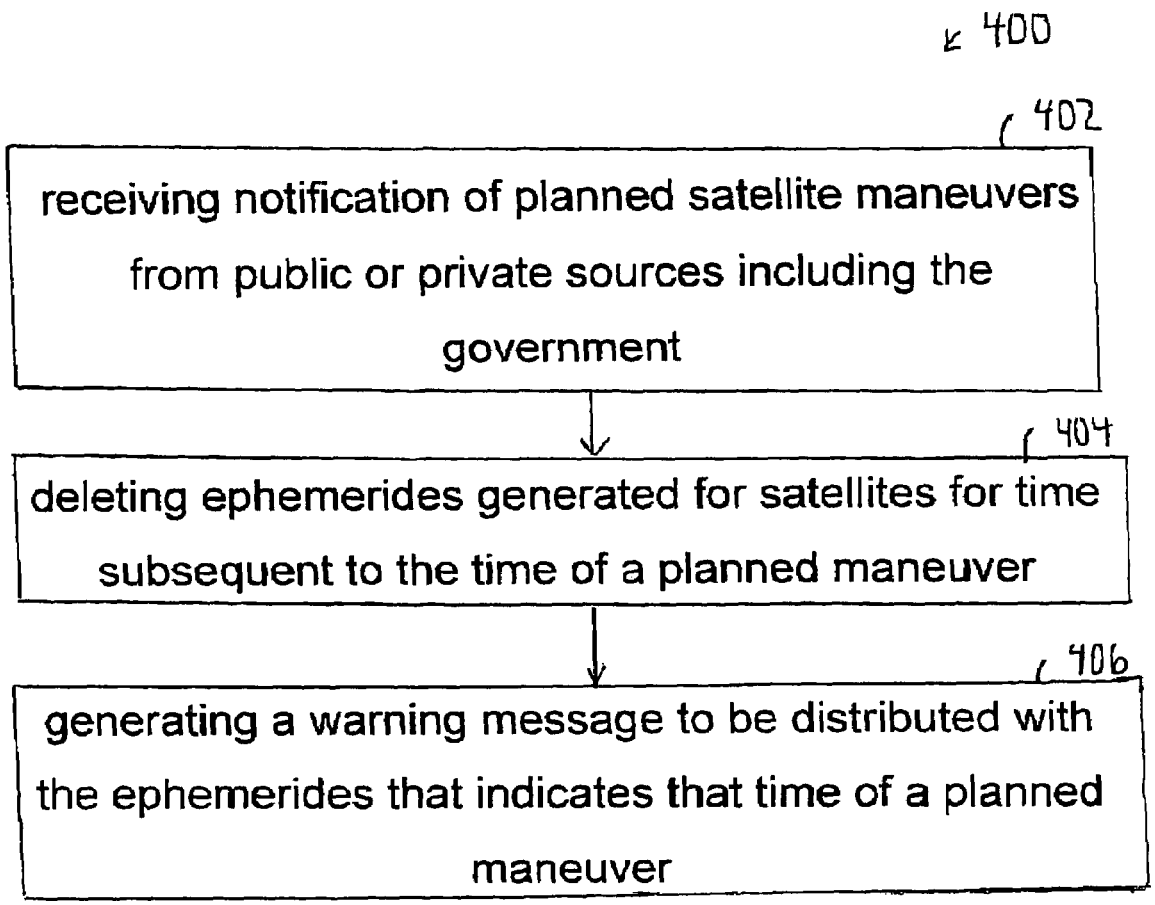
FIG. 6.6

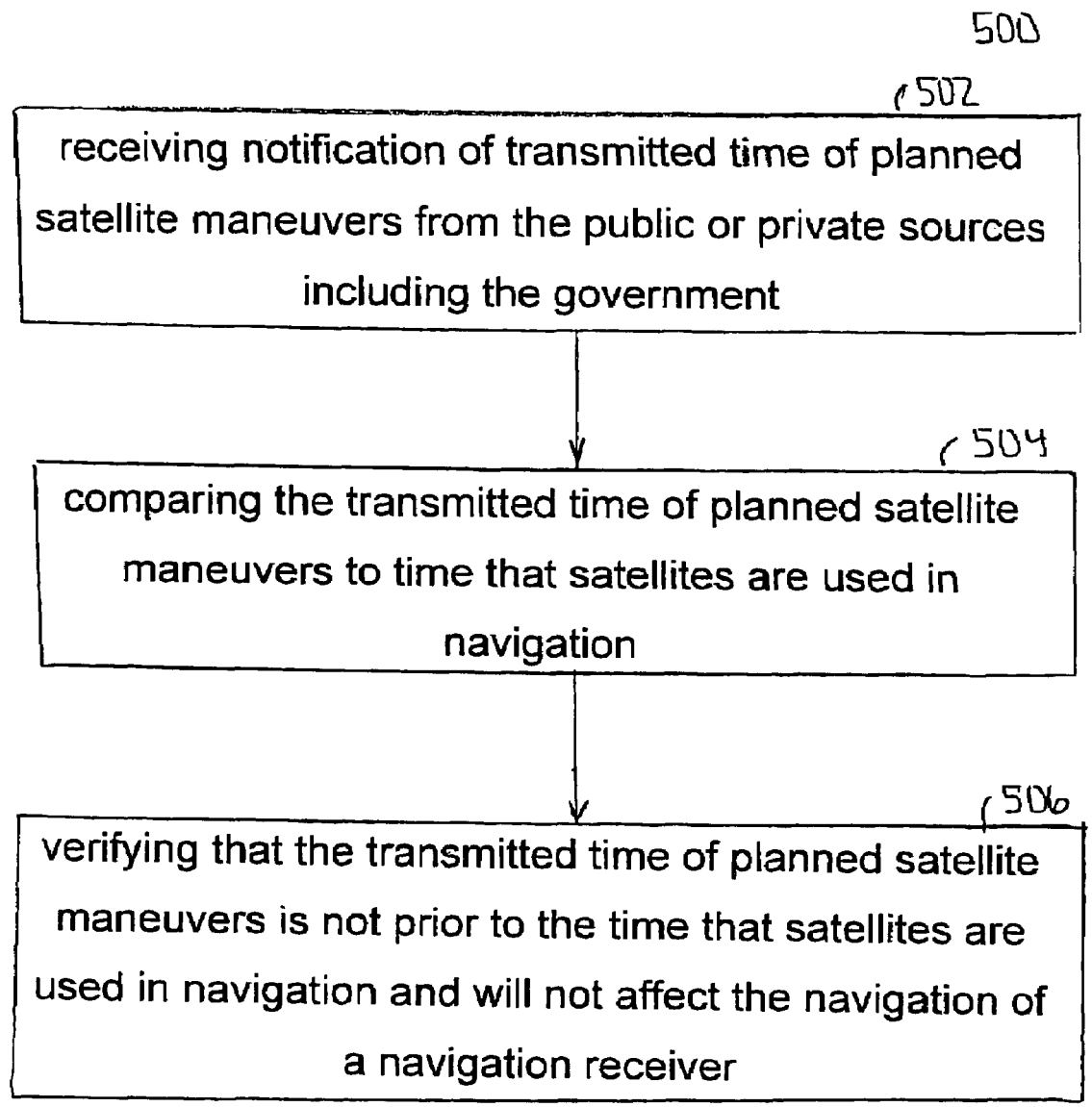
FIG. 6.7

600

602 receiving estimated model coefficients of orbital positional data for a second time period of a satellite's Earth orbit, the second time period extending beyond a first time period, the estimated model coefficients based on propagating orbital positional data for the first time period of a satellite's Earth orbital positional data, the model coefficients obtained from fitting a Keplerian ephemeris model to the propagated orbital positional data to estimate the model coefficients

604 determining the receiver position at a time during the second time period, based at least partially on the estimated model coefficients.

FIG. 6.8

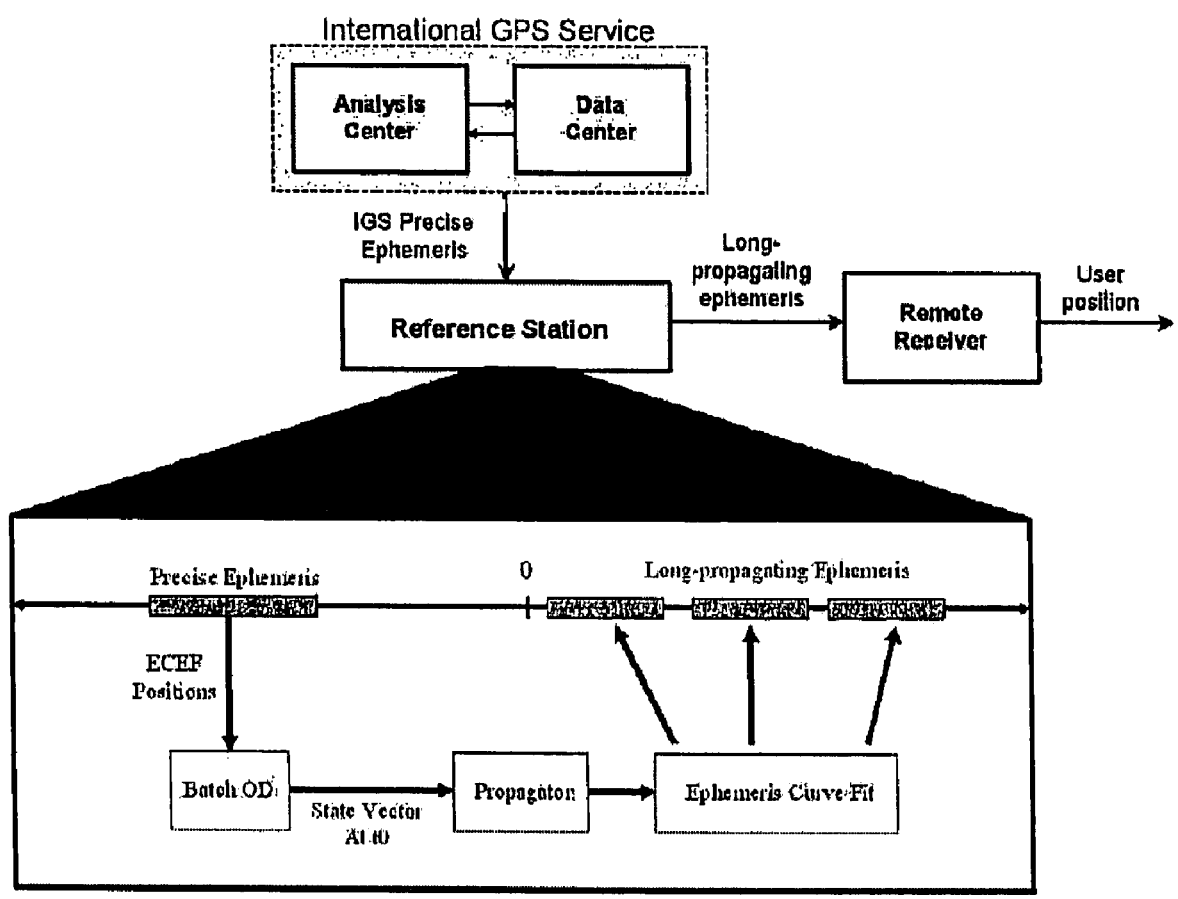
Figure 7.1. Prototype Ground Interaction.

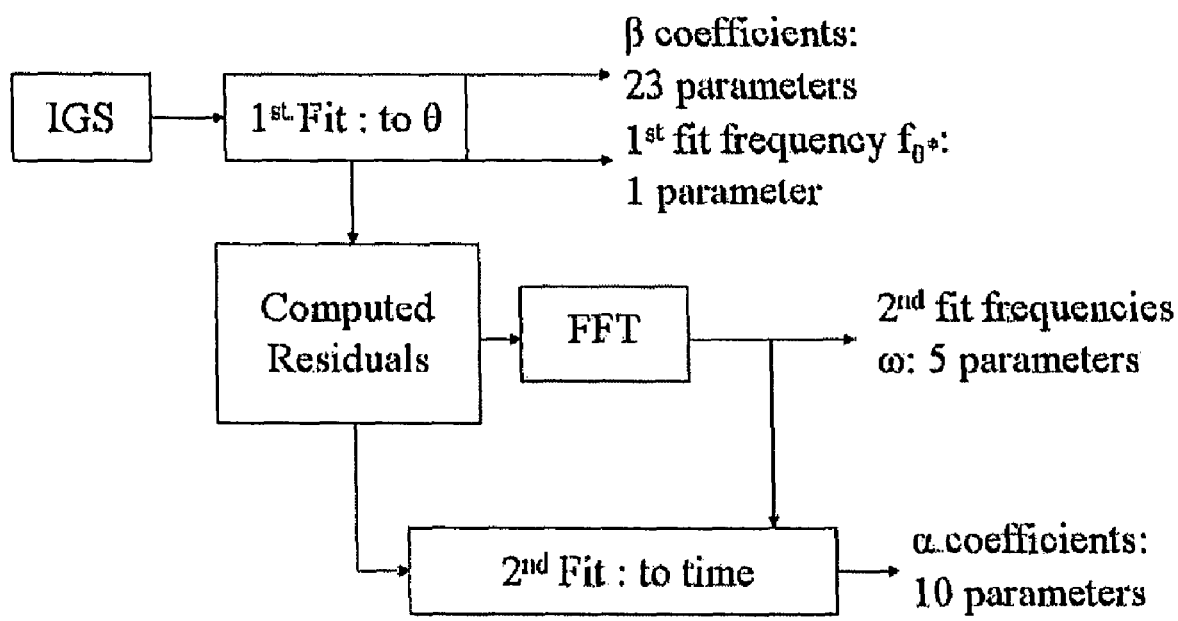
Figure 7.2 : Flow Chart of Reference Station Parameter Fit

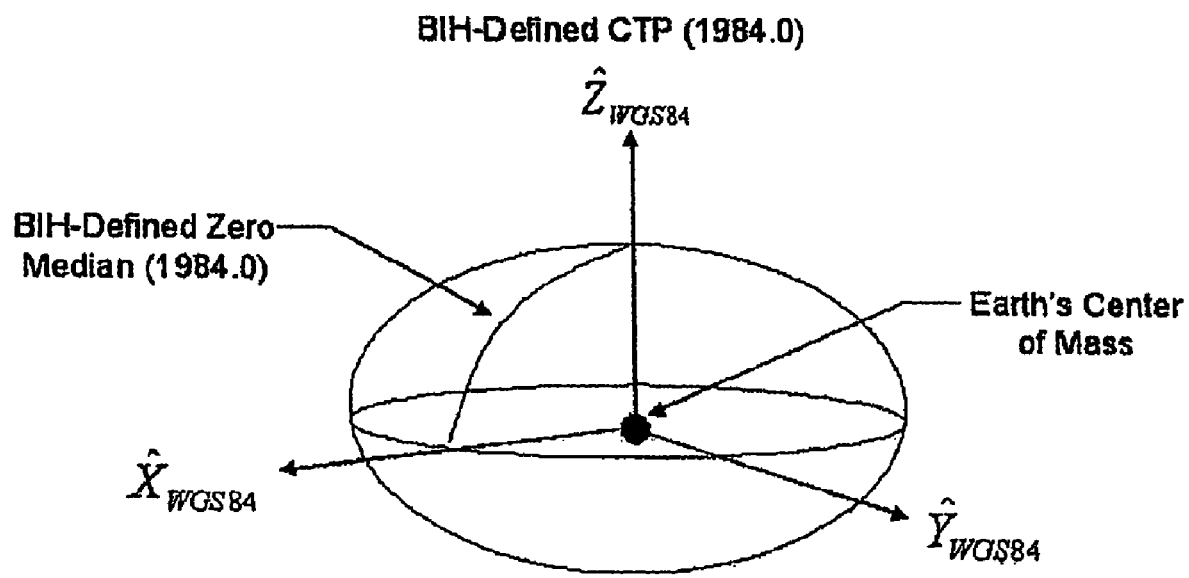
Figure A.1. WGS-84 Coordinate System Definition.

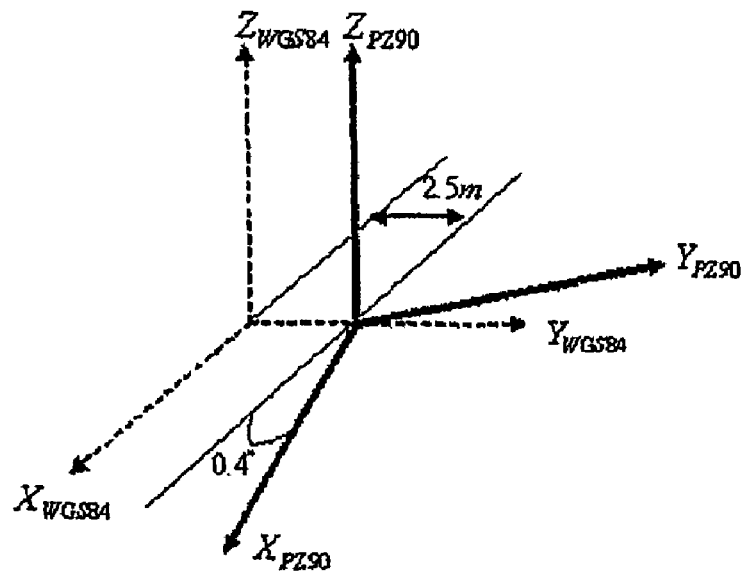
Figure A.2. PZ-90 Coordinate System Definition.
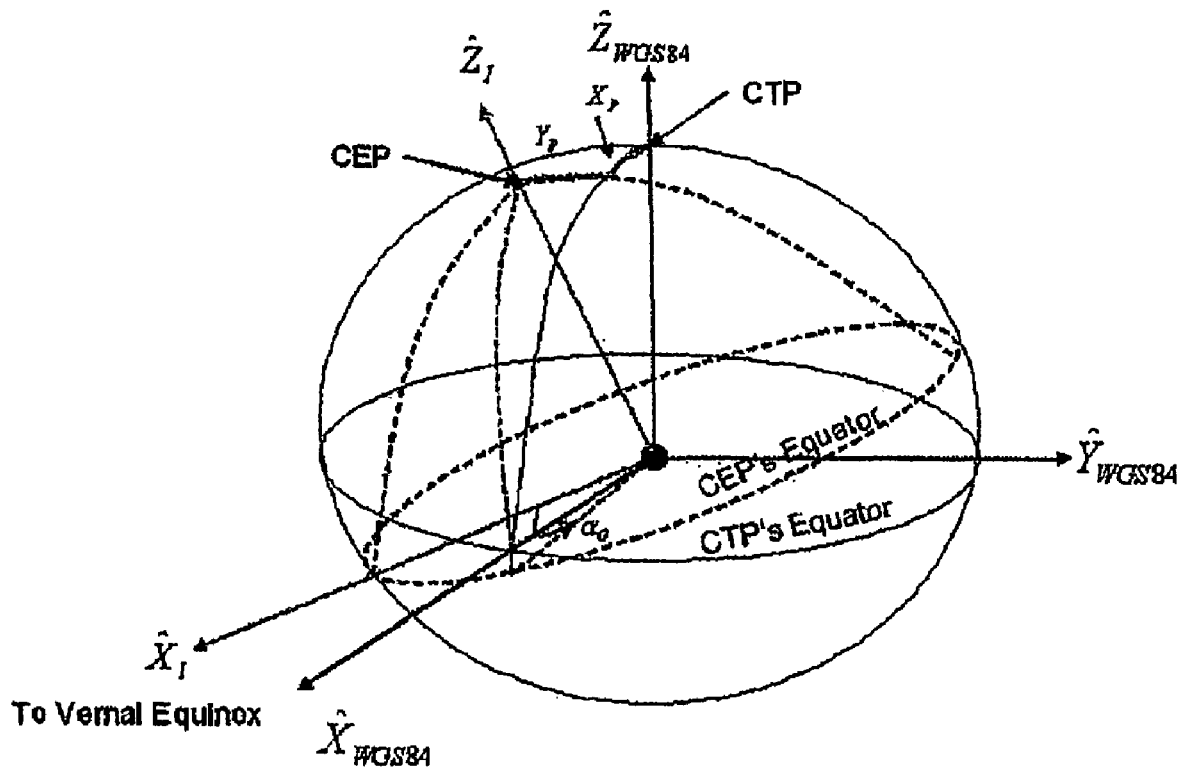
Figure A.3. Inertial and WGS-84 Reference Frames.

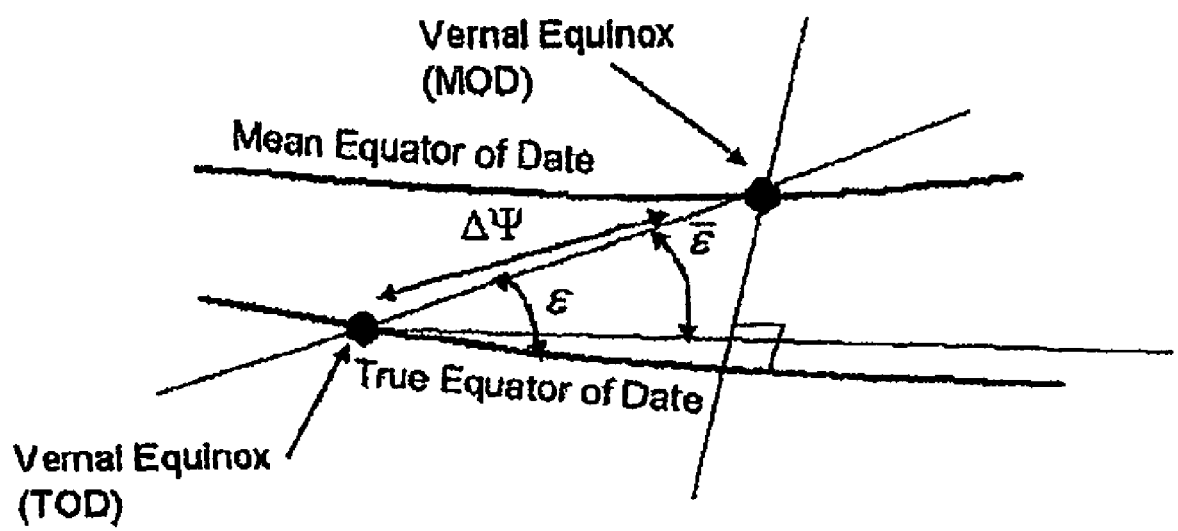
Figure A.4. Equation of the Equinoxes

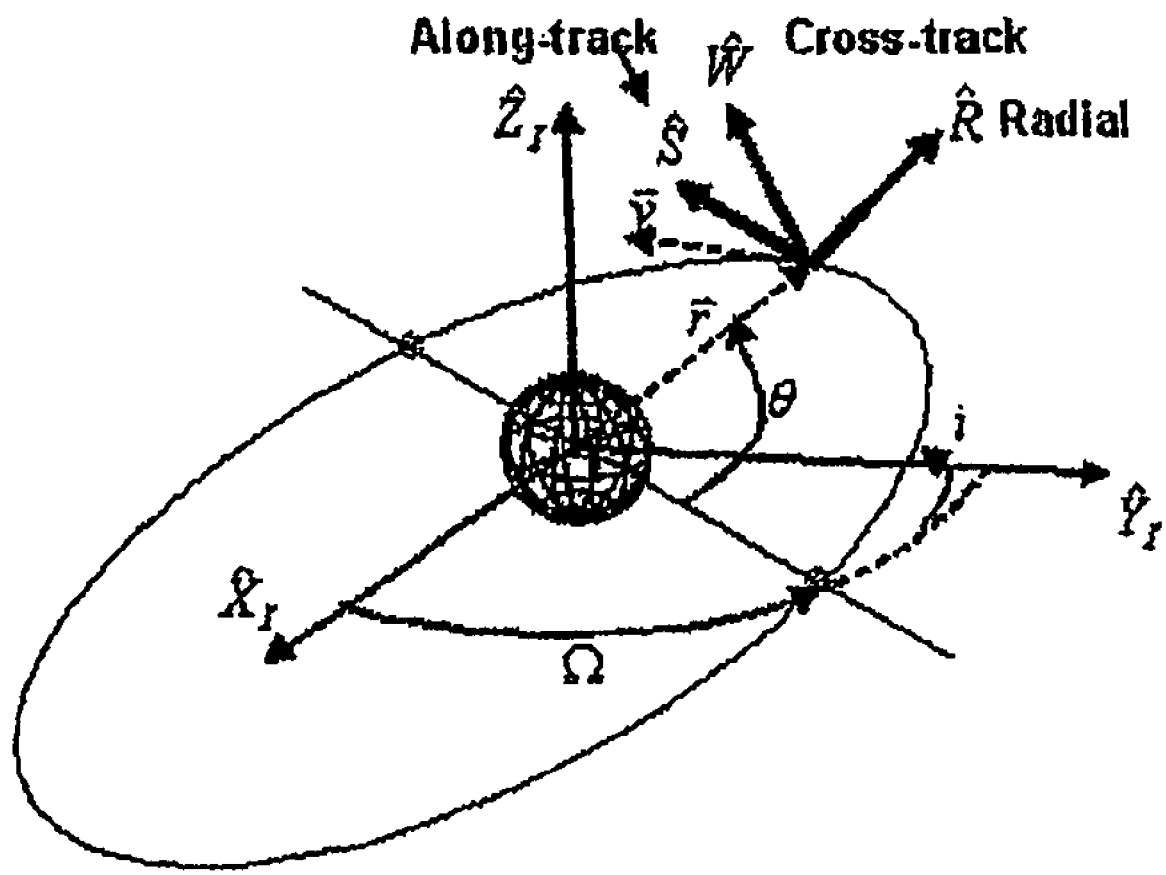
Figure A.5. Satellite Coordinate System.

SYSTEM AND METHOD FOR MODEL-BASE COMPRESSION OF GPS EPHEMERIS

RELATED APPLICATIONS

This application is related to and hereby claimed the benefit of the filing date of a provisional patent application by the same inventors Professor James L. Garrison and Ms. Brenda E. Eichel, which application is entitled SYSTEM AND METHOD FOR MODEL-BASED COMPRESSION OF GPS EPHEMERIS, Ser. No. 60/775,044, filed Feb. 21, 2006, hereby incorporated in its entirety by reference.

FIELD OF THE INVENTION

The present invention relates to a system and method of providing global satellite positioning of a device. More specifically, the present invention relates to a system and method of providing navigation or positioning using a global positioning system (GPS) receiver under conditions for which the broadcast data message can not be decoded.

BACKGROUND OF THE INVENTION

Satellite communication is widely used to provide communication in a variety of commercial and consumer arenas. For example, satellite communication is widely used for telephone communication, television transmission and reception as well as internet service.

Recently, government requirements have been made to provide a system of providing the location of telephone communications under an enhanced 911 system. Under this system as to land telephone lines the provider provides systems and software capable of determining the position from which the call is made in order that emergency services can be provided. Similarly enhanced 911 requirements are now being imposed which require the providers of cellular telephone service to provide a location from which the cellular telephone call has been made. Such systems rely on positioning systems to determine the location of the cellular phone.

Global Positioning Satellite (GPS) systems have been widely used since the 1980's to provide positioning information to a receiver for commercial utilization within the United States. Such global positioning systems are used elsewhere in the world and, for example, Russia operates a similar system (GLONASS) and the European Union is developing a third system "Galileo".

GPS systems use a combination of orbiting satellites and land stations to communicate with a receiver to provide signals which may be utilized to determine the position of the receiver. Such global positioning systems are widely used for a variety of commercial purposes including providing vehicular travel location assistance, common surveying systems, a variety of agricultural and commercial applications, and/or military usage.

GPS receivers normally determine their position by computing relative times of arrival of signals transmitted simultaneously from a multiplicity of GPS (or NAVSTAR) satellites. These satellites transmit, as part of their message, both satellite positioning data, as well as, data on clock timing, so called (EPHEMERIS data). Ephemeris data provides the location or positioning of a satellite at a particular time, as well as, the positions at later times for the satellite. The process of sending and acquiring GPS signals, processing ephemeris data for a multiplicity of satellites and computing the location of the receiver from this data is time consuming, requiring at least 30 seconds for a given satellite to broadcast its complete ephemeris. In many cases, this lengthy process time is unacceptable, and furthermore, greatly limits battery life in microminiaturized portable applications.

For receivers that are small, widely used, and relatively inexpensive, for example cellular phones, the requirements under the enhanced 911 system include that the cellular phones provide global positioning system information. This lengthy processing time becomes extremely difficult when using this method of providing telephone transmission positions using global positioning systems in cellular telephone applications. The enhanced 911 requirement requires that the global positioning position for Network Based Solutions be within 100 meters for 67% of calls.

One limitation of current GPS receivers is that their operation is limited to situations in which multiple satellites are clearly in view without obstructions, and/or a good quality antenna is properly positioned to receive such signals. As such, they normally are unsuitable in portable body mount applications; in areas where there is significant foliage or building blockage; and in building applications.

There are two principle functions of global satellite receiving systems; 1) computation of pseudoranges to the various GPS satellite, and 2) computation of the position of the receiving platform using these pseudoranges and satellite timing and is extracted from the global positioning system satellite signal once it has acquired and tracked. Collecting this information normally takes a relatively long time (from 30 seconds to several minutes) and must be accomplished with a good received signal level in order to achieve low error rates.

Virtually all known GPS receivers utilize correlation methods to compute pseudoranges. These correlation methods are performed in real time often with hardware correlators. GPS signals contain high rate repetitive signals called pseudorandom or (PN) sequences. The codes available for PN applications are in the range of 0.1 millisecond. The code sequences belong to a family known as GOLD codes. Each GPS satellite broadcast has a signal with a unique GOLD code.

For signal received from a given GPS satellite, following a down conversion process to base band, correlation receivers multiply the received signal by a stored replica of appropriate GOLD code contained within its local memory and then integrates or low pass filters the product to obtain an indication of the presence of the signal. This process is termed a correlation operation. By subsequently adjusting the relative timing of this (acquisition). Once acquisition occurs, the process enters (tracking) phase in which the timing of the local reference is adjusted in small amounts to maintain a high correlation output. The correlation output during the tracking period may be viewed as the GPS signal with the pseudorandom code removed or in common terminology (despread). This signal is low band with band width commensurate with a 50 bit per second binary phase shift key signal data which is superimposed on the GPS waveform.

The GPS System is a satellite based navigation system made up of a network of 24 satellites that was developed by the US Department of Defense. It was originally intended primary for the US military to provide precise position, velocity, and time. Civilian use of GPS became available in 1980's. At the time, GPS became popular for use with civilian aircraft and surveying. Through the 1990's civil applications of GPS application grew at an astonishing rate. Today, GPS has found uses in many applications such as land transportation, civil aviation, maritime.

GPS navigation essentially involves solving for unknown receiver positions $(Xr, Yr, Zr)$ and clock bias $Ct_{br}$, given measurements of pseudorange, ρ and correction terms for satellite clock bias and atmospheric effects.

The pseudorange is defined as the measured signal transit time multiplied by the speed of light in a vacuum. The measurement made by the GPS receiver is the apparent transit time of a signal from each satellite to the receiver. This is determined as the difference between the time the signal was received otherwise known as a pseudorange. In addition to the pseudorange, the satellite position (XS,YS, ZS) is required to solve the non linear systems of equations as shown as equation 1.1 below:

$$\rho^1 = \sqrt{(X_r - X_s^1)^2 + (Y_r - Y_s^1)^2 + (Z_r - Z_s^1)^2} + ct_{b,R}$$

$$\rho^2 = \sqrt{(X_r - X_s^2)^2 + (Y_r - Y_s^2)^2 + (Z_r - Z_s^2)^2} + ct_{b,R}$$

$$\rho^n = \sqrt{(X_r - X_s^n)^2 + (Y_r - Y_s^n)^2 + (Z_r - Z_s^n)^2} + ct_{b,R} \quad (1.1)$$

The pseudorange in equation 1.1 represents a measurement that has already been corrected for the satellite clock bias in atmospheric effects. Where the super script refers to the satellite number, a minimum of four satellites are required to solve the receiver position and clock bias. Each satellite broadcasts a signal that has encoded ephemeris data about its own position an a lower-precision almanac which describes the orbits of all the satellites in the SPC constellation.

Conventional GPS receivers require time to acquire and lock onto the satellite signals. Once locked, the receiver downloads the almanac and ephemeris data from the signal. The process of downloading the ephemeris takes around 30 seconds. A high signal strength is necessary to decode the ephemeris at a sufficiently low bid error rate (BER) to allow calculation of the satellite position. Any severe attenuation of the signal can cause loss of lock and the signal will need to be re-acquisitioned.

Presently signal processing techniques exist, which allow the tracking of the GPS signal (and hence, the generation of the pseudorange measurements ρ above) at very low signal to noise ratios, $C/N_o$. The $C/N_o$ is the ratio of the power in the receive signal [dB-W] to the power in the competing noise [dB-W/$H_Z$].

Current research has shown that tracking is possible with $C/N_o$ as low as 15 dB-$H_Z$ [38-40]. At such signal strength, the BER may be too low to reliably decode the data message and extract the satellite ephemeris, although the tracking will allow generation of pseudorange measurements. Also many weak signal tracking acquisition methods use a software receiver approach in which a segment of the ephemeris data is buffered into memory. The 30 seconds of data containing the ephemeris message may be too long to completely load into memory.

Providing satellite position information with a sufficient accuracy has been difficult with prior systems under conditions in which the $C/N_o$ ratio is below the minimum threshold which is around 27 dB-$H_Z$, for decoding the message. Therefore in the event that new ephemeris data can't be downloaded from the broadcast signal, the user may still compute their position within a desired accuracy for an extended period of time.

The motion of planets, as well as those of satellites, was first empirically modeled by Johannes Kepler in the early 17th century. From this model became Kepler's three laws of planetary motion, the first of which is that all planets move in an elliptical orbit having the sun about which they rotate as one focus [known as the law of orbits]. The second law is that a line joining any planet to the sun sweeps out equal areas in equal times [known as the law of areas]. The third law is that the square of the period of any planer about the sun is proportional to the cube of the planet's mean distance from the sun [known as the law of periods]. Mathematical models of orbiting of satellites are based on these well established principals.

The current GPS navigation message is comprised of quasi-Keplerian parameters and accounts for perturbations in several elements. These parameters can be used to compute each satellite position in the World Geodetic Survey of 1984 (WGS84) frame which is the Earth Centered Earth Fixed (ECEF) frame implemented by GPS. This element set is presented in Table 1.1 below.

TABLE 1.1

Current Ephemeris Parameters in the GPS Navigation Message

| Parameter | Description |
|---|---|
| $t_{oe}$ | ephemeris reference time |
| $\sqrt{a}$ | square root of the semi-major axis |
| e | eccentricity |
| $i_0$ | inclination angle at the reference time |
| $\Omega_0$ | longitude of the ascending node at the beginning of the GPS |
| ω | argument of perigee |
| $M_0$ | mean anomaly at reference time |
| Δn | correction to the computed mean motion |
| i | rate of change of inclination with time |
| Ω | rate of change of RAAN with time |
| $C_{uc}, C_{us}$ | amplitudes of harmonic correction terms for the computed argument of latitude |
| $C_{rc}, C_{rs}$ | amplitudes of harmonic correction terms for the computed orbit radius |
| $C_{ic}, C_{is}$ | amplitudes of harmonic correction terms for the computed inclination angle |

The harmonic terms account for perturbations at twice the orbit period and help compensate for some of the gravity effects due to low order Earth gravity harmonics. The fit interval for these elements is typically four hours, but they are updated every two hours to allow for a two hour overlap. The accuracy during this fit interval is, on the range, of around two to five meters. Outside of this four hours, the curve fit degrades quickly due to higher order Earth gravity harmonics, solar pressure, and third body perturbations.

The Russian counterpart to GPS is the Global Navigation Satellite Systems (GLONASS) which uses a Cartesian ephemeris format depicted on Table 1.2 below:

TABLE 1.2

Current Ephemeris Parameter in the GLONASS Navigation Message

| Parameter | Description |
|---|---|
| x, y, z | satellite position in PZ90 reference frame |
| $\dot{x}, \dot{y}, \dot{z}$ | satellite velocity in PZ90 reference frame |
| $\ddot{x}, \ddot{y}, \ddot{z}$ | luni-solar acceleration in PZ90 reference frame |
| $t_e$ | reference time |

The GLONASS system uses a similar ECEF frame as the WGS84 frame implemented by GPS. The GLONASS Parametry Zemli 1990 (PZ90) frame adopts a different set of defining parameters than WGS84 and therefore these two frames vary slightly. A conversion between these two frames is provided in Appendix A herein. The GLONASS standard fit interval is 30 minutes and achieves comparable accuracy as the GPS 4 hour fit ephemeris. Similar to the GPS ephemeris, the curve fit degrades quickly outside of this interval.

The U.S. Space Command uses the NORAD 2-line elements which are used to maintain and catalogue orbit data on all space projects. See Table 1.3 below:

TABLE 1.3

NORAD 2-line elements

| Parameter | Description |
|---|---|
| $\bar{n}$ | mean motion |
| e | eccentricity |
| i | inclination |
| Ω | right ascension of the ascending node |
| ω | argument of perigee |
| M | mean anomaly |
| $\dfrac{\dot{n}}{2}$ | first derivative of mean motion divided by 2 |
| $\dfrac{\ddot{n}}{6}$ | second derivative of mean motion divided by 6 |
| B* | drag parameter |
| UTC | epoch |

Table 1.3 outlines the elements of this set. The elements in this set are mean Keplerian elements which are obtained by removing the periodic variations from precise numerically integrated trajectories. These element sets provide similar accuracy to the GPS broadcasted almanac data which is on the order of kilometers.

This element set alone would not provide the accuracy needed for navigation and any equipment using this format to propagate the satellite orbits would need to know exactly how the perturbations were removed such as not to add additional error to the element fit The GPS and GLONASS systems are limited in that they can't predict well outside their fit intervals and they have increasing fit errors for extended fit intervals. Keplerian based elements generally describe the perturbations to a satellite orbit better than quickly changing position and velocity vectors. A longer propagating element set would modify the current GPS ephemeris to account for higher order gravity harmonics and third body perturbations.

A popular solution for aiding E911 is referred to as assisted GPS. Assisted GPS is a method of assisting a cellular device with positioning capabilities to fit their location. This technology uses the base stations in the cellular network as well as a remote server. The cellular device will initiate a request for location information. The nearest cell tower will gather information from the remote server about which satellites should be in view. Satellite information and ranging measurements taken from the cellular network are sent to a remote server. The cellular device coordinates are either sent back to the handset or to the LBS server. This method allows most of the computation to be done at the remote server, which has higher processing capabilities and therefore can compute the handset position much quicker. This, however, requires a near real time communication link.

A need therefore exists to determine an element set that can propagate longer into the future with an accuracy applicable to meet the needs of enhanced 911 and location based services. Further, there is a need to provide a system that requires minimal data storage and may propagate with low cost on board processing. In addition, a system is required that would not need to implement a separate tracking system but utilize readily available tracking data. The present invention is adapted to address at least some of the aforementioned problems with the prior art

SUMMARY OF THE INVENTION

According to the present invention, a system providing a set of data, known as an ephemeris, that defines the position and velocity of a satellite in orbit is provided. The method includes an algorithm that is realized in, for example, software. Some components of the software may be positioned on a base station or server. Other components may be positioned in a data format for the transmission of the ephemeris from the base station to the satellite navigation receiver as part of the standard GPS navigation algorithms, to solve for the receiver position.

In conventional practice an ephemeris is broadcast from the GPS satellites. At times the signals from the GPS satellite are too weak to allow for accurate decoding of the broadcast ephemeris, but the receiver may still track the satellites.

Without the ephemeris, however, the receiver is not able to make use of this tracking data in computing its position. The broadcast ephemeris is only accurate for a short period. For example, about four hours, so that it must be continuously updated. The broadcast ephemeris may be used to generate a pre-computation of an ephemeris. The pre-computed ephemeris may remain sufficiently accurate for 24-48 hours and a transmission or download of this ephemeris may be made to a receiver independent of the signal transmitted by the GPS satellite.

The present invention may be utilized on any use of a GPS navigation in which the full broadcast ephemeris may not be downloaded. It may be used in conjunction with a weak signal tracking technology as covered by U.S. patent application Ser. No. 11/087,065, filed Oct. 20, 2005, Publication No. 2005/0232338 published Oct. 20, 2005, entitled "Method and Apparatus for Detecting and Processing GPS Signals" (hereby incorporated by reference in its entirety) for example, cellular telephones for E-911 or location based services.

The systems and methods of the present invention may be utilized in receivers which must obtain a position rapidly with a short segment of data, for example in less than the 30 seconds or more which may be required to download a new ephemeris.

The method and systems of the present invention may be utilized to provide rapid initialization for cold start of receivers without prior ephemeris or almanac data.

The method and systems and algorithms of the present invention provides for a longer propagating ephemeris that may reduce the frequency of uploaded data.

The method and systems of the present invention may be used to provide a solution for a requirement of uploading every few days and which would define secular and periodic terms. The new ephemeris format consists of fits of each series of the periodic terms. A least squares fit is utilized to provide the ephemeris in which the satellite position is a function of series coefficients. The numerical values of each of the coefficients may be found from a least squares fit to a specific set of NGS orbit data. The method and systems of the present inventions utilize the coefficients generated from the least squares fit to reproduce orbit positions over a subsequent segment of data. This segment of data is used within the desired accuracy to obtain the positional accuracy required for the application.

According to an embodiment of this invention a method for propagating ephemeris data for a satellite in Earth orbit is provided. The method includes the steps of receiving orbital positional data for a first epoch of a satellite's Earth orbit, propagating orbital positional data for the satellite's Earth orbit during a second time period extending beyond the first time period, fitting a Keplerian ephemeris model to the propagated orbital positional data to estimate model coefficients, and sending the estimated model coefficients to receivers for determination of receiver position at a time during the second time period.

The system and method of the present invention provides for the use of post processed global positioning satellite position data that is provided by an orbit service such as International GNSS Service (IGS) as the measurement source.

The system and method of the present invention further provides for a model to fit an empirical model of the ephemeris to date in, for example, two stages. The first of these stages including periodic disturbances that are assumed to occur at harmonics of the argument of latitude (the orbit angle measured relative to the Earth). In an Earth—fixed reference frame and an argument of latitude is used as the independent variable. Second, the disturbances which are not synchronized with argument of latitude are estimated in an RSW (radial, along track, cross track) reference frame which rotates with the orbiting satellite, and time as an independent variable.

According to another aspect of the present invention a system and method is provided which utilizes Fourier analysis to determine the fundamental orbit frequency, of the argument of latitude versus time, and then for all the frequencies of the RSW residuals vs. time in the second fit.

The algorithm involved in the method and system of the present invention may include a segments of precise global positioning satellite orbit data. The positions of the satellite, in an Earth Center Earth Fixed (ECEF) reference frame, are obtained from sources such as an International GNSS Service (IGS) when new data becomes available. The steps of the algorithm also include an orbit propagation code, such as GYPSY-OASIS from JPL or Microcosm, to propagate these precise GPS measurements as far into the future as needed, typically one week or less.

The steps of the algorithm further include computing velocities of the satellite by solving Lambert's problem, use any of commonly known methods. The steps of the algorithm further include computing the argument of latitude from the positions in the ECEF reference frame provided from IGS and the velocities computed using Lambert's problems.

The steps of the algorithm further include applying the Fast Fourier Transformer (FFT) to a long time series of argument of latitude data (for example about one month) and the frequency $f_\theta$ is found from the peak in the FFT. The steps of the algorithm further include providing model equations as defined in equation 3.9 and fitting the equations to a segment of the propagated orbit—typically 24 to 48 hours worth of the model equations). Such modeling is done using a standard method of batch orbit determination as described in TAPLEY SCHUTZ and BORN *Statistical Orbit Determination*, ELSEVIER, 2004. The results of this equation produce estimates for the determinations of the coefficients βI in equation 3.9.

The algorithm used in the system of the present invention further include computing the residuals between the model defined in equations 3.9 and the propagated satellite position data from the precise orbits in the ECEF reference frame.

The algorithm used in the system of the present invention further includes the step of transforming the residuals into the Radial-Along Track-Cross Track reference frame, which rotates with the satellite.

The algorithm used in the system of the present invention further includes the step of applying an FFT to longer sets of the residuals from the Radial-Along Track-Cross Track reference frame accumulated over many of the 24-48 hour periods and the five frequencies of $f_{R1}$ $f_{R2}$, $f_{S1}$, $f_{S2}$ and $f_{W1}$ which are the frequencies found for the peak in the FFT.

The algorithm for use in the method and system of the present invention further includes the step of fitting the model defined by equation 6.4 to the residuals computed in the transforming of the radial along cross track reference frame. This fit determines the alpha coefficients ($\alpha_i$) in equation 6.4.

The algorithm for use in the method and system of the present invention further includes the step of transmitting the setup parameters defined in Table 6.1 by for example, by some means to the receiver. Such means may include a radio link, through the cellular network, or by downloading the data to a receiver, from a computer.

The algorithm for use in the method and system of the present invention may further include the step of, when the satellite position is required, recovering the data from 6.1 and applying the algorithm defined in equations 6.2, 6.3, 6.4, 6.5, 6.6 and 6.7 to compute the satellite position in the ECEF reference frame.

According to an embodiment of this invention a method for propagating ephemeris data for a satellite in Earth orbit is provided. The method includes the steps of receiving orbital positional data for a first time period of a satellite's Earth orbit, propagating orbital positional data for the satellite's Earth orbit during a second time period extending beyond the first time period, fitting a Keplerian ephemeris model to the propagated orbital positional data to estimate model coefficients, and sending the estimated model coefficients to receivers for determination of receiver position at a time during the second time period.

According to an aspect of the present invention, the model fitting step of the method for propagating ephemeris data also includes the steps of generating velocity vectors for satellite positions in the first and the second time period and generating arguments of latitude for the satellite positions from the orbital positional data for the satellite positions and the generated velocity vectors for the satellite positions.

According to another aspect of the present invention, the reception of orbital positional data of the method for propagating ephemeris data also includes the step of receiving orbital positional data for a satellite from a previously generated precise ephemeris source, such as the International GNSS Service (IGS).

According to another aspect of the present invention, the method for propagating ephemeris data includes the step of determining a dominant frequency for a long time series of the generated arguments of latitude.

According to another aspect of the present invention, the method for propagating ephemeris data includes the step of determining a dominant frequency includes applying sinusoidal estimation to the long time series of generated arguments of latitude to identify the dominant frequency.

According to another aspect of the present invention, the step of determining a dominant frequency includes applying Fourier transform to the long time series of generated arguments of latitude to identify the dominant frequency According to another aspect of the present invention, the method for propagating ephemeris data further includes the step of fitting a Keplerian model to the propagated orbital positional data to determine estimates for the model coefficients.

According to another aspect of the present invention, the model coefficient estimation step includes iteratively adjusting a state vector for the set of Keplerian elements that has of argument of latitude, true anomaly, argument of perigee, semi-major axis, eccentricity, inclination, and right ascension of the ascending node until an error term is less than a threshold.

According to another aspect of the present invention, the step of sending of the model coefficients of the method for propagating ephemeris data includes sending a mean value, secular rate, and periodic terms of harmonic frequencies for each of the argument of latitude, true anomaly, argument of perigee, semi-major axis, eccentricity, inclination, and right ascension of the ascending node, sending a constant mean value for the argument of perigee, and sending the secular rate and the periodic terms for the argument of latitude for an expansion of true anomaly.

According to another aspect of the present invention, the method for propagating ephemeris data further includes the step of computing fit residuals between the Keplerian model and the propagated orbital positional data in an Earth centered reference frame, and transforming the fit residuals to a satellite centered reference frame.

According to another aspect of the present invention, the method for propagating ephemeris data further includes the step of fitting a periodic positional model to the computed fit residuals to determine estimates for coefficients of the periodic positional model and sending the estimated coefficients for the periodic positional model with the model coefficients for the Keplerian model.

According to another aspect of the present invention, the method for propagating ephemeris data further includes the step of applying a Fourier transform to a set of computed fit residuals to determine dominant frequencies for the set of computed fit residuals and sending the dominant frequencies for the computed fit residuals with the estimated coefficients for the periodic positional model and the model coefficients for the Keplerian model.

According to another aspect of the present invention, the method for propagating ephemeris data further includes the step of sending an ephemeris reference time and a sidereal time at the reference time with the dominant frequencies for the computed residuals, the estimated coefficients for the periodic positional model, and the Keplerian model coefficients.

According to an embodiment of this invention a reference station for providing compressed data to represent a propagated ephemeris is provided. The reference station includes a receiver for receiving orbital positional data for a first epoch of a satellite ephemeris, an orbit propagator for propagating orbital positional data for a second epoch of an ephemeris for the satellite corresponding to the received orbital positional data, an ephemeris compressor for fitting an ephemeris format to the propagated orbital positional data of the second epoch to generate compressed data for representing the second epoch of the satellite ephemeris, and a transmitter for sending the compressed data to satellite receivers for computing a receiver location from a satellite position represented by the compressed data.

According to another aspect of the reference station of the present invention, the ephemeris compressor includes a Keplerian compressor for fitting a Keplerian ephemeris model to the propagated orbital positional data to generate estimated Keplerian model coefficients.

According to another aspect of the reference station of the present invention, the ephemeris compressor includes a positional residual generator for computing fit residuals between the Keplerian ephemeris model and the propagated orbital positional data in an Earth centered reference frame, a frame of reference transformer for transforming the computed fit residuals to a satellite reference frame, and a positional residual compressor for fitting a periodic positional model to the computed fit residuals to generate estimates for coefficients of the periodic positional model.

According to another aspect of the reference station of the present invention, the receiver includes access to a source providing orbital positional data received from the satellites.

According to another aspect of the reference station of the present invention, the source is International GNSS Service.

According to yet another embodiment of this invention, a method for reacting to planned satellite maneuvers is provided. The method includes the steps of receiving notification of planned satellite maneuvers from public or private sources including the government, deleting ephemerides generated for satellites for time subsequent to the time of a planned maneuver, and generating a warning message to be distributed with the ephemerides that indicates that time of a planned maneuver.

According to another embodiment of this invention, a method for verifying that satellite maneuvers would not affect the navigation of a navigation receiver is provided. The method includes the steps of receiving notification of transmitted time of planned satellite maneuvers from public or private sources including the government, comparing the transmitted time of planned satellite maneuvers to time that satellites are used in navigation, and verifying that the transmitted time of planned satellite maneuvers is not prior to the time that satellites are used in navigation and will not affect the navigation of a navigation receiver.

According to yet another embodiment of this invention, a method for receiving ephemeris data for a satellite in Earth orbit at a navigation receiver is provided. The method includes the steps of receiving estimated model coefficients of orbital positional data for a second time period of a satellite's Earth orbit, the second time period extending beyond a first time period, the estimated model coefficients based on propagating orbital positional data for the first time period of a satellite's Earth orbital positional data, the model coefficients obtained from fitting a Keplerian ephemeris model to the propagated orbital positional data to estimate the model coefficients and determining the receiver position at a time during the second time period, based at least partially on the estimated model coefficients.

According to another aspect of the present invention, the estimated model coefficients are defined by the dominant frequencies in argument of latitude and time to compute the position of a GPS satellite at a requested time, t, in at least one of the ECI and the ECEF reference frame.

According to another aspect of the present invention, the step of computing of the position of the GPS satellite is based on using equations:

$$t_k = t - t_{oe} \qquad (6.1)$$

$$\theta^* = \beta_{19} + \beta_{20} t_k + \beta_{21} \cos(2\pi f_\theta \cdot t_k) + \beta_{22} \sin(2\pi f_\theta \cdot t_k)$$

$$\omega = \beta_{23}$$

$$\theta = \omega + \theta^*$$

$$\alpha = \beta_1 + \beta_2 \theta + \beta_3 \cos(2\theta) + \beta_4 \sin(2\theta)$$

$$e = \beta_5 + \beta_6 \theta + \beta_7 \cos(\theta) + \beta_8 \sin(\theta) + \beta_9 \cos(3\theta) + \beta_{10} \sin(3\theta)$$

$$i = \beta_{11} + \beta_{12} \theta + \beta_{13} \cos(2\theta) + \beta_{14} \sin(2\theta)$$

$$\Omega = \beta_{15} + \beta_{16} \theta + \beta_{17} \cos(2\theta) + \beta_{18} \sin(2\theta) \qquad (6.2)$$

$$r = \frac{a(1-e^2)}{1+e\cos(\theta^*)} \qquad (6.3)$$

$\delta r = \alpha_1 \cos(2\pi t_k f_{R1}) + \alpha_2 \sin(2\pi t_k f_{R1}) + \alpha_3 \cos(2\pi t_k f_{R2}) + \alpha_4 \sin(2\pi t_k f_{R2})$ $\delta s = \alpha_5 \cos(2\pi t_k f_{S1}) + \alpha_6 \sin(2\pi t_k f_{S1}) + \alpha_7 \cos(2\pi t_k f_{S2}) + \alpha_8 \sin(2\pi t_k f_{S2})$ $\delta\omega = \alpha_9 \cos(2\pi t_k f_{W1}) + \alpha_{10} \sin(2\pi t_k f_{W1}) \qquad (6.4)$ $h_{1,1} = \cos(\Omega)\cos(\theta) - \sin(\Omega)\cos(i)\sin(\theta)$ $h_{1,2} = -\cos(\Omega)\sin(\theta) - \sin(\Omega)\cos(i)\cos(\theta)$ $h_{1,3} = \sin(\Omega)\sin(i)$ $h_{2,1} = \sin(\Omega)\cos(\theta) + \cos(\Omega)\cos(i)\sin(\theta)$ $h_{2,2} = -\sin(\Omega)\sin(\theta) + \cos(\Omega)\cos(i)\cos(\theta)$ $h_{2,3} = -\cos(\Omega)\sin(i)$ $h_{3,1} = \sin(i)\sin(\theta)$ $h_{3,2} = \sin(i)\cos(\theta)$ $h_{3,3} = \cos(i) \qquad (6.5)$ $X_{ECI} = (r+\delta r)h_{1,1} + \delta s h_{1,2} + \delta\omega h_{1,3}$ $Y_{ECI} = (r+\delta r)h_{2,1} + \delta s h_{2,2} + \delta\omega h_{2,3}$ $Z_{ECI} = (r+\delta r)h_{3,1} + \delta s h_{3,2} + \delta\omega h_{3,3} \qquad (6.6)$ The technical advantages of the present invention include the fact that real time connection between receiver and the base station is not required. In other words, data can be uploaded 24 hours or more ahead of the connection. For example, according to an aspect of the present invention, a reference station for providing a representation of a propagated ephemeris is provided. The reference station includes a receiver for receiving orbital position data from a first epoch of a satellite ephemeris, a orbit propagator for propagating orbital positional data for a second epoch, an ephemeris compressor for fitting the ephemeris format to the propagated orbital positional data of the second epoch to generate compressed data for representing the second epoch of the satellite ephemeris, and a transmitter for sending the compressed data to satellite receivers for computing a receiver location. Thus, the present invention provides for the ability to provide orbital positional data that may be obtained for a real time connection between the receiver and the base station.

The technical advantages of the present invention further include the ability to provide for a satellite receiving system in which computational requirements on the receiver are low and in which no numerical integration or other computationally intensive algorithm may be required on the receiver. For example, according to another aspect of the present invention, a reference station for providing compressed data to represent a propagated ephemeris is provided. The reference station includes a receiver for receiving orbital positional data for a first epoch of a satellite ephemeris an orbital propagator for propagating orbital positional data for a second epoch of an ephemeris of the satellite corresponding to the received orbital position, an ephemeris compressor for fitting the ephemeris format to the propagated orbital positional data the second epoch to generate compressed data in a transmitter for sending the compressed data to satellite receivers computing a receiver location from a second position represented by the compressed data. Thus, the present invention provides for a satellite reference station system in which computational requirements on the receiver are low.

The technical advantages of the present invention further include the ability to provide a satellite system which uses GPS orbital data that is currently provided and publicly available and requires no additional tracking network. For example, according to another aspect of the present invention, a reference station for providing compressed data to represent a propagating ephemeris is provided. The reference station includes a receiver for receiving orbital position data from a first epoch of a satellite ephemeris, an orbital propagator for propagating orbital position data for a second epoch of the ephemeris data, an ephemeris compressor for fitting the format, and a transmitter for receiving the compressed data. The orbital positional data for the first epoch is in the form of publicly available information which is further processed. Thus the present invention provides a global positioning system which uses orbit data that is publicly available and currently produced.

The technical advantages of the present invention further include the ability to provide a reference station with which data volume is small. For example, according to another aspect of the present invention, a reference station is provided for providing compressed data to represent a propagated ephemeris including a receiver for receiving orbital positional data for a first epoch of a satellite ephemeris. The reference station also includes an orbit propagator for propagating orbital positional data for a second epoch of an ephemeris of a satellite corresponding to the received orbital positional data and an ephemeris compressor for fitting the ephemeris format to the propagated orbital positional data of the second epoch to generate a compressed data for representing the second epoch of the satellite ephemeris and a transmitter for sending the compressed data. The ephemeris compressor is configured to provide the information utilizing minimal data by selecting those parameters that have greater effect and not processing the data that has lesser effect. Thus, the present invention provides for a satellite system for which the data volume required is small.

These and other objects of the invention will become apparent upon consideration of the following written description taken together with the accompanying figures.

BRIEF DESCRIPTION OF THE DRAWINGS

The accompanying drawings illustrate various embodiments of the present invention and together with a description serve to explain the principles of the invention. In the drawings:

FIG. 1 shows an exemplary embodiment of a processing arrangement that carries out the various computational and/or software functions described herein;

FIG. 2.1 is a schematic view of an area swept out by a satellite during data transfer;

FIG. 2.2 is a schematic view of the path of a satellite about the Earth and the satellite geometry coordinates;

FIG. 2.3 is a graphical display of osculating semi-major axis for I day, 1 week, 1 month and 6 months;

FIG. 2.4 is a graphical display of osculating eccentricity axis for I day, 1 week, 1 month and 6 months;

FIG. 2.5 is a graphical display of osculating inclination for I day, 1 week, 1 month and 6 months; is a graphical display of FIG. 6 is a graphical display of osculating semi-major axis for I month;

FIG. 2.6 is a graphical display of osculating right ascension with J2 secular trend removed for I day, 1 week, 1 month and 6 months;

FIG. 2.7 is a graphical display of osculating argument of perigee for I day, 1 week, 1 month and 6 months;

FIG. 2.8 is a graphical display of osculating true anomaly with J2 secular trend removed for I day, 1 week, 1 month and 6 months;

FIG. 2.9 is a graphical display of osculating argument of latitude with J2 secular trend removed for I day, 1 week, 1 month and 6 months;

FIG. 3.1 is a graphical display of detrended semi-major axis;

FIG. 3.2 is a graphical display of detrended eccentricity;

FIG. 3.3 is a graphical display of detrended inclination;

FIG. 3.4 is a graphical display of detrended right ascension;

FIG. 3.5 is a graphical display of detrended argument of perigee;

FIG. 3.6 is a graphical display of detrended true anomaly;

FIG. 3.7 is a graphical display of detrended argument of latitude;

FIG. 3.8 is a graphical display of FFT of detrended semi-major axis;

FIG. 3.9 is a graphical display of FFT of detrended eccentricity;

FIG. 3.10 is a graphical display of FFT of detrended inclination;

FIG. 3.11 is a graphical display of FFT of detrended right ascension;

FIG. 3.12 is a graphical display of FFT of detrended argument of perigee;

FIG. 3.13 is a graphical display of FFT of detrended true anomaly;

FIG. 3.14 is a graphical display of FFT of detrended argument of latitude;

FIG. 4.1 is a plan view showing linearization about a reference trajectory;

FIG. 4.2 is a flow chart of a batch processor algorithm;

FIG. 4.3 is a continuation of the flow chart of the batch processor algorithm of FIG. 4.2;

FIG. 4.4 is a flow chart of another batch processor algorithm;

FIG. 4.5 is a continuation of the flow chart of the batch processor algorithm of FIG. 4.4;

FIG. 5.1 is a graphical display of position residuals for 24 hour fit in the ECEF frame;

FIG. 5.2 is a graphical display of position residuals for 72 hour fit in the ECEF frame;

FIG. 5.3 is a graphical display of position residuals for 120 hour fit in the ECEF frame;

FIG. 5.4 is a graphical display of position residuals for 168 hour fit in the ECEF frame;

FIG. 5.5 is a graphical display of FFT of position residuals for several fit intervals;

FIG. 5.6 is a graphical display of $2^{nd}$ fit position residuals for 24 hours in ECEF frame;

FIG. 5.7 is a graphical display of $2^{nd}$ fit position residuals for 72 hours in ECEF frame;

FIG. 5.8 is a graphical display of $2^{nd}$ fit position residuals for 120 hours in ECEF frame;

FIG. 5.9 is a graphical display of $2^{nd}$ fit position residuals for 168 hours in ECEF frame;

FIG. 5.10 is a graphical display of residuals between final and ultra rapid IGS products in ECEF frame;

FIG. 5.11 is a graphical display of residuals between final and ultra rapid IGS products;

FIG. 5.12 is a graphical display of residuals using ultra rapid IGS products in ECEF frame;

FIG. 5.13 is a graphical display of residuals between CODE predicted orbits and rapid products in ECEF frame;

FIG. 5.14 is a graphical display of $2^{nd}$ fit position residuals for 24 hours in ECEF frame;

FIG. 5.15 is a graphical display of $2^{nd}$ fit position residuals for 72 hours in ECEF frame;

FIG. 5.16 is a graphical display of $2^{nd}$ fit position residuals for 120 hours in ECEF frame;

FIG. 6.1 is a flow diagram of a prototype ground interaction

FIG. 6.2 is a flow chart of a reference station parameter fit;

FIG. 6.3 is a printout of a portion of programming code for GPS operational advisory;

FIG. 6.4 is a schematic view of a system according to an embodiment of the present invention;

FIG. 6.5 is a flow diagram of a method of providing an ephemeris according to another embodiment of the present invention.

FIG. 6.6 is a flow diagram of an exemplary method for reacting to planned satellite maneuvers;

FIG. 6.7 is a flow diagram of an exemplary method for verifying that satellite maneuvers would not affect navigation receiver navigation;

FIG. 6.8 is a flow diagram of an exemplary method for receiving ephemeris data for a satellite.

FIG. 7.1 is a schematic view of a prototype ground interaction;

FIG. 7.2 is a flow chart of a reference station parameter fit;

FIG. A1 is a schematic view of the WGS-84 coordinate system definition;

FIG. A2 is a schematic view of the PZ-90 coordinate system definition;

FIG. A3 is a schematic view of the inertial and WGS-84 reference frames;

FIG. A4 is a schematic view of the equation of the equinoxes; and

FIG. A5 is a schematic view of a satellite coordinate system.

Corresponding reference characters indicate corresponding parts throughout the several views. Like reference characters tend to indicate like parts throughout the several views.

DETAIL DESCRIPTION OF THE INVENTION

Reference will now be made in detail to various presently preferred embodiments of the invention, examples of which are illustrated in the accompanying drawings. In the various FIGS. some of the structures are referenced with similar reference numerals.

FIG. 1 shows an exemplary embodiment of a processing arrangement 10 that carries out the various computational and/or software functions described herein. The processing arrangement 10 includes a processing circuit 12 and a memory 14.

According to the present invention prepositions of receivers of global satellite systems are represented in a compact form which encapsulates the largest perturbations most accurately. The data available from sources that track the historical position of satellites over time may be fitted into a model to determine the future path of the satellite. The inventors have found that the relative disturbances or variations of the path of the satellite also known as perturbations of the satellite path may be measured as an argument of latitude of the satellite as the orbit angle measured relative to Earth and as the other disturbances which are not synchronized with an argument of latitude and time issues as that independent variable.

Archived precise orbits, for example IGS orbit data, may be utilized with a process to calculate velocity vectors corresponding to each position vector given by the IGS data files. Oscillating elements may be calculated and the variation of each element may be shown for several months of data.

The international GNSS service (IGS) is a system of satellite tracking stations, data centers, and analysis centers that combine their resources and permanent GPS station data to generate GPS precise orbit products including historical information of the position at various times of the satellites in the satellite system that composes the GPS system, also known as ephemerides. This service and its resulting tables or products include a high accuracy GPS satellite ephemeris and related information, Earth rotation parameters, coordinates and velocities of the IGS tracking stations, GPS satellite and tracking station clock information, and ionospheric and tropospheric information. The precise GPS ephemeris may be utilized.

The IGS stations provide continuous tracking using high accuracy receivers and high data transformation facilities allowing for daily data transformation to the data centers.

The data centers receive, archive and provide online access to the tracking data as well as to all the IGS products. The analysis centers process the tracking data from one or more data centers. Each of the analysis centers use different software and a unique set of measurements in orbit models to produce weekly solutions. The precise products are formed from the combination of properly weighted results submitted by individual analysis centers. This way the final product benefit in precision, stability, reliability, and robustness compared to the results of any individual analysis center.

There are several different GPS ephemeris products available which include weekly final products, daily final products and sub-daily ultra-rapid products. The IGS daily products (IGS) have the highest precision and are available on a weekly basis with a delay of 13 to 20 days. The IGS rapid products (IGR) are comparable in accuracy to that of the final product and are available on a daily basis 17 hours after the observation day. The IGS Ultra Rapid products (IGU) are available twice a day with reduced accuracy.

Referring now to Table 2.1 below, a depiction of overview of the various impressive products and their respective accuracy is shown.

TABLE 2.1

IGS Ephemeris Products [11]

| Ephemeris | Accuracy | Latency | Updates | Sample Interval |
|---|---|---|---|---|
| Broadcast | 200 cm | real time | — | daily |
| Ultra Rapid | 10 cm | real time | twice daily | 15 mins |
| Rapid | <5 cm | 17 hours | daily | 15 mins |
| Final | <5 cm | 13 days | weekly | 15 mins |

Archive data from prior IGS final orbits are used to provide a model. The files provide 24 hour satellite positions in the WGS84 reference frame (See Appendix A) at 15 minute intervals per each GPS satellite.

To determine the perpetrations present in IGS precise orbits calculations of orbital elements using two body Keplerian techniques and study of their variation is helpful. The corresponding elements which exactly produce the actual position and velocity factors at each incident of time are referred to as oscillating elements. The oscillating elements are the true time-varying orbital elements and they include all periodic and secular effects. Although position and velocity vectors undergo larger changes in time, most of the Keplerian elements undergo small variations in perturbed motion.

It should be appreciated that it is easier to visualize the effects of perturbations in slowly changing variables which reflect the size, shape, and orientation over time. The resulting time series of oscillating elements may be utilized to develop a model to encapsulate the variation each of the orbital elements and therefore, in satellite ECEF positions. The model can then be fit directly to the IGS data without needing to compute the orbital elements.

In order to calculate oscillating elements from the time series IGS positions, the satellite velocities corresponding to each position vector must be known in order to completely define the satellite's state at each time interval. In addition, both vectors must be represented by an inertial reference frame to apply Keplerian two-body techniques.

A method of converting the IGS positions from the WGS84 frame, in which all GPS navigation is performed, to an Earth-centered inertial (ECI) frame is shown in Appendix A attached hereto.

A computation of oscillating orbit elements from a state vector (position and velocity) may be readily obtained. A six-dimensional state vector is needed to completely describe the state (present and future position of the satellite) defined by the 3-dimensional position and velocity vectors. The IGS orbits, however, are described only by the position vector in the ECEF frame. Therefore, prior to computing a set of oscillating elements, it is preferable to find the corresponding velocities at each satellite position.

The problem of determining an orbit connecting two position vectors given the time of flight between them is commonly known in astrodynamics as Lambert's problem. The solution for this research, which is the original method Gauss proposed, is most accurate for small transfer angles such as is the case in GPS satellites which move less than 8° in 15 minutes.

Gauss' solution relates positions at different epochs to their corresponding velocities by incorporating the use of g and f functions. The f and g functions are a common propagation method used in orbital mechanics to relate states at different epochs. The main results, as used in Gauss' solution, of the f and g functions are summarized below. A derivation of Gauss' solution follows the steps used to implement this method.

Before discussing how to solve Lambert's problem, the issue of propagation needs to be discussed. Propagation, which is the ability to find a satellite's future location given the last known position and velocity vectors at a particular instant in time, is a key idea in the development of most solutions to Lambert's problem. One of the most commonly used propagation techniques are the f and g functions. The method associated with these functions allows for multiple propagations from an original epoch using the same functions. The resulting formulations for f and g functions are summarized below.

A complete derivation can be found in Fundamentals of Astrodynamics and Applications, Vallado, D. A., Microcosm Press, El Segundo, Calif., 2001, incorporated hereby in its entirety's by reference.

Given an initial position in velocity, assuming that the new position and velocity are linear combinations of the initial position and velocity, the following equation results:

$$\vec{r} = f\vec{r}_0 + g\vec{v}_0 \quad \vec{v} = \dot{f}\vec{r}_0 + \dot{g}\vec{v}_0 \quad (2.1)$$

Depending on the known information (true, eccentric, or hyperbolic anomaly), these functions can be determined from the conic equations and Kepler's equation. The formulations for true anomaly and eccentric anomaly are summarized as follows:

$$f = 1 - \left(\frac{r}{p}\right)(1 - \cos(\Delta\theta^*)) \qquad g = \frac{rr_0 \sin(\Delta\theta^*)}{\sqrt{\mu p}} \qquad (2.2)$$

$$\dot{f} = \sqrt{\frac{\mu}{p}} \tan\left(\frac{\Delta\theta^*}{2}\right)\left(\frac{1-\cos(\Delta\theta^*)}{p} - \frac{1}{r} - \frac{1}{r_0}\right) \quad \dot{g} = 1 - \left(\frac{r_0}{p}\right)(1 - \cos(\Delta\theta^*))$$

$$f = 1 - \left(\frac{a}{r_0}\right)(1 - \cos(\Delta E)) \quad g = (t - t_0) - \sqrt{\frac{a^3}{\mu}}\,(\Delta E - \sin(\Delta E)) \qquad (2.3)$$

$$\dot{f} = \frac{-\sin(\Delta E)\sqrt{\mu a}}{r_0 r} \qquad \dot{g} = 1 - \left(\frac{a}{r}\right)(1 - \cos(\Delta E))$$

Gauss' solution relies on the area swept out by a satellite during its orbit between two positions. According to Kepler's Law of Areas, a line joining any satellite to the Earth sweeps out equal areas in equal times. This solution assumes that the transfer between the two positions is on an elliptical orbit and works well for small transfer angles due to convergence issues. From Kepler's law, the area swept out by the spacecraft occurs at constant rates. This makes the total area swept out between the two points be defined by the formula:

$$A = \frac{1}{2}\sqrt{\mu p}\,\Delta t \qquad (2.4)$$

Where $\Delta t$ is the time of flight between the two vectors. The area formed by the two vectors and the cord is represented as:

$$A_\Delta = \frac{1}{2} r_0 r \sin(\Delta\theta^*) \qquad (2.5)$$

And illustrated in FIG. 2.1. The parameter $\eta$ is defined by the ratio of these two areas.

$$\eta = \frac{\sqrt{\mu p}\,\Delta t}{r_0 r \sin(\Delta\theta^*)} \qquad (2.6)$$

Gauss' method is based on obtaining two independent equations for $\eta$ in terms of the change in eccentric anomaly. Usually an initial assumption of $\eta=1$ is used in one equation to solve for $\Delta E$. This result is then inputted into the second equation. This process is done iteratively until $\eta$ converges within some pre-described tolerance. This method almost always converges for angles less than 90 degrees.

The semi-parameter, p, at this point is still an unknown and it may be desirable to find an expression for p in terms of the transfer angle and the change in eccentric anomaly. Referring again to the f and g functions, if the two f functions (1 in terms of $\Delta\theta^*$ and the other in terms of $\Delta E$) are equated.

$$1 - \left(\frac{r}{p}\right)(1 - \cos(\Delta\theta^*)) = 1 - \frac{a}{r_0}(1 - \cos(\Delta E)) \qquad (2.7)$$

Then the expression in equation 2.7 could be rearranged to solve for the semi-major axis resulting in the following relation.

$$a = \frac{rr_0}{p}\frac{(1 - \cos(\Delta\theta^*))}{(1 - \cos(\Delta E))} \qquad (2.8)$$

Similarly, if the f functions are equated to get $$\sqrt{\frac{\mu}{p}} \tan\left(\frac{\Delta\theta^*}{2}\right)\left(\frac{1-\cos(\Delta\theta^*)}{p} - \frac{1}{r} - \frac{1}{r_0}\right) = \frac{-\sin(\Delta E)\sqrt{\mu a}}{r_0 r} \qquad (2.9)$$

In the equation for semi-major axis is substituted into Equation 2.9, then Equation 2.9 can be rearranged to solve for p in terms of $\Delta\theta^*$ and $\Delta E$.

$$p = \frac{(1 - \cos(\Delta\theta^*))r_0 r}{r_0 + r - 2\sqrt{r_0 r}\cos\left(\frac{\Delta\theta^*}{2}\right)\cos\left(\frac{\Delta E}{2}\right)} \qquad (2.10)$$

Substituting this expression for p into Equation 2.6 and squaring the results is what is usually referred to as Gauss' 1$^{st}$ equation.

$$\eta^2 = \frac{\mu \Delta t^2 \sec^2\left(\frac{\Delta\theta^*}{2}\right)}{2r_0 r\left(r_0 + r - 2\sqrt{r_0 r}\cos\left(\frac{\Delta\theta^*}{2}\right)\cos\left(\frac{\Delta E}{2}\right)\right)} \qquad (2.11)$$

The following expression is used for simplification $$l = \frac{r_0 + r}{4\sqrt{r_0 r}\cos\left(\frac{\Delta\theta^*}{2}\right)} - \frac{1}{2} \qquad (2.12)$$

$$m = \frac{\mu \Delta t^2}{\left\{2\sqrt{r_0 r}\cos\left(\frac{\Delta\theta^*}{2}\right)\right\}^3}$$

$$x_1 = \sin^2\left(\frac{\Delta E}{4}\right)$$

Using the substitutions in Equation 2.12 results in the more commonly seen form of Gauss's first equation $$\eta^2 = \frac{m}{l+x_1} \quad (2.13)$$

Gauss's second equation takes to form $$\eta^3 - \eta^2 = m\chi_2 = \eta^2(\eta-1) \quad (2.14)$$

Where $x_2$ is a temporary variable which can be written as $$x_2 = \frac{\Delta E - \sin(\Delta E)}{\sin^3\left(\frac{\Delta E}{2}\right)} \quad (2.15)$$

The presence of trigonometric functions in this equation creates difficulty in equating the two equations for $\eta$ and solving, therefore it is often approximated by a series expansion. This approach converges for vectors less than 90° apart.

$$x_2 = \frac{4}{3}\left(1 + \frac{6x_1}{5} + \frac{6(8)x_1^2}{5(7)} + \frac{6(8)(10)x_1^3}{5(7)(9)} + \ldots \right) \quad (2.16)$$

The two independent equations for $\eta^2$ in terms of $\Delta E$ are equated and solved for $\eta$.

$$\eta = (l+x_1)\chi_2 + 1 \quad (2.17)$$

To put all these equations together the algorithm would take the following form. Given two position vectors, time of flight, and knowledge of which transfer path is take (i.e. the long path ($\Delta\theta^* > 180°$)) the following steps are taken.

1. Calculate the transfer angle.

$$\cos(\Delta\theta^*) = \frac{\vec{r}_0 \cdot \vec{r}}{r_0 r}$$

2. Solve for the temporary variable l and m
3. Guess $\eta=1$ and loop through the following equations until $\eta$ stops changing.

$$x_1 = \frac{m}{\eta^2} - l$$

$$x_2 = \frac{4}{3}\left(1 + \frac{6x_1}{5} + \frac{6(8)x_1^2}{5(7)} + \frac{6(8)(10)x_1^3}{5(7)(9)} + \ldots \right)$$

$$\eta = (l+x_1)x_2 + 1$$

4. Calculate $$\cos\left(\frac{\Delta E}{2}\right) \cdot \cos\left(\frac{\Delta E}{2}\right) = 1 - 2x_1$$

5. Calculate semiparameter.

$$p = \frac{(1-\cos(\Delta\theta^*))r_0 r}{r_0 + r - 2\sqrt{r_0 r}\cos\left(\frac{\Delta\theta^*}{2}\right)\cos\left(\frac{\Delta E}{2}\right)}$$

6. With p known, all the f and g functions can be evaluated
7. Solve for velocity at each position vector.

$$\vec{v}_0 = \frac{\vec{r} - f\vec{r}_0}{g} \quad \vec{v} = \frac{g\vec{r} - \vec{r}_0}{g}$$

Using the position vectors from the IGS files and the corresponding velocity vectors computed above, which are both in the mean J2000 coordinate frame, a set of six Keplerian elements can be computed at each time the IGS date is available. The elements used for this analysis are the semi-major axis (a), eccentricity (e), inclination (i), right ascension of the ascending node (RANN, $\Omega$), argument of perigee ($\omega$), and true anomaly ($\theta^*$). These elements describe the shape and orientation of the satellite orbit and can be visualized in FIG. 2.2.

The computation of orbital elements for position and velocity vectors is a common procedure in orbital mechanics and as such a detailed description of the derivation of this computation is not needed here. A brief outline of the procedure, including the equations used in this analysis is presented below.

1. Compute semi-major axis from r and v using the Energy Equation.

$$a = \frac{-\mu|\vec{r}|}{|\vec{r}||\vec{v}|^2 - 2\mu} \quad (2.18)$$

Where $\mu$ is the WGS84 value of the Earth's universal gravitational parameter

2. Compute eccentricity form a, r, and v.

$$\vec{h} = \vec{r} \times \vec{v} \quad (2.19)$$

Where h is the angular momentum vector.

$$p = \frac{|\vec{h}|^2}{\mu} \quad (2.20)$$

The semiparameter, p, is defined in FIG. 2.2

$$e = \sqrt{1 - \frac{p}{a}} \quad (2.21)$$

3. Compute inclination using the RSW-ECI transformation matrix. Appendix A defines the satellite fixed coordinate frame, RSW, and presents a transformation between this frame and the ECI frame. This transformation is determined by the angles $\Omega$, i, and $\theta$. The angular momentum vector, h, found in the previous step is perpendicular to the orbit plane in the direction of the $\hat{W}$ unit vector. By dividing through by the magnitude of angular momentum, the result is the $\hat{W}$ in terms of ECI coordinates. From the transformation matrix, notice that the Z component of the $\hat{W}$ vector is equal to cos(i). Using this information, the inclination can be determined.

$$\hat{W} = \hat{h} = \frac{\vec{r} \times \vec{v}}{|\vec{r} \times \vec{v}|} = W_x \hat{x} + W_y \hat{y} + W_z \hat{z} \qquad (2.22)$$

$$i = \cos^{-1}(W_z) \qquad (2.23)$$

The inverse cosine is double valued, but convention is assumed to be positive form o to $\pi$.

4. Compute right ascension of the ascending node. Using a similar approach as that for inclination, $\Omega$ can be solved from the X and Y component of $\hat{W}$.

$$W_x = \sin(\Omega)\sin(i)$$

$$W_y = -\cos(\Omega)\sin(i) \qquad (2.24)$$

Again, both the inverse sine and cosine are double valued, but only one solution will satisfy both constraints on $\Omega$.

5. Compute argument of latitude. To compute $\theta$, the Z component of both the R vector and the $\hat{S}$ unit vectors is needed. The R vector can be determined by dividing the position vector by it's magnitude and the $\hat{S}$ vector is perpendicular to both R and $\hat{W}$ and can easily be determined. Again, $\theta$ will be the solution to a system of two equations where only one will satisfy both constraints.

$$R_z = \sin(i)\sin(\theta)$$

$$S_z = \sin(i)\cos(\theta) \qquad (2.25)$$

6. Computing true anomaly and argument of perigee.

$$\theta^* = \cos^{-1}\frac{1}{e}\left(\frac{p}{|\vec{r}|} - 1\right) \qquad (2.26)$$

$$\omega = \theta - \theta^*$$

To determine if $\theta^*$ is ascending or descending, the direction of change of the magnitude of the position vector must be determined. This determines if the satellite is approaching apogee or perigee. Since the satellite's motion is in the R and $\hat{S}$ plane, the sign of the velocity vector component in the R direction will indicate if $\theta^*$ is positive or negative.

$$\upsilon_R = \upsilon_X H_{11} + \upsilon_Y H_{21} + \upsilon_Z H_{31} \qquad (2.27)$$

where if $\upsilon_R$ is positive $0 < \theta^* < \pi$ and if $\upsilon_R$ is negative $\pi < \theta^* < 2\pi$.

Osculating elements calculated with the above described methods are shown in FIGS. 2.3-2.9. Various time intervals of data are shown including: 1 day, 1 week, 1 month and several months. Note that the dominant secular trends, resulting from the J2 perturbation, have been removed from the $\Omega$ vs. $\theta$, $\theta^*$ vs. time, and $\theta$ vs. time plots in an effort to visualize other periodic and secular trends. Argument of latitude, true anomaly, and argument of perigee are given as a function of argument of latitude. The purpose of this discussed herein, however is aimed at identifying dominant periodic behavior that are harmonics of the argument of latitude. As shown in Table 1.4, the current GPS broadcast ephemeris model defines corrections to argument of latitude, radius, and inclination using the argument of latitude. For similar reasons, this approach is utilized in the development of the compressed ephemeris format. This model consists of argument of latitude, which is the sum of the argument of perigee and true anomaly, being modeled with respect to time and all other elements will be dependent on argument of latitude.

A trend in a time series is a slow, gradual change of the series over the interval of investigation where the trend can represent the long term change in the mean. Detrending is the operation by which this trend in mean can be removed for a set of data by subtracting out a least squares curve fit Detrending may be used to predict future values of a given set of data or may be used to condition data for FFT processing. Most of the secular variations in the elements are linear trends. However, distinguishing a trend from a low frequency fluctuation is often difficult. Therefore, for some elements a second order polynomial fit may be removed.

To determine the trend, the curve that best fits the data point $(X_i, Y_i)$ is the one where the sum of the squares of the deviations between the curve at each $X_i$ and $Y_i$ is minimum. For linear trends the equation of the fitted curve will be of the form as follows:

$$\hat{Y}_i = a + bX_i \qquad (3.1)$$

Where $\hat{Y}$ represents the predicted value of $Y_i$. The sum of the squares of the errors is represented as $$\sum_{i=1}^{n}(Y_i - \hat{Y}_i)^2 = \sum_{i=1}^{n}(Y_i - (a + bX_i))^2 \qquad (3.2)$$

The values of a and b which make the sum of the squares minimum take the form $$b = \frac{\sum_{i=1}^{n}(X_i - \overline{X})(Y_i - \overline{Y})}{\sum_{i=1}^{n}(X_i - \overline{X})^2} \qquad (3.3)$$

$$a = \overline{Y} - b\overline{X}$$

Extending the least squares fit to a $2^{nd}$ order polynomial, the equation of the fitted curve will be of the form:

$$\hat{Y}_i = a_0 + a_1 X_i + a_2 X_i^2 \qquad (3.4)$$

The least squares estimation method yields 3 equations in the 3 unknown parameters $a_o$, $a_1$, and $a_2$.

$$\sum_{i=1}^{n} Y_i = a_0 n + a_1 \sum_{i=1}^{n} x_i + a_2 \sum_{i=1}^{n} x_i^2 \qquad (3.5)$$

$$\sum_{i=1}^{n} Y_i X_i = a_0 \sum_{i=1}^{n} X_i + a_1 \sum_{i=1}^{n} x_i^2 + a_2 \sum_{i=1}^{n} x_i^3$$

$$\sum_{i=1}^{n} Y_i X_i^2 = a_0 \sum_{i=1}^{n} X_i^2 + a_1 \sum_{i=1}^{n} x_i^3 + a_2 \sum_{i=1}^{n} x_i^4$$

Where n is the number of data points.

Applying this technique to each of the osculating elements series results in the data presented in FIGS. 3.1-3.7. A linear trend may be removed from semi-major axis and right ascension and a $2^{nd}$ order polynomial trend was removed from eccentricity, inclination, argument of perigee, true anomaly, and argument of latitude.

The de-trended orbital elements are first transformed into periodic signals. These de-trended orbital elements can be approximated by a finite Fourier series of sine (sin) and cosine (cos) terms which will obtain the desired degree of accuracy. In order to do so, the dominant frequencies in each signal need to be determined. A convenient way to do this is to compute the power spectrum in the frequency domain. The de-trended signals converted from the domain of their independent variable to this corresponding frequency domain. For argument of latitude, this would transform the signal from the time domain to the frequency domain, which would have dimensions of (1/second). For the remaining de-trended element signals this would transform the signal from the argument of latitude domain to the frequency domain, which in this case would have dimensions of (1/rad). In each case the signal is a discrete sample of each de-trended orbital element and therefore a discrete Fourier (DFT) process applies.

From Fourier transform theory (see Press, W. H., Numerical Recipes in C, Cambridge University Press, New York, N.Y., 1994, incorporated herein by reference in its entirety), given a discrete signal sampled at an interval at $\Delta p$, where p is the independent variable and the total length of the data is $N\Delta p$. This will set the frequency resolution as $\Delta f=1/(N\Delta p)$ and the maximum frequency as $N\Delta f=1/(\Delta p)$, since the number of discrete samples must be the same in both the frequency and time domains. To determine the DFT, consider that the data points will be labeled as $X_k=x(k\Delta p)$, k=1, 2, N. and the Fourier transform will be available at the discrete frequencies $f_q$ for q=1, 2, ... N. The signal in the frequency domain can be computed with the following relation.

$$X(f_q) = \sum_{k=1}^{N} x_k e^{-2\pi [(k-1)\Delta p][(q-1)\Delta f]i\Delta p} \quad (3.6)$$

Note that the highest frequency that can be resolved is the Nyquist frequency $1/(2\Delta p)$ and frequencies higher than this value will be redundant. Therefore only points up to this frequency will be plotted. The power spectrum can then be computed as:

$$P_{X(f_q)} = X(f_q)\overline{X(f_q)} \quad (3.7)$$

To apply this to the de-trended element signals, the IGS data products are provided at a sample interval of $\Delta t=900$ seconds. This will be used to set the frequency resolution for the detrended argument of latitude signal. For other de-trended elements, since the GPS orbits are slightly eccentric (e approximately =0.005), the $\Delta\theta$ will not be exactly constant between each discrete sample point. Since the variants of $\Delta\theta$ between corresponding points is very small, a mean value will be used to determine the corresponding frequency resolution. This will not affect the resulting model since the dominant frequencies used will be chosen to be harmonic so the argument of latitude natural frequency $1/(2\pi)$. To compute the signal in the frequency domain for each element, Equation 3.6 is used, substituting $\Delta t$ for $\Delta p$ for arguments of latitude and $\Delta\theta$ for the remaining elements. The resulting power spectrums for each de-trended element are shown in FIGS. 3.8-3.14.

Each of the triangular markers in the above plots represents a harmonic of the frequency of the independent variable for that element. For all elements excluding argument of latitude, the markers represent harmonics of the arguments latitude's frequency $1/(2\pi)$ and for arguments of latitude the markers represent the frequency of the orbit period, 1/P. Semi-major axis, inclination and RAAN all have a single dominant frequency at twice the frequency of $\theta$. Eccentricity and argument of perigee have two harmonic frequencies. One is three times the frequency of $\theta$ and the more dominant periodic term is the frequency of $\theta$. Argument of latitude has a single dominant frequency which is that of the orbit period.

$$f_a = \frac{1}{\pi} \quad (3.8)$$

$$f_{e1} = \frac{1}{2\pi}$$

$$f_{e2} = \frac{3}{2\pi}$$

$$f_i = \frac{1}{\pi}$$

$$f_\Omega = \frac{1}{\pi}$$

$$f_{w1} = \frac{1}{2\pi}$$

$$f_{w2} = \frac{3}{2\pi}$$

$$f_\theta = \frac{1}{P}$$

In the next step, utilizing the de-trending and the Fourier analysis, a model of each of the element can be developed that will capture the dominant secular and periodic variation determined from the oscillating elements. Each element, with the argument of perigee, may be modeled with a mean term, a secular rate, and periodic terms using the harmonic frequencies. Arguments of perigee may be modeled as a constant mean value, with the model for the secular and periodic components applied only to the argument of latitude.

Referring now to FIGS. 3.13 and 3.14, both argument of latitude and true anomaly have a dominant frequency at the first harmonic of the orbit frequency. The frequency of the orbit period varies enough from satellite to satellite that a single value may not be sufficient as is the case for other orbital elements. The value of this frequency may be determined directly from the FFT analysis an additional parameter may be uploaded to the receiver. For a particular satellite this value would not vary as often as the beta ($\beta_i$) parameters defined below and therefore do not need to be uploaded as frequently. Additionally, even though eccentricity and inclination may be de-trended with a second order polynomial, only a linear trend is included in the model below. The reasoning for this is that the inclusion of the second order term, when fit to the IGS data doesn't significantly reduce the fit residuals.

$\hat{a} = \beta_1 + \beta_2\theta + \beta_3 \cos(2\pi f_a\theta) + \beta_4 \sin(2\pi f_a\theta)$ $\hat{e} = \beta_5 + \beta_6\theta + \beta_7 \cos(2\pi f_{e1}\theta) + \beta_8 \sin(2\pi f_{e1}\theta) + \beta_9 \cos(2\pi f_{e2}\theta) + \beta_{10} \sin(2\pi f_{e2}\theta)$ $\hat{i} = \beta_{11} + \beta_{12}\theta + \beta_{13} \cos(2\pi f_i\theta) + \beta_{14} \sin(2\pi f_i\theta)$ $\hat{\Omega} = \beta_{15} + \beta_{16}\theta + \beta_{17} \cos(2\pi f_{\Omega 1}\theta) + \beta_{18} \sin(2\pi f_{\Omega 1}\theta)$ $\hat{\theta}^* = \beta_{19} + \beta_{20}t + \beta_{21} \cos(2\pi f_{\theta*1}t) + \beta_{22} \sin(2\pi f_{\theta*1}t)$ $\hat{\omega} = \beta_{23}$ (3.9)

The above model is utilized in the application to determine the numerical values of the $\beta$ coefficients that will best estimate the orbital elements using non-linear least squares estimation.

Once a satellite is launched into space, it is desirable to track its position at each instant in time. If the spacecraft was inserted exactly into the desired orbit and all the forces acting on the vehicle could be modeled perfectly, then ideally the force model could be numerically integrated to predict the location of the vehicle over time with a high degree of accuracy. However, since neither of these conditions is met, measurements are made in order to determine a precise model of the true ephemeris. If measurements are taken at known times, for example $t_{t\ldots n}$ and a function is known that relates the measurements to the desired ephemeris format, then the mathematical relationship between the measurement and the state can be written in the following form:

$$Y_i = G(X_i, t_i) + \epsilon_i \text{ for } i=1, \ldots n \quad (4.1)$$

At each time ti a k×1 vector of observations, Yi, is obtained. G (Xi, ti) is a non-linear function for the true observations as a function of ephemeris elements and time. $\epsilon$ is assumed to be normally distributed random measurement noise. The term $X_i$ is a q×1 state matrix which contains the ephemeris elements needed to describe the vehicle trajectory at each time that the observations are made. In addition, if a model is known that relates the state at one epoch to the state at another this relationship can be written as:

$$X(t_i) = \Theta(X_0, t_0, t_1) \quad (4.2)$$

Combining this function a new relation can be made which relates each observation to a single state at a desired epoch.

$$Y_i = G'(X_0, t_0, t_1) + \epsilon_i \text{ for } i=1, \ldots, n \quad (4.3)$$

From this relation, a best estimate of the state can be fit to the measurements. A common method used to do this is to minimize the sum of the squares of the measurement errors (similar to the method used in de-trending described heretofore). However, a solution from this procedure is often difficult to obtain since the function being minimized is nonlinear and may have more than one minimum value. To avoid issues it is common to linearize the orbit determination process.

If a reference trajectory, X* exists, which remains close to the true trajectory, X, over the time that the measurements are made, then the issue addressed above can be linearalized about this reference trajectory at each time the observation is made. Refer now to FIG. 4.1, this procedure is done using a Taylor series expansion. By truncating higher order terms, the relationship between the reference trajectory and the true state is represented as a set of linear differential equations. A linear relationship between the observation deviation and the state deviation can be obtained in a similar expansion process. The observation vector $Y_i$ and the state vector $X_i$ are replaced by the difference in the true vectors and those associated with the reference trajectory ($X_i^*$, $Y_i^*$).

$$\chi(t) = X(t) - X^*(t)$$

$$y(t) = Y(t) - Y^*(t) \quad (4.4)$$

Incorporating these substitutions and expanding in a Taylor's series will result in $$\dot{X}(t) = F(X, t) = F(X^*, t) + \left[\frac{\partial F}{\partial X}\right] * x + \ldots \quad (4.5)$$

$$Y_i = G(X_i, t_i) + \epsilon_i = G^*(X_i, t_i) + \left[\frac{\partial G}{\partial X}\right] * x_i + \ldots + \epsilon_i$$

Where $X^* = F(X^*, t)$ and $Y_i^* = G(X_i^*, t_i)$. If terms higher than first order are truncated, the linear relation remains $$\dot{\chi} = A(t)\chi$$

$$y_i = \tilde{H}_i \chi_i + \epsilon_i \quad (4.6)$$

where $$A(t) = \frac{\partial F}{\partial X}(X^*, t) \quad (4.7)$$

$$\tilde{H} = \frac{\partial G}{\partial X}(X^*, t)$$

The general solution to the first equation of Equation 4.6 may be expressed as $$\chi(t) = \Phi(t, t_0)\chi_0 \quad (4.8)$$

Where x(t) is a value of a specific time t. The matrix $\phi(t_i, t_0)$ is known as the state transition matrix and can be used to relate the state at two different epochs. The differential equation for $\phi(t_i, t_0)$ can be found by differenting Equation 4.8 noting that $X_0$ is the state of a particular epoch and is constant.

$$\dot{\chi} = \dot{\Phi}(t, t_0)\chi_0 \quad (4.9)$$

Substituting Equation 4.9 into Equation 4.6 and placing the result in Equation 4.8 produces $$\dot{\Phi}(t, t_0)\chi_0 = A(t)\Phi(t, t_0)\chi_0 \quad (4.10)$$

Therefore, reducing this equation results in $$\dot{\Phi}(t, t_0) = A(t)\Phi(t, t_0) \quad (4.11)$$

which can be numerically integrated with initial conditions $$\Phi(t_0, t_0) = I. \quad (4.12)$$

This information can then be used to relate observations at various time intervals to the state at a particular epoch.

$$y_1 = \tilde{H}_1 \Phi(t_1, t_0)\chi_0 + \epsilon_1$$

$$y_2 = \tilde{H}_2 \Phi(t_2, t_0)\chi_0 + \epsilon_2$$

$$y_n = \tilde{H}_n \Phi(t_n, t_0)\chi_0 + \epsilon_n \quad (4.13)$$

Using the following substitutions $$y = \begin{bmatrix} y_1 \\ y_2 \\ \vdots \\ y_n \end{bmatrix}; H = \begin{bmatrix} \tilde{H}_1 \Phi(t_1, t_0) \\ \tilde{H}_2 \Phi(t_2, t_0) \\ \vdots \\ \tilde{H}_n \Phi(t_n, t_0) \end{bmatrix}; \varepsilon = \begin{bmatrix} \varepsilon_1 \\ \varepsilon_2 \\ \vdots \\ \varepsilon_n \end{bmatrix} \quad (4.14)$$

the system of observation equation be written as $$y = H\chi + \epsilon \quad (4.15)$$

Where where y is a m×1 vector, x is a q×1 vector, $\epsilon$ is an m×1 vector, H is an m×q mapping matrix where m is the total number of k observations taken at n time intervals.

The form of Equation 4.15 assumes that the observations are equally weighted. Each observation could be weighted if information was known about which observation should be trusted and which should be possibly neglected. The weights would range from 1 to 0, where 1 would be the highest weight possible and an observation with the weight of 0 would be neglected. Equation 4.15 could then be written as INSERT Formula 4, 16 where

INSERT Formula 4.17 and each $w_i$ will be a k×k matrix.

A least square selection selects the estimate of X as the value

The least squares solution selects the estimate of x as the value which minimizes the sum of the squares of the calculated observation residuals. This criteria may be utilized to avoid the situation in which the sum of the observation errors could appear to be small when in actuality; large positive and negative errors nearly cancel each other. Whether the observation error is positive or negative, the following expression will only become a small value if each of the observation errors is small in magnitude.

$$J(x) = \varepsilon^T W \varepsilon = \sum_{i=1}^{n} \varepsilon_i^T w_i \varepsilon_i \qquad (4.18)$$

The function J is referred to as the performance index and will have a minimum when $$\frac{\partial J}{\partial x} = 0 \qquad (4.19)$$

Carrying out this observation and substituting x as the best estimate for the state x $$\frac{\partial J}{\partial x}\bigg|_{\hat{x}} = 0 = -2 H^T W(y - H\hat{x}) \qquad (4.20)$$

which requires that $$(H^T W H)\hat{\chi} = H^T W y \qquad (4.21)$$

This equation is usually referred to as the normal equation and the matrix ($H^T$ WH) is referred to as the normal matrix. The normal matrix is q×q and if this matrix is positive-definite, the matrix has full rank, then the solution for the best estimate of x can be obtained by inverting by the normal matrix.

$$\hat{\chi} = (H^T W H)^{-1} H^T W y \qquad (4.22)$$

The inverse of the normal matrix is the variance-covariance matrix, P, associated with the estimate x.

$$P = (H^T W H)^{-1} \qquad (4.23)$$

In general, the larger the magnitude of the elements of the matrix, P, the less accurate the estimate.

This solution x, provides an update to an initial guess of the state. This result can be iterated until the initial state has converged. The root mean square (RMS) of the observation residuals can be computed and is generally used as a measure of convergence. When the RMS is no longer changing the solution is assumed to have converged. The RMS is computed as $$RMS = \left\{ \frac{\sum_i \hat{\varepsilon}_i^T w_i \hat{\varepsilon}_i}{m} \right\}^{\frac{1}{2}} \qquad (4.24)$$

An application of this estimation process is the batch processor.

The batch filter formulation utilize an iterative approach of the previous theory to provide an estimate of the state at some chosen epoch using an entire batch of data and the technique used for this analysis. If an a priori estimate $x_0$ and the associated co-variance matrix $P_0$ are reasonably known, they can be incorporated into the normal equation and this form may be shown as:

$$(H^T W H + \overline{P}_0^{-1})\hat{\chi} = H^T W y + \overline{P}_0^{-1} \overline{\chi}_0 \qquad (4.25)$$

For a large batch of data, the matrixes in Equations 4.25 can be very cumbersome. If the observations are uncorrelated in time, i.e. the weighted matrix W is a blocked diagonal, although correlations between observations may exist at any given time, the matrixes can be accumulated in the following manner.

$$\Lambda = H^T W H = \sum_{i=1}^{n} H_i^T W H_i \qquad (4.26)$$

$$N = H^T W y = \sum_{i=1}^{n} H_i^T W y_i$$

Given a set of initial conditions, $X^*(t_0)$ and an a priori estimate, the batch processor will allow for each observation to be read separately and the matrixes in Equation 4.26 will be accumulated over all observations in the batch of data.

The normal equations will be solved by inverting A or by Cholesky Decomposition which is described later herein. If the RMS error has converged with a given tolerance, the best estimate of the state is assumed to be found. If the RMS error has not converged, the initial guess of the state is updated and the process is repeated until convergence. Referring now to FIG. 4.2, a flow diagram for the batch processing algorithm is shown.

To model this analysis, the state vector to be estimated may include the β coefficients used to model each of the orbital elements described above.

$$X^* = \begin{bmatrix} \beta_1 \\ \beta_2 \\ \vdots \\ \beta_{23} \end{bmatrix} \qquad (4.27)$$

A function that relates each of the orbital elements, and thus the β coefficients, to the satellite positions in the ECEF is the conic equation.

$$|\vec{r}| = \frac{a(1 - e^2)}{1 + e \cos(\theta^*)} \qquad (4.28)$$

rotated into the ECEF frame using the RSW to ECEF transformation matrix from Appendix A. This results in the following relationship:

$$Y_i = G(X_i, t_i) = \begin{bmatrix} X_{ECEF} \\ Y_{ECEF} \\ Z_{ECEF} \end{bmatrix} \quad (4.29)$$

where the components of the matrix on the far right, in terms of the orbital elements are:

$$x_{ECEF} = \quad (4.30)$$
$$\frac{a(1-e^2)}{1+e\cos(\theta^*)}[\cos(\Omega)\cos(\theta^*+w) - \sin(\Omega)\sin(\theta^*+w)\cos(i)]$$

$$y_{ECEF} = \frac{a(1-e^2)}{1+e\cos(\theta^*)}$$
$$[\sin(\Omega)\cos(\theta^*+w) + \cos(\Omega)\sin(\theta^*+w)\cos(i)]$$

$$z_{ECEF} = \frac{a(1-e^2)}{1+e\cos(\theta^*)}[\sin(\Omega)\sin(\theta^*+w)]$$

Since this is a nonlinear function, each position component will need to be differentiated with respect to each of the β coefficients to determine the matrix H as shown in equation 4.7.

Referring now to Table 4.1, the Table 4.1 summarizes the elements of H, which will be a 3×23 matrix.

The elements of H are broken into the partial derivative of each position component with respect to each of the six orbital elements, listed in Table 4.2, and the partial derivative of each element with respect to each β coefficient, listed in Table 4.3. The a coefficients in the first entry of Table 4.3, the partial derivative of the semi-major axis, will be described later herein.

For this model, each of the β coefficients is a constant over the fit interval. Therefore, the state transition matrix will be the identity matrix. The constant β term for each element will represent the osculating element set at the beginning of the desired fit interval. The variable "t" in the expansion of true anomaly will represent the difference in time from the current observation to the reference epoch, as stated previously will be at the beginning at the fit interval.

Using this difference in time, the secular and periodic correction terms will determine the value of true anomaly at the time of the current observation. As a result, since the other elements are written as a function of argument of latitude, this will propagate each element from the current observation time to the desired fit epoch. Using this substitution, the formulation of H in Table 4.1 will become the relation between observations at different times to the state at a particular epoch as represented by the matrix H in Equation 4.15. This modification to the batch filter algorithm is depicted in FIGS. 4.4 and 4.5 herein.

The form of the normal equation with a priori information, $P_0$ and $x_0$, is shown above in Equation 4.25 which can be simplified as:

$$M\hat{\chi} = b \quad (4.31)$$

In general, x is determined by inverting the q×q matrix M and multiplied through by the q×1 column vector b. In order to perform this operation, the matrix M must be positive definite and therefore be invertible. In practice, computation problems can arise from inverting M. Several method for solving the normal equation for situations where the normal matrix is nonsingular or near-singularity are available.

TABLE 4.1

Linearized Measurement Matrix $\tilde{H}_{1,1} = \frac{\partial X_{ECEF}}{\partial a}\frac{\partial a}{\partial \beta_1}$    $\tilde{H}_{2,1} = \frac{\partial Y_{ECEF}}{\partial a}\frac{\partial a}{\partial \beta_1}$    $\tilde{H}_{3,1} = \frac{\partial Z_{ECEF}}{\partial a}\frac{\partial a}{\partial \beta_1}$ $\tilde{H}_{1,2} = \frac{\partial X_{ECEF}}{\partial a}\frac{\partial a}{\partial \beta_2}$    $\tilde{H}_{2,2} = \frac{\partial Y_{ECEF}}{\partial a}\frac{\partial a}{\partial \beta_2}$    $\tilde{H}_{3,2} = \frac{\partial Z_{ECEF}}{\partial a}\frac{\partial a}{\partial \beta_2}$ $\tilde{H}_{1,3} = \frac{\partial X_{ECEF}}{\partial a}\frac{\partial a}{\partial \beta_3}$    $\tilde{H}_{2,3} = \frac{\partial Y_{ECEF}}{\partial a}\frac{\partial a}{\partial \beta_3}$    $\tilde{H}_{3,3} = \frac{\partial Z_{ECEF}}{\partial a}\frac{\partial a}{\partial \beta_3}$ $\tilde{H}_{1,4} = \frac{\partial X_{ECEF}}{\partial a}\frac{\partial a}{\partial \beta_4}$    $\tilde{H}_{2,4} = \frac{\partial Y_{ECEF}}{\partial a}\frac{\partial a}{\partial \beta_4}$    $\tilde{H}_{3,4} = \frac{\partial Z_{ECEF}}{\partial a}\frac{\partial a}{\partial \beta_4}$ $\tilde{H}_{1,5} = \frac{\partial X_{ECEF}}{\partial e}\frac{\partial e}{\partial \beta_5}$    $\tilde{H}_{2,5} = \frac{\partial Y_{ECEF}}{\partial e}\frac{\partial e}{\partial \beta_5}$    $\tilde{H}_{3,5} = \frac{\partial Z_{ECEF}}{\partial e}\frac{\partial e}{\partial \beta_5}$ $\tilde{H}_{1,6} = \frac{\partial X_{ECEF}}{\partial e}\frac{\partial e}{\partial \beta_6}$    $\tilde{H}_{2,6} = \frac{\partial Y_{ECEF}}{\partial e}\frac{\partial e}{\partial \beta_6}$    $\tilde{H}_{3,6} = \frac{\partial Z_{ECEF}}{\partial e}\frac{\partial e}{\partial \beta_6}$ $\tilde{H}_{1,7} = \frac{\partial X_{ECEF}}{\partial e}\frac{\partial e}{\partial \beta_7}$    $\tilde{H}_{2,7} = \frac{\partial Y_{ECEF}}{\partial e}\frac{\partial e}{\partial \beta_7}$    $\tilde{H}_{3,7} = \frac{\partial Z_{ECEF}}{\partial e}\frac{\partial e}{\partial \beta_7}$ $\tilde{H}_{1,8} = \frac{\partial X_{ECEF}}{\partial e}\frac{\partial e}{\partial \beta_8}$    $\tilde{H}_{2,8} = \frac{\partial Y_{ECEF}}{\partial e}\frac{\partial e}{\partial \beta_8}$    $\tilde{H}_{3,8} = \frac{\partial Z_{ECEF}}{\partial e}\frac{\partial e}{\partial \beta_8}$ $\tilde{H}_{1,9} = \frac{\partial X_{ECEF}}{\partial e}\frac{\partial e}{\partial \beta_9}$    $\tilde{H}_{2,9} = \frac{\partial Y_{ECEF}}{\partial e}\frac{\partial e}{\partial \beta_9}$    $\tilde{H}_{3,9} = \frac{\partial Z_{ECEF}}{\partial e}\frac{\partial e}{\partial \beta_9}$ $\tilde{H}_{1,10} = \frac{\partial X_{ECEF}}{\partial e}\frac{\partial e}{\partial \beta_{10}}$    $\tilde{H}_{2,10} = \frac{\partial Y_{ECEF}}{\partial e}\frac{\partial e}{\partial \beta_{10}}$    $\tilde{H}_{3,10} = \frac{\partial Z_{ECEF}}{\partial e}\frac{\partial e}{\partial \beta_{10}}$ $\tilde{H}_{1,11} = \frac{\partial X_{ECEF}}{\partial i}\frac{\partial i}{\partial \beta_{11}}$    $\tilde{H}_{2,11} = \frac{\partial Y_{ECEF}}{\partial i}\frac{\partial i}{\partial \beta_{11}}$    $\tilde{H}_{3,11} = \frac{\partial Z_{ECEF}}{\partial i}\frac{\partial i}{\partial \beta_{11}}$ $\tilde{H}_{1,12} = \frac{\partial X_{ECEF}}{\partial i}\frac{\partial i}{\partial \beta_{12}}$    $\tilde{H}_{2,12} = \frac{\partial Y_{ECEF}}{\partial i}\frac{\partial i}{\partial \beta_{12}}$    $\tilde{H}_{3,12} = \frac{\partial Z_{ECEF}}{\partial i}\frac{\partial i}{\partial \beta_{12}}$ $\tilde{H}_{1,13} = \frac{\partial X_{ECEF}}{\partial i}\frac{\partial i}{\partial \beta_{13}}$    $\tilde{H}_{2,13} = \frac{\partial Y_{ECEF}}{\partial i}\frac{\partial i}{\partial \beta_{13}}$    $\tilde{H}_{3,13} = \frac{\partial Z_{ECEF}}{\partial i}\frac{\partial i}{\partial \beta_{13}}$ $\tilde{H}_{1,14} = \frac{\partial X_{ECEF}}{\partial i}\frac{\partial i}{\partial \beta_{14}}$    $\tilde{H}_{2,14} = \frac{\partial Y_{ECEF}}{\partial i}\frac{\partial i}{\partial \beta_{14}}$    $\tilde{H}_{3,14} = \frac{\partial Z_{ECEF}}{\partial i}\frac{\partial i}{\partial \beta_{14}}$ $\tilde{H}_{1,15} = \frac{\partial X_{ECEF}}{\partial \Omega}\frac{\partial \Omega}{\partial \beta_{15}}$    $\tilde{H}_{2,15} = \frac{\partial Y_{ECEF}}{\partial \Omega}\frac{\partial \Omega}{\partial \beta_{15}}$    $\tilde{H}_{3,15} = \frac{\partial Z_{ECEF}}{\partial \Omega}\frac{\partial \Omega}{\partial \beta_{15}}$ $\tilde{H}_{1,16} = \frac{\partial X_{ECEF}}{\partial \Omega}\frac{\partial \Omega}{\partial \beta_{16}}$    $\tilde{H}_{2,16} = \frac{\partial Y_{ECEF}}{\partial \Omega}\frac{\partial \Omega}{\partial \beta_{16}}$    $\tilde{H}_{3,16} = \frac{\partial Z_{ECEF}}{\partial \Omega}\frac{\partial \Omega}{\partial \beta_{16}}$ $\tilde{H}_{1,17} = \frac{\partial X_{ECEF}}{\partial \Omega}\frac{\partial \Omega}{\partial \beta_{17}}$    $\tilde{H}_{2,17} = \frac{\partial Y_{ECEF}}{\partial \Omega}\frac{\partial \Omega}{\partial \beta_{17}}$    $\tilde{H}_{3,17} = \frac{\partial Z_{ECEF}}{\partial \Omega}\frac{\partial \Omega}{\partial \beta_{17}}$ $\tilde{H}_{1,18} = \frac{\partial X_{ECEF}}{\partial \Omega}\frac{\partial \Omega}{\partial \beta_{18}}$    $\tilde{H}_{2,18} = \frac{\partial Y_{ECEF}}{\partial \Omega}\frac{\partial \Omega}{\partial \beta_{18}}$    $\tilde{H}_{3,18} = \frac{\partial Z_{ECEF}}{\partial \Omega}\frac{\partial \Omega}{\partial \beta_{18}}$ $\tilde{H}_{1,19} = \frac{\partial X_{ECEF}}{\partial \theta^*}\frac{\partial \theta^*}{\partial \beta_{19}}$    $\tilde{H}_{2,19} = \frac{\partial Y_{ECEF}}{\partial \theta^*}\frac{\partial \theta^*}{\partial \beta_{19}}$    $\tilde{H}_{3,19} = \frac{\partial Z_{ECEF}}{\partial \theta^*}\frac{\partial \theta^*}{\partial \beta_{19}}$ TABLE 4.1-continued Linearized Measurement Matrix $\tilde{H}_{1,20} = \frac{\partial X_{ECEF}}{\partial \theta^*} \frac{\partial \theta^*}{\partial \beta_{20}}$  $\tilde{H}_{2,20} = \frac{\partial Y_{ECEF}}{\partial \theta^*} \frac{\partial \theta^*}{\partial \beta_{20}}$  $\tilde{H}_{3,20} = \frac{\partial Z_{ECEF}}{\partial \theta^*} \frac{\partial \theta^*}{\partial \beta_{20}}$ $\tilde{H}_{1,21} = \frac{\partial X_{ECEF}}{\partial \theta^*} \frac{\partial \theta^*}{\partial \beta_{21}}$  $\tilde{H}_{2,21} = \frac{\partial Y_{ECEF}}{\partial \theta^*} \frac{\partial \theta^*}{\partial \beta_{21}}$  $\tilde{H}_{3,21} = \frac{\partial Z_{ECEF}}{\partial \theta^*} \frac{\partial \theta^*}{\partial \beta_{21}}$ TABLE 4.1-continued Linearized Measurement Matrix $\tilde{H}_{1,22} = \frac{\partial X_{ECEF}}{\partial \theta^*} \frac{\partial \theta^*}{\partial \beta_{22}}$  $\tilde{H}_{2,22} = \frac{\partial Y_{ECEF}}{\partial \theta^*} \frac{\partial \theta^*}{\partial \beta_{22}}$  $\tilde{H}_{3,22} = \frac{\partial Z_{ECEF}}{\partial \theta^*} \frac{\partial \theta^*}{\partial \beta_{22}}$ $\tilde{H}_{1,23} = \frac{\partial X_{ECEF}}{\partial \omega} \frac{\partial \omega}{\partial \beta_{23}}$  $\tilde{H}_{2,23} = \frac{\partial Y_{ECEF}}{\partial \omega} \frac{\partial \omega}{\partial \beta_{23}}$  $\tilde{H}_{3,23} = \frac{\partial Z_{ECEF}}{\partial \omega} \frac{\partial \omega}{\partial \beta_{23}}$

TABLE 4.2

Linearized Measurement Matrix $$\frac{\partial X}{\partial a} = \frac{1-e^2}{1+e\cos(\theta^*)}[\cos(\Omega)\cos(\theta) - \sin(\Omega)\sin(\theta)\cos(i)]$$

$$\frac{\partial X}{\partial e} = \frac{-a(2e + e^2\cos(\theta^*) + \cos(\theta^*))}{(1+e\cos(\theta^*))^2}[\cos(\Omega)\cos(\theta) - \sin(\Omega)\sin(\theta)\cos(i)]$$

$$\frac{\partial X}{\partial i} = \frac{a(1-e^2)}{1+e\cos(\theta^*)}[\sin(\Omega)\sin(\theta)\cos(i)]$$

$$\frac{\partial X}{\partial \Omega} = \frac{a(1-e^2)}{1+e\cos(\theta^*)}[-\sin(\Omega)\cos(\theta) - \cos(\Omega)\sin(\theta)\cos(i)]$$

$$\frac{\partial X}{\partial \theta^*} = \frac{ae\sin(\theta^*)(1-e^2)}{(1+e\cos(\theta^*))^2}[\cos(\Omega)\cos(\theta) - \sin(\Omega)\sin(\theta)\cos(i)] + \frac{a(1-e^2)}{1+e\cos(\theta^*)}[-\cos(\Omega)\sin(\theta) - \sin(\Omega)\cos(\theta)\cos(i)]$$

$$\frac{\partial X}{\partial \omega} = \frac{a(1-e^2)}{1+e\cos(\theta^*)}[-\cos(\Omega)\sin(\theta) - \sin(\Omega)\cos(\theta)\cos(i)]$$

$$\frac{\partial Y}{\partial a} = \frac{1-e^2}{1+e\cos(\theta^*)}[\sin(\Omega)\cos(\theta) + \cos(\Omega)\sin(\theta)\cos(i)]$$

$$\frac{\partial Y}{\partial e} = \frac{-a(2e + e^2\cos(\theta^*) + \cos(\theta^*))}{(1+e\cos(\theta^*))^2}[\sin(\Omega)\cos(\theta) + \cos(\Omega)\sin(\theta)\cos(i)]$$

$$\frac{\partial Y}{\partial i} = \frac{-a(1-e^2)}{1+e\cos(\theta^*)}[\cos(\Omega)\sin(\theta)\sin(i)]$$

$$\frac{\partial Y}{\partial \Omega} = \frac{a(1-e^2)}{1+e\cos(\theta^*)}[\cos(\Omega)\cos(\theta) - \sin(\Omega)\sin(\theta)\cos(i)]$$

$$\frac{\partial Y}{\partial \theta^*} = \frac{ae\sin(\theta^*)(1-e^2)}{(1+e\cos(\theta^*))^2}[\sin(\Omega)\cos(\theta) + \cos(\Omega)\sin(\theta)\cos(i)] + \frac{a(1-e^2)}{1+e\cos(\theta^*)}[-\sin(\Omega)\sin(\theta) + \cos(\Omega)\cos(\theta)\cos(i)]$$

$$\frac{\partial Y}{\partial \omega} = \frac{a(1-e^2)}{1+e\cos(\theta^*)}[-\sin(\Omega)\sin(\theta) + \cos(\Omega)\cos(\theta)\cos(i)]$$

$$\frac{\partial Z}{\partial a} = \frac{1-e^2}{1+e\cos(\theta^*)}[\sin(\Omega)\sin(i)]$$

$$\frac{\partial Z}{\partial e} = \frac{-a(2e + e^2\cos(\theta^*) + \cos(\theta^*))}{(1+e\cos(\theta^*))^2}[\sin(\theta)\sin(i)]$$

$$\frac{\partial Z}{\partial i} = \frac{a(1-e^2)}{1+e\cos(\theta^*)}[\sin(\theta)\cos(i)]$$

$$\frac{\partial Z}{\partial \Omega} = 0$$

TABLE 4.2-continued

Linearized Measurement Matrix $$\frac{\partial Z}{\partial \theta^*} = \frac{ae\sin(\theta^*)(1-e^2)}{(1+e\cos(\theta^*))^2}[\sin(\theta)\sin(i)] + \frac{a(1-e^2)}{1+e\cos(\theta^*)}[\cos(\theta)\sin(i)]$$

$$\frac{\partial Z}{\partial \omega} = \frac{a(1-e^2)}{1+e\cos(\theta^*)}[\cos(\theta)\sin(i)]$$

TABLE 4.3

Partial Derivative of Each Element wwith Respect to Beta Coefficients

| | |
|---|---|
| $\frac{\partial a}{\partial \beta_1} = a_1$ | $\frac{\partial a}{\partial \beta_2} = a_2\theta$ |
| $\frac{\partial a}{\partial \beta_3} = a_3\cos(2\theta)$ | $\frac{\partial a}{\partial \beta_4} = a_4\sin(2\theta)$ |
| $\frac{\partial e}{\partial \beta_5} = 1$ | $\frac{\partial e}{\partial \beta_6} = \theta$ |
| $\frac{\partial e}{\partial \beta_7} = \cos(\theta)$ | $\frac{\partial e}{\partial \beta_8} = \sin(\theta)$ |
| $\frac{\partial e}{\partial \beta_9} = \cos(3\theta)$ | $\frac{\partial e}{\partial \beta_{10}} = \sin(3\theta)$ |
| $\frac{\partial i}{\partial \beta_{11}} = 1$ | $\frac{\partial i}{\partial \beta_{12}} = \theta$ |
| $\frac{\partial i}{\partial \beta_{13}} = \cos(2\theta)$ | $\frac{\partial i}{\partial \beta_{14}} = \sin(2\theta)$ |
| $\frac{\partial \Omega}{\partial \beta_{15}} = 1$ | $\frac{\partial \Omega}{\partial \beta_{16}} = \theta$ |
| $\frac{\partial \Omega}{\partial \beta_{17}} = \cos(2\theta)$ | $\frac{\partial \Omega}{\partial \beta_{18}} = \sin(2\theta)$ |
| $\frac{\partial \theta^*}{\partial \beta_{19}} = 1$ | $\frac{\partial \theta^*}{\partial \beta_{20}} = t$ |
| $\frac{\partial \theta^*}{\partial \beta_{21}} = \cos\left(\frac{2\pi t}{P}\right)$ | $\frac{\partial \theta^*}{\partial \beta_{22}} = \sin\left(\frac{2\pi t}{P}\right)$ |
| $\frac{\partial \omega}{\partial \beta_{23}} = 1$ | |

An alternative method to inverting the normal matrix is known as the Cholesky Decomposition. The Cholesky Decomposition is applicable if M is a symmetrical and positive definite matrix. This method is more fully described in Tapley, B. D., Schultz, B. E., and Born, G. H., Statistical Orbit Determination, Elsevier Academic Press, Burlington Mass., 2204, incorporated herein its entirety by reference.

The Cholesky decomposition is often more efficient and, in most cases, more accurate than inversion techniques. For example, if the matrix M represents $H^T R^{-1} H + P_0^{-1}$ and define C to be an upper triangular matrix such that $$M = C^T C \qquad (4.32)$$

substituting this into the normal equation $$C^T C \hat{x} = b \qquad (4.33)$$

If the definition Z=Cx is used, the normal equation can be rewritten as $$C^T z = b \qquad (4.34)$$

where $C^T$ would be a lower triangular matrix. The components of z may be determined by forward recursion and the X could be determined with backward recursion. Similarly, the elements of the error covariance $P=M^{-1}$ can be obtained from $$P = M^{-1} = (C^T C)^{-1} = C^{-1} C^{-T} S S^T \qquad (4.35)$$

Where S is the inverse of the upper triangular matrix C.

Given the elements of M and b; the elements of C, z, x, and S can be determined using the following algorithm:

1. For $i = 1, 2, \ldots, q$.

$$r_{ii} = \left(M_{ii} - \sum_{k=1}^{i-1} r_{ki}^2\right)^{1/2} \qquad (4.36)$$

$$r_{ij} = \frac{\left(M_{ij} - \sum_{k=1}^{i-1} r_{ki} r_{kj}\right)}{r_{ii}}; j = i+1, \ldots, q. \qquad (4.37)$$

$$z_i = \frac{\left(N_i - \sum_{j=1}^{i-1} r_{ji} z_j\right)}{r_{ii}} \qquad (4.38)$$

2. For $i = q, q-1, \ldots, 1$.

$$\hat{x} = \frac{\left(z_i - \sum_{j=i+1}^{n} r_{ij} \hat{x}_j\right)}{r_{ii}} \qquad (4.39)$$

$$s_{ii} = \frac{1}{r_{ii}} \qquad (4.40)$$

$$s_{ij} = -s_{ii}\left[\sum_{k=i+1}^{q} r_{ik} s_{kj}\right]; j = i+1, \ldots, q. \qquad (4.41)$$

Returning again to the least square solution in Equation 4.22 without a priori information, in order to invert the matrix $H^T H$, the matrix H, as summed over all the observations, must be full ranked. The number of observations must be at least at large as the number of parameters being estimated, but should be significantly larger to reduce the influence of individual measurement errors. Even if the number of observations is fairly large, the observation data may not provide sufficient information to determine all the estimated parameters which can result in a near singular matrix.

If the normal matrix is near-singular, the solution, x, becomes sensitive to small errors in the normal matrix. This is particularly a problem when working with a limited precision machine. As in example, if $$H = \begin{bmatrix} 1 & 1 \\ \delta & 0 \\ 0 & \delta \end{bmatrix} \quad (4.42)$$

In which $\gamma < \epsilon_{machine}$, where $t_{machine}$ is the machine precision, such that the 1+t will be equal to 1.

then $$H^T H = \begin{bmatrix} 1+\delta^2 & 1 \\ 1 & 1+\delta^2 \end{bmatrix} =_{(\delta^2 < \epsilon_{machine})} \begin{bmatrix} 1 & 1 \\ 1 & 1 \end{bmatrix} \quad (4.43)$$

If D is less than the square root of e machine, the normal matrix becomes singular.

As an alternative method for solving the normal equations which is well suited in detecting and overcoming a possible singularity or near singularity is singular value decomposition (SVD) such a method is described more fully in reference Lawson, C. L., Applications of Singular Value Analysis, in Rice, J. R. Mathematical Software, Academic Press, 1971, incorporated herein by reference in its entirety.

The singular value decomposition of the m×q partial derivative matrix can be written as $$H = UDV^T \quad (4.44)$$

Where D is a q×q diagonal matrix. U and V are orthogonal matrices of dimensions M=m×q and q×q. The diagonal quantities of the matrix D are known as singular values. There are exactly k positive singular values for a matrix of rank k≦q and the remaining q−k singular values are zero.

To solve the normal equation using singular value decomposition, consider the performance index mentioned earlier in Equation 4.18. With the following definitions:

$$s = V^T x$$

$$t = U^T y \quad (4.45)$$

the form of the normal equation becomes $$D^2 s = Dt \quad (4.46)$$

For non singular normal equations, D will have an inverse and the solution will be equivalent to $S = D^{-1} t$ or $$x = VD^{-1}U^T y = \sum_{i=1}^{q} \frac{u_i y}{d_i} v_i \quad (4.47)$$

Where $u_i$ and $v_i$ are the $i^{th}$ column vectors of U and V. If the rank of H is less than q, then only the first k components of s can be determined. The remaining components can be fixed by adding an additional constraint that the x chosen is the one that minimizes the norm vertical |x|=square root of $(x^T x)$. Since $x^T x = s^T s$, this can be achieved by the last q−k values of s being set to zero. As a result the solution becomes $$x = \sum_{i=1}^{k} \frac{u_i y}{d_i} v_i \quad (4.48)$$

where all the terms corresponding to the 0 singular values are excluded.

A similar situation can arise in which H is full rank yet some of the singular values are much smaller than the other values. This would indicate that matrix is near-singular. The ratio of the highest to the lowest singular value, $d_1/d_q$ is referred to as the condition number of the normal equations matrix and is used as a measure of how well a solution is defined by the given measurements. Notice that the singular values appear in the denominator of Equation 4.47.

One particular way to solve this problem is to replace all singular values below a certain threshold with zero and solve using the method for the degenerative case when the rank of H is less an q. This will result in a performance index slightly higher than the exact minimum, but in case of very small singular values, this would be more desirable than a solution that is heavily influenced by measurement errors.

Since the limit for the lowest desirable singular value will differ from problem to problem, it is often advantageous to select a limit which reduces the performance index to a desired level without creating an ill-conditioned system. As a general rule to avoid singularities, the ratio of the lowest acceptable singular value to the largest singular value should be several orders of magnitude higher than the machine accuracy $\epsilon_{machine}$.

If a singular value analysis is applied to the proposed model, using the batch filter outlined in FIGS. 4.4-4.5 and model parameters outlined herein, the following is typical of results obtained so far. The matrix H summed over all observations is of full rank, which in this case is rank (H)=23. The largest singular value is on the order of $1e^{13}$ and the smallest singular value is on the order of $1e^{-1}$.

This creates a ratio of $$\frac{d_{min}}{d_1} = \frac{0.01}{1e^{13}} = 1e^{-15} \quad (4.49)$$

The precision of the machine these calculations were done on is on the order of $1e^{-16}$. To better condition the solution of problem, a scaling factor may be implemented to the β coefficients of the series of approximating semi-major axis. This will aid in stabilizing the solution obtained by minimizing the relative difference between the parameters being estimated. As an estimate the coefficient used to predict semi-major axis will be on the order of 0.005. The following equations shows how the scale factor was applied to the semi-major axis. These scaling factors are also present in Table 4.3 where the partials of each element with respect to the β coefficients are shown $$\hat{a} = a_1\beta_1 + a_2\beta_2\theta + a_3\beta_3\cos(2\pi f_a\theta) + a_4\beta_4\sin(2\pi f_a\theta) \quad (4.50)$$

The scaling values used in this analysis are listed below $$a = [a_{mean}, 1e^7, 1e^7, 1e^7] \quad (4.51)$$

With the inclusion of the scaling factor, the matrix H is still of full rank, rank (H)=23. The largest singular value is on the order of $1e^{13}$ and the smallest singular value has increased to value on the order of $1e^6$. This creates a ratio of $$\frac{d_{min}}{d_1} = \frac{1e^6}{1e^{13}} = 1e^{-7} \quad (4.52)$$

This ratio value is several magnitudes larger than precision of the machine and therefore the resulting solution is less likely to be ill-conditioned in the presence of measurement error. As described earlier, the error of the ephemeris products from the IGS is on the order of centimeters. Most of the error that will be introduced to the measurement vector y will be due to propagation of the IGS orbits as discussed herein. The effects of propagation error have on growth fit error and stability of the solution will be described later herein.

Numerical results obtained from implementing the batch filter algorithm have been analyzed. The first set of results are from estimating the original model proposed in Equation 3.9. An extended model, based upon a compression of the first set residuals, was investigated and the results compared to the fit error of the original model. An error analysis of both models shows the growth of fit error as a function of the fit interval. Propagation error is simulated to show the growth of RMS error with propagation error.

The $\beta$ coefficients presented in Equation 3.9 may be fitted to various lengths of IOS data, ranging from 1 day to one week, using batch filters as shown in FIGS. 4.4 and 4.5. The estimated parameters may be initialized using the mean Keplerian orbital elements calculated for observation data prior to current data sets as the constant term for each element excluding true anomaly. The initial value of true anomaly may be estimated using the previous data to calculate the true value of true anomaly at that time. The value at the desired epoch may be calculated using the normal value of the satellite orbit period to determine the mean angular velocity and then the computed value of the angular velocity may be used to approximate what the value of true anomaly should be at the time of interest. The fact that the GPS orbits are nearly circular implies that the rate of change of true anomaly may be nearly twice the rotation rate of the Earth. All remaining rate and amplitude parameters may be initialized to zero. The form of the initial state vector is illustrated in FIG. 5.1 below. No a prior state information is used (initial values for the matrices $N_1$ and $N_0$ in FIGS. 4.4 and 4.5 are set to zero).

$$X_0^* = [a_{mean}, 0, 0, 0, e_{mean}, 0, 0, 0, 0, 0, i_{mean}, 0, 0, 0, \Omega_{mean}, 0,$$
$$0, 0, \theta_0^*, 2R_e, 0, 0, \omega_{mean}] \quad (5.1)$$

Implementing this initial state vector for various data intervals results in the RMS errors found from one instance of processing actual IGS data as described in MODEL-BASED COMPRESSION OF GPS EPHEMERIS, A Thesis Submitted to the Faculty of Purdue University by Brenda E. Eichel on December 2005 thesis and as listed in Table 5.1 below. RMS is the condition used to test conversions and for these results, the filter is assumed to have converged to the value of the RMS between iterations varies by less than $1 \times 10^{-9}$ meters. The values in Table 5.1 represent the average RMS values for each fit interval over several data sets. These data sets include data from each month of a year of data and for a satellite in each of the 6 orbital planes. The listed values are therefore more of a typical RMS value than specific value for a given satellite and data set. On the other hand, FIGS. 5.1 to 5.4 show the fit residuals for a particular satellite, PRN1, for a particular set of data from January 2003.

TABLE 5.1

Fit Residuals for Several Fit Intervals

| Fit Int. [hrs] | RMS($X_{ECEF}$) [m] | RMS($Y_{ECEF}$) [m] | RMS($Z_{ECEF}$) [m] | RMS($_{All\ Obs.}$) [m] |
|---|---|---|---|---|
| 24 | 9.2005 | 11.5885 | 10.5725 | 10.4995 |
| 72 | 64.6254 | 63.1118 | 108.0095 | 81.3327 |
| 120 | 202.8082 | 235.4045 | 375.4118 | 281.3541 |
| 168 | 474.9418 | 511.1637 | 737.1685 | 586.0249 |

In order to assess if the current model meets the accuracy requirements for such applications as E-911 mandate and LBS, the requirements for these applications need to be reviewed. For Enhanced 911 services, the FCC has set the following requirements for service providers:

handset based solutions—50 meters for 67% of calls in 150 meters for 95% of calls Network Based Solutions—100 meters for 67% of calls and 300 meters for 95% of calls User position accuracy for LBS may vary from provider to provider, but to be useful to the user typical values for several LBS are listed in Table 5.2 below.

TABLE 5.2

Typical LBS Requirements [11]

| Service | User Position Accuracy[m] |
|---|---|
| Driving Conditions | 100 |
| Road Hazard | 10 |
| Road Map | 100 |

Based on these accuracy required, the results for the 24 hours fit interval are only results that can meet the typical user position error for all of these applications. Also, because of the latency of the IGS data files, in practice, the orbits may need be propagated to the time of interest which will add additional error.

Therefore, it is advantageous to try and improve the fit error so that the overall fit errors still meet the requirements for E-911 and LBS. The results so far show that the fit interval can be expanded from 4 hours to 24 hours, but a longer propagating ephemeris may be more desirable. To try and extend the fit interval a second compression model was developed and fit to the residuals in FIGS. 5.1 to 5.4.

In order to improve the fit of the model a second compression model, which includes a second Fourier analysis was applied to the residuals of the previous of. This fit was done on each Cartesian element of the position vector with respect to time. Such fit helps to identify influences that are not periodic with argument of latitude, such as solar pressure and third body lunar and solar perturbations. Also, the position vectors are be rotated to the RSW frame (see Appendix A) to better model these perturbations. In general, the along-track and in-track terms are more susceptible to perturbations and therefore can be several magnitudes larger.

Next, a Fourier analysis may be performed on the position residuals. Detrending is not required, in that the secular terms have been modeled and been mostly removed by the first fit. Applying the FFT as described above, FIG. 5.5 depicts the power spectrum versus frequency for each of the RSW position residuals for several fit intervals. Although the dominant frequencies appear to coincide with harmonics of the orbit period, issues may arise with the FFT of true anomaly. Since the periods of the satellites vary, a single frequency cannot be used for all satellites without incurring additional error. As a result, the nominal value of the dominant frequencies from the $2^{nd}$ FFT will also need to be uploaded to the receiver. Again, these values do not change as quickly as the Beta parameters and therefore can be uploaded infrequently. Using these results, a periodic model for the fit residuals from the first compression may be formed and is as listed below:

$$\delta R = \alpha_1 \cos(2\pi f_{R1}t) + \alpha_2 \sin(2\pi f_{R1}t)$$

$$\alpha_3 \cos(2\pi f_{R2}t) + \alpha_4 \sin(2\pi f_{R2}t)$$

$$\delta S = \alpha_5 \cos(2\pi f_{S1}t) + \alpha_6 \sin(2\pi f_{S1}t)$$

$$\alpha_7 \cos(2\pi f_{S2}t) + \alpha_8 \sin(2\pi f_{S2}t)$$

$$\delta W = \alpha_9 \cos(2\pi f_{W1}t) + \alpha_{10} \sin(2\pi f_{W1}t) \qquad (5.2)$$

A similar Batch filter is described in FIGS. 4.4 to 4.5 may be utilized for the $2^{nd}$ compression. For this fit, the state being estimated consisted of the α parameters in Equation 5.2 and the observations being fit to were the residuals from the first fit. The non-zero components of the observation matrix are shown as listed in Table 5.3 below. Similarly, no a priori information was used and the α parameters are assumed to be constant over the time interval of the observation, therefore the state of transition matrix is the identity matrix. This second fit model is also a time-varying linear system, so that the step of selecting a reference trajectory and linearizing about it is not necessary.

TABLE 5.3

2nd Fit Observation Matrix Elements $\tilde{H}_{1,1} = \cos(2\pi f_{R1}t)$
$\tilde{H}_{1,2} = \sin(2\pi f_{R1}t)$
$\tilde{H}_{1,3} = \cos(2\pi f_{R2}t)$
$\tilde{H}_{1,4} = \sin(2\pi f_{R2}t)$
$\tilde{H}_{2,5} = \cos(2\pi f_{S1}t)$
$\tilde{H}_{2,6} = \sin(2\pi f_{S1}t)$
$\tilde{H}_{2,7} = \cos(2\pi f_{S2}t)$
$\tilde{H}_{2,8} = \sin(2\pi f_{S2}t)$
$\tilde{H}_{3,9} = \cos(2\pi f_{W1}t)$
$\tilde{H}_{3,10} = \sin(2\pi f_{W1}t)$ The resulting fit errors for the $2^{ns}$ compression may be observed in FIGS. 5.6 to 5.9. The RMS errors for the various fit intervals are listed in Table 5.4 below for comparison to Table 5.1 above. The inclusion of the α parameters improved the RMS error but this result is still being fit to the IGS final Products. The effects of propagation error needs to be investigated as will be described later herein.

TABLE 5.4

2nd Fit Residuals for Several Fit Intervals

| Fit Int. [hrs] | RMS($X_{ECEF}$) [m] | RMS($Y_{ECEF}$) [m] | RMS($Z_{ECEF}$) [m] | RMS($_{All\,Obs.}$) [m] |
|---|---|---|---|---|
| 24 | 3.7833 | 3.6182 | 5.9182 | 4.5618 |
| 72 | 26.2415 | 27.2937 | 30.9353 | 28.2286 |
| 120 | 71.5547 | 73.7251 | 93.6950 | 80.2791 |
| 168 | 128.1719 | 130.7578 | 141.7957 | 133.7058 |

The results as described above have been computed using the post-processed IGS Final Products. However, in implementation, within the scope of the present invention and as described below, the satellite orbit data may be propagated from the time when the most recent IGS data is available through the interval of time that the ephemeris parameters are to be fit. Although there exist highly accurate orbit propagators, all will increase the error of ECEF position data used in the Ephemeris model fit by some amount.

In an effort to evaluate the effects of this additional error, random error was added to the IGS precise orbital data to simulate the propagation error. Also, predicted orbits produced by IGS, as part of their Ultra Rapid Products, were used to show the growth in fit error RMS of the ephemeris parameter compared to those fit to the Final IGS products. Further, one of the IGS Analysis Centers, the Center for Orbit Determination in Europe, produces and archives five day predicted orbits that demonstrate the growth of propagation over time which may be used to show how the RMS error would grow if several days of operation, without contact, are desirable.

As mentioned above, the Rapid Products produced by IGS contain 48 hours of continuous orbit data. The first 24 hours are based on actual tracking data and the second 24 hours are predicted orbits. The predicted 24 hour orbits are compared to post processed orbits of the Final Products and the error between the two is shown in FIG. 5.10.

The overall RMS of the residuals between the post-processed orbit and the predicted orbit for this case is 0.45789 meters. Referring to FIG. 5.11, produced by IGS, statistics on the RMS of predicted Ultra Rapid Products in comparison to the Final Products over several years is shown. Fitting the model, using both α and β coefficients, to the predicted 24 hours of the IGS Ultra Rapid Products results in the fit error shown in FIG. 5.12. Table 5.5 shows the values of the fit RMS for 24 hours of projected orbits

TABLE 5.5

24 Hour Fit Using IGS Ultra Rapid Products

| Fit Int.[hrs] | RMS($X_{ECEF}$) [m] | RMS($Y_{ECEF}$) [m] | RMS($Z_{ECEF}$) [m] | RMS($_{All\,Obs.}$) [m] |
|---|---|---|---|---|
| Ultra Rapid | 3.7925 | 3.6281 | 5.9276 | 4.5710 |

The center for Orbit Determination in Europe (CODE) produces 5 day predicted orbits and makes them accessible for download until the IGS Final Products for those days are available. A comparison between these predicted orbits and the IGS Rapid Products are shown in FIG. 5.13. The comparison gives an idea of how quickly the error in GPS predicted orbits will grow over several days. However, referring again to FIG. 5.11, the results from the CODE analysis center labeled 'COU', have the least RMS error of all of the analysis centers shown. This may indicate that the low error in the CODE orbits may be a bias representation of how well GPS predicted orbit error grows.

See how the errors in the converged solution would be affected by large propagation errors, RMS errors between 0.1 to 5 meters is included in the IGS Final Orbits using Matlab's random number generator and scaling the produced matrix to obtain the desired level of added error. FIGS. 5.14-5.16 depict these different levels of simulated error for several fit intervals. The corresponding RMS errors are shown in Tables 5.6-5.8. For fitting the α and β parameters to 24 hours of IGS data with various levels of simulated random error added to the observation data. This shows, for example, that if three days of ephemeris data are desired and are separated in three 24 hour ephemeris fits, the predicted orbits for the 3rd day could have an RMS error as large as five meters and this model would still be able to reconstruct the satellite orbits with less than ten meter RMS error.

TABLE 5.6

Simulated Error RMS for 24 Hour Fit

| Sim. RMS Error [m] | RMS($X_{ECEF}$) [m] | RMS($Y_{ECEF}$) [m] | RMS($Z_{ECEF}$) [m] | RMS($_{All\ Obs.}$) [m] |
|---|---|---|---|---|
| .1 | 3.7992 | 3.6344 | 5.9421 | 4.5808 |
| 1 | 3.9542 | 3.7811 | 6.0034 | 4.6895 |
| 2.5 | 5.5394 | 5.2798 | 7.2137 | 6.0718 |
| 5 | 6.6667 | 6.4702 | 7.9408 | 7.0561 |

TABLE 5.7

Simulated Error RMS for 72 Hour Fit

| Sim. RMS Error [m] | RMS($X_{ECEF}$) [m] | RMS($Y_{ECEF}$) [m] | RMS($Z_{ECEF}$) [m] | RMS($_{All\ Obs.}$) [m] |
|---|---|---|---|---|
| .1 | 27.6179 | 24.2599 | 32.2448 | 28.2313 |
| 1 | 27.6271 | 24.2786 | 32.3040 | 28.2622 |
| 2.5 | 27.7059 | 24.5368 | 32.3709 | 28.3875 |
| 5 | 28.0763 | 24.7455 | 32.6521 | 28.6751 |

TABLE 5.8

Simulated Error RMS for 120 Hour Fit

| Sim. RMS Error [m] | RMS($X_{ECEF}$) [m] | RMS($Y_{ECEF}$) [m] | RMS($Z_{ECEF}$) [m] | RMS(All Obs.) [m] |
|---|---|---|---|---|
| .1 | 71.5459 | 73.7233 | 93.6884 | 80.2773 |
| 1 | 71.5825 | 73.7842 | 93.6955 | 80.2947 |
| 2.5 | 71.7444 | 73.9457 | 93.7648 | 80.4302 |
| 5 | 71.9831 | 74.5575 | 93.9622 | 80.7337 |

It should be appreciated that the previously described ephemeris model may be implemented into the current GPS and network infrastructure. In general, this would involve a separate reference station that would collect IGS data as well as any other outside information that would be needed to process the data. The IGS orbits would then be propagated forward, using a previously developed orbit propagator, to the epoch of interest and longer propagating ephemeris model parameters are then fit to the predicted orbits.

These elements would be broadcast to the receiver and used to reconstruct the satellite positions such that the receiver position could determine using the tracking data. As described below the proposed reference station, the required external information and an algorithm implemented by the receiver to compute the satellite position are provided in an embodiment of the present invention.

The method and system of the present invention may take many different forms or implementations. For example in an implementation or embodiment of the present invention, a longer propagating ephemeris, a reference station would be used to collect IGS data, propagate the satellite orbits to the current epoch, and then fit the ephemeris format to those predicted orbits. This information is then sent to the receiver. A schematic of this setup is shown in FIG. 6.1. This figure shows how the ground interactions would occur as well as a detailed time line of the processes occurring within the reference station. An in-depth description of the reference station 100 is shown.

Referring now to FIGS. 6.1 reference station 102 as shown as part of System 100 of an embodiment of the present invention. The reference station 102 would initially obtain the most up to date precise orbit data 104 from the international GNSS Service 106 or an equivalent service provided freely or commercially. This may be in the form of either the Final Products, which have a latency of approximately 14 days, or the Rapid Products which have a latency of around 17 hours.

As mentioned earlier, the accuracy of these products is very similar and would not be noticeable to the average GPS user, however, the Final Products contain station coordinate and velocity values for global tracking network from a combination of weekly data sets. This implies that the Final Products provide little advantage to the one day latency of the Rapid Products.

Therefore, the Rapid Products may be better suited for this application. From this data, the satellite orbits will need to be propagated to the current epoch as well as into the future to cover the desired period of time the ephemeris data will need to be provided for. Once the orbits have been propagated, the batch filter 108 described above will be applied to fit the predicted orbits for a certain interval as required by the accuracy of the application.

Referring now to FIG. 6.2 a flow chart of how the parameters would be obtained is shown. As mentioned earlier, the dominant frequencies for true anomaly and the $2^{nd}$ fit may not need to be updated as often as the α and β parameters. Therefore, the reference station may only infrequently perform FFT analysis on the time series of true anomaly and the $1^{st}$ fit residuals to monitor the value may be used to monitor the value of these frequencies, for instance once a month, and then determine if that value needs to be updated.

The limits to determine if the value needed needs to be updated may be determined experimentally or in other manners. This way the reference station, in general, will be fitting the β parameters to the predicted orbits and then the α parameters to the $1^{st}$ fit residuals.

Referring to FIG. 6.1, several sets of a longer propagating ephemeris sets could be sent to the receiver. For example, if the receiver requires new data at some time zero as marked on the time line in FIG. 6-1 and the accuracy of the particular application requires the fit internal to be 24 hours, then 7 ephemeris sets may be sent to the receiver to provide an orbit data for a week or other chosen time frames. Each set may contain information on the time of applicability and the receiver may utilize the ephemeris set which is valid during the current epoch.

In practice, there may also need to be some type of distribution server. This way the reference station can compute the updated ephemeris parameter and make any dominant frequency updates. The reference station may then send this information to the distribution server. Then, depending on how often the receiver needs to acquire new ephemeris data it may communicate with the distribution server via a wireless link or possibly through the internet to download the new data. Then the receiver can operate for a period of time for example, two to ten days, possibly seven days, without communicating with the distribution server. It may be possible that the distribution server may be part of the reference station, but it should be appreciated that the distribution server and the reference station may be separate items.

The inclusion of information about satellite maneuvers may be an aspect of this issue. For example, an issue may occur with providing satellite positioning information into the future may be how to account for planned or unplanned station keeping maneuvers. The US Coast Guard Navigation Center (NAVCEN) provides notification of changes in constellation operational status that affect the service being provided to GPS users. The NAVCEN provide the public with information on the GPS status through operation of the Navigational Information Services (NIS). This notification is accomplished through a notice: Advisory to Navigation Users (NANU) in this case of a scheduled event affecting the GPS users, the NIS will issue an appropriate NANU at least 48 hours prior to the event. In the case of an unscheduled event, the notification will be provided as soon as possible after the event. Referring now to FIG. 6.3, the format of the GPS operational advisory is shown. The planned and unplanned outages are listed separately and include PRN number, the reason for the outage and the time interval of the outage.

The reference station may perform an additional service by obtaining the recent NANU (or advisory from another service) and searching it to identify planned satellite maneuvers. If a maneuver is planned within a time frame of requested ephemeris data, the reference station would delete the satellite ephemeris, or flag it as "bad" prior to distributing the compressed ephemeris. This will serve to reduce the likelihood that the distributed ephemerides are in error due to satellite maneuvers.

A key factor in introducing a longer propagation ephemeris is defining what information is to be sent to the receiver and how the receiver uses this information to reconstruct the satellite positions. The broadcast message sent to the receiver may consist of the information provided in Table 6.1, and may need updated each time the data message becomes out of date, which will depend on the fit interval. Except for the dominant frequencies, which may only need to be updated infrequently. Other parameters needed to reconstruct the satellite orbits include the WGS 84 defined in the specific rotation rate of the Earth, which may be programmed into the receiver.

TABLE 6.1

Parameters of the Uploaded Broadcast Message

| Parameter | Description |
|---|---|
| $GAST_0$ | Greenwich Apparent Sidereal Time at Reference Time[rad] |
| $t_{oe}$ | Reference Time of the Ephemeris[sec] |
| $\beta_0$ | Parameters of $1^{st}$ Fit [23 parameters] |
| $\alpha_0$ | Parameters of $2^{nd}$ Fit [10 parameters] |
| $f_{\theta^*}$ | Dominant Frequency for True Anomaly [1 parameter] |
| $f_R, f_S, f_W$ | Dominant Frequency for $2^{nd}$ Fit[5 parameter] |

The following outline steps through how these parameters would be used to reconstruct satellite orbits. The resulting positions will be in the WGS84 frame used by GPS and will have the accuracy described above.

1. First compute the difference in time from the reference time of the ephemeris ($t_{oe}$) to the current epoch.

$$t_k = t - t_{oe} \tag{6.1}$$

Where t is the current time. Ideally, this may be done similar to how GPS receivers currently compute this term. Both t and $t_{oe}$ may be in seconds of the current GPS week and $t_k$ may be the actual time difference between t and $t_{oe}$ and may account for the end of the week crossovers.

2. Use $\beta$ coefficients and $t_k$ to calculate Keplerian orbital elements $$\theta^* = \beta_{19} + \beta_{20}t_k + \beta_{21}\cos(2\pi f_{\theta}^* t_k) + \beta_{22}\sin(2\pi f_{\theta}^* t_k)$$

$$\omega = \beta_{23}$$

$$\theta = \omega + \theta^*$$

$$a = \beta_1 + \beta_2\theta + \beta_3\cos(2\theta) + \beta_4\sin(2\theta)$$

$$e = \beta_5 + \beta_6\theta + \beta_7\cos(\theta) + \beta_8\sin(\theta) + \beta_9\cos(3\theta) + \beta_{10}\sin(3\theta)$$

$$i = \beta_{11} + \beta_{12}\theta + \beta_{13}\cos(2\theta) + \beta_{14}\sin(2\theta)$$

$$\Omega = \beta_{15} + \beta_{16}\theta + \beta_{17}\cos(2\theta) + \beta_{18}\sin(2\theta) \tag{6.2}$$

3. Calculate the magnitude of the position vector and the corrections to the RSW frame from the $\alpha$ parameters $$r = \frac{a(1-e^2)}{1+e\cos(\theta^*)} \tag{6.3}$$

$$\delta r = \alpha_1\cos(2\pi t_k f_{R1}) + \alpha_2\sin(2\pi t_k f_{R1}) + \alpha_3\cos(2\pi t_k f_{R2}) + \alpha_4\sin(2\pi t_k f_{R2})$$

$$\delta s = \alpha_5\cos(2\pi t_k f_{S1}) + \alpha_6\sin(2\pi t_k f_{S1}) + \alpha_7\cos(2\pi t_k f_{S2}) + \alpha_8\sin(2\pi t_k f_{S2})$$

$$\delta\omega = \alpha_9\cos(2\pi t_k f_{W1}) + \alpha_{10}\sin(2\pi t_k f_{W1}) \tag{6.4}$$

4. Use the transformation from RSW frame to ECI frame as shown in Appendix A to compute satellite positions in ECI frame. The elements of this transformation matrix are shown below:

$$h_{1,1} = \cos(\Omega)\cos(\theta) - \sin(\Omega)\cos(i)\sin(\theta)$$

$$h_{1,2} = -\cos(\Omega)\sin(\theta) - \sin(\Omega)\cos(i)\cos(\theta)$$

$$h_{1,3} = \sin(\Omega)\sin(i)$$

$$h_{2,1} = \sin(\Omega)\cos(\theta) + \cos(\Omega)\cos(i)\sin(\theta)$$

$$h_{2,2} = -\sin(\Omega)\sin(\theta) + \cos(\Omega)\cos(i)\cos(\theta)$$

$$h_{2,3} = -\cos(\Omega)\sin(i)$$

$$h_{3,1} = \sin(i)\sin(\theta)$$

$$h_{3,2} = \sin(i)\cos(\theta)$$

$$h_{3,3} = \cos(i) \tag{6.5}$$

$$X_{ECI} = (r + \delta r)h_{1,1} + \delta s h_{1,2} + \delta\omega h_{1,3}$$

$$Y_{ECI} = (r + \delta r)h_{2,1} + \delta s h_{2,2} + \delta\omega h_{2,3}$$

$$Z_{ECI} = (r + \delta r)h_{3,1} + \delta s h_{3,2} + \delta\omega h_{3,3} \tag{6.6}$$

5. Transform positions from ECI frame to the ECEF frame using $GAST_0$ and the rotation rate of the Earth to approximate the GAST at the current epoch.

$$X_{ECEF} = \cos(GAST_0 + R_e t_k)X_{ECI} + \sin(GAST_0 + R_e t_k)Y_{ECI}$$

$$Y_{ECEF} = -\sin(GAST_0 + R_e t_k)X_{ECI} + \cos(GAST_0 + R_e t_k)Y_{ECI}$$

$$Z_{ECEF} = Z_{ECI} \tag{6.7}$$

According to the present invention and referring now to FIG. 6.4 another embodiment of the present invention is shown as reference station 200. Reference Station 200 is utilized for providing compressed data to represent a propagated ephemeris. The reference station 200 includes a capacity to download, or otherwise transfer, at regular intervals, pre-computed orbit position data 204 from a precise orbit determination service, for a first epoch 206 of a satellite ephemeris 208. The data 204 may be from, for example, International GNSS Service (IGS).

The reference station 200 further includes an orbit propagator 210 for propagating orbital positional data 212 for a second epoch 214 of an ephemeris 216 for the satellite 209 corresponding to the received orbital positional data 204. The satellite 209 is one of the satellites 211 of the GPS system. The reference station 200 further includes an ephemeris compressor 218 for fitting an ephemeris format 220 to the propagated orbital positional data 212 of the second epoch 214 to generate compressed data 222 for representing the second epoch 214 of the satellite ephemeris. The reference station 200 further includes a transmitter 224 for sending the data 222 via a medium 223 to a GPS device 227 which includes satellite receiver 225. The data 222 is combined in the GPS device 227 with a range message 229 received from at least some of the satellites 211 in the GPS satellite systems (range messages 229 from four or more satellites 211 should be sufficient for determining the position of the receiver, in combination with the satellite ephemeris) for computing a location of the GPS device 227 from a satellite position 228 represented by the compressed data 222 and the range message 229. The transmitter 224 may be in the form of a server or website. The medium 223 may be in the form of the internet or other intranet or communication system. The receiver 225 may be directly connected to the medium 223 or may be in radio or other electronic communication with the medium 223. The receiver 225 may alternatively be in intermittent contact with the medium, as the data 222 may only need to be transmitted for a few minutes, once a day.

According to an aspect of the present invention the ephemeris compressor 218 of the reference station 200 may include a Keplerian compressor for fitting a Keplerian ephemeris model as defined in equations (6.2) to the propagated orbital positional data to generate estimated Keplerian model coefficients.

According to another aspect of the present invention, the reference station 200 may include the ephemeris compressor 280 having a positional residual generator 230 for computing fit residuals 230 and 232 between the Keplerian ephemeris model and the propagated model and the propagated orbital positional data 212 in an Earth centered reference frame. The ephemeris compressor 218 may further include a frame of reference transformer 234 for transforming the computed fit residuals 232 to a satellite reference frame 236. The ephemeris compressor 218 may further include a positional residual compressor 238 for fitting a periodic positional model 240 as defined in equations (6.4) to the computed fit residuals to generate estimates of coefficients of the periodic positional model.

Referring now to FIG. 6.5 another embodiment of the present invention is shown as method 300 for propagating ephemeris data for a satellite in orbit. The method 300 includes a step 302 of receiving orbital positional data for a first time period of a satellite's orbit and a step 304 of propagating orbital positional data for the Earth's satellite orbit during a second time period extending beyond the first time period. The method 300 may further include a step 306 of fitting a Keplerian ephemeris model to the propagated orbital positional data to estimate model coefficients and a step 308 of sending the estimated model coefficients to receivers for determining the receiver position at a time during the second the time period.

According to another aspect of the present invention the method 300 may further include the model fitting step 306 may further include the steps of generating velocity vectors for satellite positions in the first and second time periods and step of generating arguments of latitude for the satellite positions from the orbital positioning data for the satellite positions and generating velocity vectors for the satellite positions.

Referring now to FIG. 6.6 another embodiment of the present invention is shown as method 400 for reacting to planned satellite maneuvers, including a step 402 of receiving notification of planned satellite maneuvers from public or private sources including the government and a step 404 of deleting ephemerides generated for satellites for time subsequent to the time of a planned maneuver. The method 400 also includes a step 406 generating a warning message to be distributed with the ephemerides that indicates that time of a planned maneuver.

Referring now to FIG. 6.7 yet another embodiment of the present invention is shown as method 500 for verifying that satellite maneuvers would not affect the navigation of a navigation receiver. The method 500 includes a step 502 of receiving notification of transmitted time of planned satellite maneuvers from public or private sources including the government and a step 504 of comparing the transmitted time of planned satellite maneuvers to time that satellites are used in navigation. The method 500 also includes a step 506 of verifying that the transmitted time of planned satellite maneuvers is not prior to the time that satellites are used in navigation and will not affect the navigation of a navigation receiver.

Referring now to FIG. 6.8 yet another embodiment of the present invention is shown as method 600 for receiving ephemeris data for a satellite in Earth orbit at a navigation receiver. The method 600 includes a step 602 of receiving estimated model coefficients of orbital positional data for a second time period of a satellite's Earth orbit, the second time period extending beyond a first time period, the estimated model coefficients based on propagating orbital positional data for the first time period of a satellite's Earth orbital positional data, the model coefficients obtained from fitting a Keplerian ephemeris model to the propagated orbital positional data to estimate the model coefficients. The method 600 also includes a step 604 of determining the receiver position at a time during the second time period, based at least partially on the estimated model coefficients.

According to another aspect of the method 600 of the present invention, the estimated model coefficients may be defined by the dominant frequencies in argument of latitude and time to compute the position of a GPS satellite at a requested time, t, in at least one of the ECI and the ECEF reference frame.

According to yet another aspect of the method 600 of the present invention, the computing of the position of the GPS satellite may be based on using equations:

$$t_k = t - t_{oe} \tag{6.1}$$

$$\theta^* = \beta_{19} + \beta_{20} t_k + \beta_{21} \cos(2\pi f_\theta * t_k) + \beta_{22} \sin(2\pi f_\theta * t_k)$$

$$\omega = \beta_{23}$$

$$\theta = \omega + \theta^*$$

$$a = \beta_1 + \beta_2 \theta + \beta_3 \cos(2\theta) + \beta_4 \sin(2\theta)$$

$$e = \beta_5 + \beta_6 \theta + \beta_7 \cos(\theta) + \beta_8 \sin(\theta) + \beta_9 \cos(3\theta) + \beta_{10} \sin(3\theta)$$

$$i = \beta_{11} + \beta_{12} \theta + \beta_{13} \cos(2\theta) + \beta_{14} \sin(2\theta)$$

$$\Omega = \beta_{15} + \beta_{16} \theta + \beta_{17} \cos(2\theta) + \beta_{18} \sin(2\theta) \tag{6.2}$$

$$r = \frac{a(1 - e^2)}{1 + e\cos(\theta^*)} \tag{6.3}$$

$\delta r = \alpha_1 \cos(2\pi t_k f_{R1}) + \alpha_2 \sin(2\pi t_k f_{R1}) + \alpha_3 \cos(2\pi t_k f_{R2}) + \alpha_4 \sin(2\pi t_k f_{R2})$ $\delta s = \alpha_5 \cos(2\pi t_k f_{S1}) + \alpha_6 \sin(2\pi t_k f_{S1}) + \alpha_7 \cos(2\pi t_k f_{S2}) + \alpha_8 \sin(2\pi t_k f_{S2})$ $\delta \chi = \alpha_9 \cos(2\pi t_k f_{w1}) + \alpha_{10} \sin(2\pi t_k f_{w1})$ (6.4)

$h_{1,1} = \cos(\Omega)\cos(\theta) - \sin(\Omega)\cos(i)\sin(\theta)$ $h_{1,2} = -\cos(\Omega)\sin(\theta) - \sin(\Omega)\cos(i)\cos(\theta)$ $h_{1,3} = \sin(\Omega)\sin(i)$ $h_{2,1} = \sin(\Omega)\cos(\theta) + \cos(\Omega)\cos(i)\sin(\theta)$ $h_{2,2} = -\sin(\Omega)\sin(\theta) + \cos(\Omega)\cos(i)\cos(\theta)$ $h_{2,3} = -\cos(\Omega)\sin(i)$ $h_{3,1} = \sin(i)\sin(\theta)$ $h_{3,2} = \sin(i)\cos(\theta)$ $h_{3,3} = \cos(i)$ (6.5)

$X_{ECI} = (r + \delta r) h_{1,1} + \delta s h_{1,2} + \delta \omega h_{1,3}$ $Y_{ECI} = (r + \delta r) h_{2,1} + \delta s h_{2,2} + \delta \omega h_{2,3}$ $Z_{ECI} = (r + \delta r) h_{3,1} + \delta s h_{3,2} + \delta \omega h_{3,3}$ (6.6)

DETAILED DESCRIPTION

Comparison of NICE Format Proposed for the Upgraded GPS Installation

The satellite position representation used for the new civil (L2C and L5) and the military (M¬code) is the Improved Clock and Ephemeris (ICE) model [29]. This format is similar to the broadcast ephemeris format currently used by GPS, but includes a few more parameters. The parameters contained within the ICE model are Keplerian elements (correction to semi major axis, $\Delta A$, eccentricity, e, mean anomaly, M0, argument of perigee, $\omega$, right ascension of the ascending node, $\Omega_0$, inclination, $i_0$, time of applicability, $t_{OE}$), secular rates in these elements ($\dot{A}$, $\Delta_{n0}$, $\dot{\Omega}$, $\dot{i}_0$) and harmonic coefficients ($C_{uc}$, $C_{us}$, $C_{rc}$, $C_{rs}$, $C_{ic}$, $C_{is}$). As with the current broadcast ephemeris, the fit interval used for the ICE model is 4 hours and it does not predict well outside this interval.

The proposed long-propagating ephemeris format and ICE have a similar

TABLE 9

Residuals (in ECEF frame) following the second fit, truncated for several fit intervals, computed using 1 month of IGS for PRN 1 format.

| Fit Int. [hrs] | RMS(X) [m] | RMS(Y) [m] | RMS(Z) [m] | RSS [m] |
|---|---|---|---|---|
| 24: 16-bits | 181.71 | 175.52 | 157.96 | 297.95 |
| 24: 24-bits | 7.94 | 3.41 | 7.79 | 11.634 |
| 24: 32-bits | 3.78 | 3.61 | 5.92 | 7.89 |
| 168: 16-bits | 148.63 | 148.29 | 159.73 | 263.81 |
| 168: 24-bits | 128.26 | 130.72 | 141.81 | 231.62 |

TABLE 9-continued

Residuals (in ECEF frame) following the second fit, truncated for several fit intervals, computed using 1 month of IGS for PRN 1 format.

| Fit Int. [hrs] | RMS(X) [m] | RMS(Y) [m] | RMS(Z) [m] | RSS [m] |
|---|---|---|---|---|
| 168: 32-bits | 128.25 | 130.75 | 141.72 | 231.57 |

Differences include the use of argument of latitude as the independent variable to determine the secular trends of the other elements, and the use true anomaly vs. mean anomaly in computing the orbital position. Harmonic corrections are provided for semi-major axis and the right ascension of the ascending node. A second harmonic frequency is used for the corrections to eccentricity, and the along-track and cross-track positions. A rate term for eccentricity is also included.

For a 24 hour fit interval, the proposed ephemeris set only requires 41 parameters be uploaded to the receiver. As shown in Section 5.4, descent accuracy can be obtained at the 24¬bit level (984 bits total) and desirable accuracy can be obtained at the 32¬bit level (1312 bits total). For comparison, the ICE format contains 19 parameters and uses a fit interval of 4 hours. If this format is utilized, then 6 sets of elements (114 elements and 2718 bits total) are needed to provide 24 hours of satellite orbits.

Singular value analysis [30, 31, 32] was applied to the least squares estimation problem for the orbit model in equation 2. As a general rule to avoid singularities, the ratio of the lowest singular value to the largest singular value should be several orders of magnitude higher than the machine accuracy $\epsilon_{machine}$. The largest singular value was typically found to be on the order of $1e^{13}$ and the smallest singular value is on the order of $1e^{-1}$. This creates a ratio of $(d_{min}/d_1) = (0.01/1e^{-15}$ The machine precision of these calculations was on the order of 1e-16. To better condition the solution of this problem, a scale factor was applied to the $\beta$ coefficients of the series approximating semi-major axis.

$a = a1\beta + a2\beta 2\theta + a3\beta 3 \cos(2\pi f a\theta) + a4\beta 4 \sin(2\pi f a\theta)$ This stabilized the solution obtained by reducing the range in orders of magnitude between the parameters being estimated. As an example, the coefficients used to predict semi major axis (in meters) would be on the order of 2.65e which will quite large in comparison to those for eccentricity, which will be on the order of 0.005. The scale factors used in Equation (6) are $a = [a_{mean}, 1e^7, 1e^7, 1e^7]$ With the inclusion of the scaling factor, the largest singular value was on the order of $1e^{13}$ and the smallest singular value has increased to value on the order of 1e6. This creates a ratio of 6 dmin $1e = 1e^{-7} = (8) 1e^{13}$ d1

This ratio value is several magnitudes larger than precision of the machine and therefore the resulting solution is less likely to be ill-conditioned in the presence of measurement error.

The purpose of this section is to describe how the previously described ephemeris model could be implemented into the current GPS and network infrastructure. In general, this would involve a server that would collect IGS data. The IGS orbits would then be propagated forward to the epoch of interest. A high fidelity orbit propagator, such as MicroCosm (http://www.vmsimicrocosm.com/gps.html) or Gipsy-Oasys-II could be applied for this purpose. The longer propagating ephemeris would then be fit to the predicted orbits. These elements would then be broadcast to the receiver and used to reconstruct the satellite positions. The following sections outline a description of the proposed server software, the required external information, and an algorithm to be implemented inside the receiver.

In this proposed implementation, a server would be used to collect IGS data, propagate the satellite orbits to the current epoch, and then fit the ephemeris format to these predicted orbits. This information is then sent to the receiver. A schematic of this implementation is shown in FIG. 7.2. This figure depicts the data transfers that would occur, as well as a detailed time line of the processes occurring on the server. A description of the server follows.

The server would initially obtain the most recent Rapid Products from the IGS. The satellite orbits would then be propagated into the future to cover the desired period of time during which the ephemeris data would be needed.

Once the orbits have been propagated, the longer propagating ephemeris format, defined in Equations 2 would then be fit to the predicted orbits for a certain fit interval, as required by the application. A flow chart of this is outlined in FIG. 7.2. As mentioned earlier, the dominant frequencies for argument of latitude ($f_\theta^*$) and the RSW residuals ($f_{R,S,w1,2}$) do not need to be updated as often as the $\alpha_j$ and $\beta_i$ parameters. Therefore, the reference station would infrequently perform the FFT analysis on the time series of the argument of latitude and the RSW residuals in order to monitor the change in value for these frequencies. If the change exceeds a threshold, then it would need to be updated. Numerical limits which determine when these frequencies need to be updated have net yet been determined.

From FIG. 7.2, several sets of a longer propagating ephemeris sets could be sent to the receiver. For example, if the receiver communicates with the server at the time marked as 0 on the time line in FIG. 7.2, and the accuracy of the particular application requires the fit interval be 24 hours, then 3 (for example) ephemeris sets could be sent to the receiver. Each set would contain a time of applicability and the receiver will utilize the ephemeris set which would be valid at the desired epoch. The receiver would communicate with the server via a wireless link or possibly through an available Internet connection to download the new data, when required. Then the receiver can operate for, possibly, 3 days without communicating with the distribution server or requiring aiding.

In this section, the information which is sent to the receiver and the algorithm used inside the receiver, to reconstruct the satellite positions, is defined. The broadcast message sent to the receiver would consist of the information provided in Table 10. Most of these parameters need to be updated every time the data message becomes out of date. The exceptions are the dominant frequencies, $f_\theta$, $f_R$, $f_S$, and $f_W$ which can be updated much less frequently. For a desired epoch, the $\alpha_j$ and $\beta_i$ parameters would be fit to that time and the value of $GAST_0$ at that time could be determined using published empirical models [34]. These models are based on the Julian date and fraction of the day at that epoch.

The following outline explains how these parameters would be used to reconstruct the satellite orbits inside the receiver. The resulting positions would be given in the WGS84 reference frame and would have an accuracy described above.

1. Compute the difference in time from the reference epoch to the current

Table 10: Parameters of the Uploaded Broadcast Message

Parameter Description $GAST_0$ Greenwich Apparent Sidereal Time at Reference Time[rad]

$t_{oe}$ Reference Time of the Ephemeris[sec]

$\beta_0$ Parameters of 1st Fit [23 parameters]

$\alpha_0$ Parameters of 2nd Fit [10 parameters]

$f_\theta^*$ Dominant Frequency for True Anomaly [1 parameter]

$f_R$, $f_S$, $f_W$ Dominant Frequency for 2nd Fit[5 parameters] epoch.

$$t_k = t - t_{oe}$$

t is the current time. Both t and $t_{oe}$ would be in seconds of the current GPS week.

$t_k$, however, would be the actual time difference between t and $t_{oe}$ and thus must account for end of the week crossovers [28].

2. Use the $\beta_i$ coefficients and $t_k$ to calculate Keplerian orbital elements.

$$\theta^* = \beta_{19} + \beta_{20}t_k + \beta_{21}\cos(2\pi f_\theta^* t_k) + \beta_{22}\sin(2\pi f_\theta^* t_k)$$

$$\omega = \beta_{23}$$

$$\theta = \omega + \theta^*$$

$$a = \alpha_1\beta_1 + \alpha_2\beta_2 + \alpha_3\beta_3\cos(2\pi f_a\theta) + \alpha_4\beta_4\sin(2\pi f_a\theta)$$

$$e = \beta_5 + \beta_6\theta + \beta_7\cos(\theta) + \beta_8\sin(\theta) + \beta_9\cos(3\theta) + \beta_{10}\sin(3\theta)$$

$$i = \beta_{11} + \beta_{12}\theta + \beta_{13}\cos(2\theta) + \beta_{14}\sin(2\theta)$$

$$\Omega = \beta_{15} + \beta_{16}\theta + \beta_{17}\cos(2\theta) + \beta_{18}\sin(2\theta)$$

3. Calculate the magnitude of the position vector and the corrections to the RSW frame from the $\alpha_j$ parameters.

$$r = a(1-e^2)/(1+e\cos(\theta^*))$$

$$\delta_r = \alpha_1\cos(2\pi t_k f_{R1}) + \alpha_2\sin(2\pi t_k f_{R1}) + \alpha_3\cos(2\pi t_k f_{R2}) + \alpha_4\sin(2\pi t_k f_{R2})$$

$$\delta s = \alpha_5\cos(2\pi t_k f_{S1}) + \alpha_6\sin(2\pi t_k f_{S1}) + \alpha_7\cos(2\pi t_k f_{S2}) + \alpha_8\sin(2\pi t_k f_{S2})$$

$$\delta w = \alpha_9\cos(2\pi t_k f_{w1}) + \alpha 10\sin(2\pi t k f_{w1})$$

4. Compute the transformation from RSW frame to ECI frame. The elements of this transformation matrix are shown below.

$$h_{1,1} = \cos(\Omega)\cos(\theta) - \sin(\Omega)\cos(i)\sin(\theta)$$

$$h_{1,2} = -\cos(\Omega)\sin(\theta) - \sin(\Omega)\cos(i)\cos(\theta)$$

$$h_{1,3} = \sin(\Omega)\sin(i)$$

$$h_{2,1} = \sin(\Omega)\cos(\theta) + \cos(\Omega)\cos(i)\sin(\theta)$$

$$h_{2,2} = -\sin(\Omega)\sin(\theta) + \cos(\Omega)\cos(i)\cos(\theta) \quad (13)$$

$$h_{2,3} = -\cos(\Omega)\sin(i)$$

$$h_{3,1} = \sin(i)\sin(\theta)$$

$$h_{3,2} = \sin(i)\cos(\theta)$$

$$h_{3,3} = \cos(i)$$

$X_{ECI}=(r+\delta r)h_{1,1}+\delta s h_{1,2}+\delta w h_{1,3}$ $Y_{ECI}=(r+\delta r)h_{2,1}+\delta s h_{2,2}+\delta w h_{2,3}$ $Z_{ECI}=(r+\delta r)h_{3,1}+\delta s h_{3,2}+\delta w h_{3,3}$ 5. Transform positions from ECI frame to the ECEF frame using $GAST_0$ and the rotation rate of the Earth to approximate the GAST at the current epoch.

$X_{ECEF}=\cos(GAST_0+\Omega_E t_k)XECI+\sin(GAST_0+R_e t_k)Y_{ECI}$ $Y_{ECEF}=-\sin(GAST_0+\Omega_E t_k)XECI+\cos(GAST_0+R_e t_k)Y_{ECI}$ $Z_{ECEF}=Z_{ECI}$ This research has demonstrated that GNSS satellite positions can be estimated using readily available and accurate tracking data from services such as the IGS. This is attractive to network providers who do not want to operate their own tracking network. An empirical model, fit the IGS orbit data, could be incorporated to estimate satellite positions with a typical accuracy required for E¬911 and most LBS. Such an ephemeris would require that a receiver download new satellite data only every few days, instead of every few hours. As a result, service providers could provide more reliable, uninterrupted service even in locations where the received GPS signals are weak. In addition, this can be achieved without requiring the receiver to store excessively large sets of data, provide a capability for high speed numerical computations on-board, or require near real time two-way wireless communication link.

Some recommendations for further research in this area include a method to account for planned and unplanned satellite maneuvers. Specifically, there is a need to identify and correct maneuvers that may have occurred since the last ephemeris update and when the navigation solution is computed. A comprehensive error analysis could be conducted to determine the sensitivity of the ephemeris error to the time between updates of the dominant frequencies in the argument of latitude and the RSW residuals. Finally, the quantization of the ephemeris could be optimized by varying the number of bits assigned to each parameter, based upon the expected range of values and the sensitivity of position errors to uncertainty in each parameter, rather than using a fixed word length for all of them.

APPENDIX A OF THE DETAILED DESCRIPTION

The WGS-84 coordinate system is one realization of an Earth Centered Earth Fixed (ECEF) coordinate frame. WGS-84 was developed by the Defence Mapping Agency (DMA), now the National Imagery and Mapping Agency (NIMA), of the U.S. Department of Defence (DoD). WGS-84 is the official geodetic system for all mapping, charting, navigation, and geodetic products used throughout the DoD. The ephemerides of the GPS satellites are expressed in WGS-84 coordinates and therefore, user positions are obtained as WGS-84 coordinates.

The WGS-84 frame is a cartesian coordinate frame with its origin at the center of the Earth. The Z-axis is in the direction of the Conventional Terrestrial Pole (CTP) as defined by International Earth Rotation Service (IERS), formerly known as the Bureau International de l'Heure (BIH). The CTP is defined as the average position of the Earth's pole of rotation between the years 1900 and 1905. The X-axis is the intersection of the WGS-84 Reference Meridian Plane and the plane of the CTP's Equator. The Reference Meridian is the Zero Meridian defined by the BIH. The Y-axis completes a right-handed orthogonal coordinate system and is in the plane of the CTP Equator, 90° East of the X-axis. This is illustrated in Figure A.1. A more in depth description of WGS-84 can be found in [27].

The coordinate reference system for GLONASS, since 1993, is the PZ-90 system, which is an acronym of Russian *Parametry Zemli* 1990. Similar to the WGS-84 reference system for GPS, PZ-90 is an ECEF terrestrial frame. The PZ-90 system adopts a different set of parameters and realizations of the system than WGS-84. An offset in origin and a difference in scale and orientation exist between PZ-90 and WGS-84. Due to the increased desire to combine measurements of the two systems, a transformation between the two systems is widely used in practice. FIG. A.2 shows the differences between the two systems. A 2.5 meter translation along the $Y_{WGS84}$ axis and a 0.4 arcsecond rotation about the $Z_{WGS84}$ are statistically the most significant variation among these systems. The transformation is shown below for positions in meters [22].

$$\begin{bmatrix} X_{WGS84} \\ Y_{WGS84} \\ Z_{WGS84} \end{bmatrix} = \begin{bmatrix} 0 \\ 2.5 \\ 0 \end{bmatrix} + \begin{bmatrix} 1 & 1.9e-6 & 0 \\ 1.9e-6 & 1 & 0 \\ 0 & 0 & 1 \end{bmatrix} \begin{bmatrix} X_{PZ90} \\ Y_{PZ90} \\ Z_{PZ90} \end{bmatrix} \quad (A.1)$$

In order to determine the motion of a satellite around the Earth in accordance with Newton's laws, an inertial coordinate system to express the position, velocity, acceleration, and force vectors in is needed. This commonly used reference system is often referred to as Earth Centered Inertial (ECI) or Conventional Inertial System (CIS). It is defined as having an origin at the center of mass of the Earth. The Z-axis is along the instantaneous pole of rotation also known as the Celestial Ephemeris Pole (CEP). The X-axis is in the equatorial plane, corresponding to the CEP, pointing towards the vernal equinox. The vernal equinox is the direction of intersection of the equatorial plane of the Earth and the plane of the Earth's orbit around the Sun. The Y-axis completes a right-handed orthogonal coordinate system and is in the plane of the CEP Equator. This, is illustrated in Figure A.3.

The coordinate system shown above isn't technically an inertial reference frame. The equinox and the plane of the equator move very slowly over time. A "pseudo" Newtonian inertial system can be achieved if the equinox and the equator are referred to at a particular epoch. The current standard quasi-inertial frame is the J2000 frame and is referenced to Jan. 1, 2000 at hour 12 universal time (UT). The following section described the transformation between the WGS-84 system and the J2000 frame [37].

Orbit determination often requires both the ECI frame in which Newtonian mechanics are valid, and the ECEF frame, which most satellite observations are taken in. The inertial frame is related to the Earth fixed frame through a series of translations and rotations often called the FK5 reduction formula [37]. This reduction accounts for precession, nutation, sidereal time, and polar motion which are described separately below.

Polar motion describes the relationship between the CEP and CTP and is described by two angles. One accounts for the Chandlerian free procession and the other is an annual motion that is due to the seasonal changes in the Earth's mass distribution. The CEP moves in a circular motion about the CTP and has a maximum variation of 9 meters in any direction. The motion is not easily modeled and is based on observations.

Current values of the coordinates of the CEP are published by the Central Bureau of IERS [14]. The coordinates of the CEP are given in arc seconds and are published as $X_p$ measured along the Greenwich meridian and $Y_p$ measured along the meridian of 90° west as shown in Figure A.3. The WGS-84 system and an Earth fixed coordinate system inline with the CEP are related by $$\begin{bmatrix} X_{WGS84} \\ Y_{WGS84} \\ Z_{WGS84} \end{bmatrix} = \begin{bmatrix} \cos(X_P) & 0 & \sin(X_P) \\ 0 & 1 & 0 \\ -\sin(X_P) & 0 & \cos(X_P) \end{bmatrix} \begin{bmatrix} 1 & 0 & 0 \\ 0 & \cos(Y_P) & -\sin(Y_P) \\ 0 & \sin(Y_P) & \cos(Y_P) \end{bmatrix} \begin{bmatrix} X_{CEP} \\ Y_{CEP} \\ Z_{CEP} \end{bmatrix} \quad (A.2)$$

Since $X_p$ and $Y_p$ are small, the small angle approximation can be used where all cosine terms are set to unity, all sine terms are equated to their angle, and all products are neglected. This reduces to $$\vec{R}_{WGS84} = [P_M]\vec{R}_{CEP} \quad (A.3)$$

where $$P_M = \begin{bmatrix} 1 & 0 & X'_P \\ 0 & 1 & -Y_P \\ -X_P & Y_P & 1 \end{bmatrix}. \quad (A.4)$$

The sidereal time relates the pseudo-earth fixed frame, as determined by CEP, to either the mean equinox or the true equinox. Greenwich Apparent Sidereal Time (GAST), $\alpha_G$, as seen in Figure A.3, is a measure of the true equator relative to the true equinox and Greenwich Mean Sidereal Time (GMST) is a measure of the true equator to the mean equinox. The difference between the mean equinox and the true equinox is called the Equation of the Equinoxes (EOE) where $\Delta\Psi$ is the nutation in longitude and $\bar{\epsilon}$ is the mean obliquity of the ecliptic.

$$EOE = \Delta\Psi \cos(\bar{\epsilon}) \quad (A.5)$$

This quantity measures the change in right ascension due to precession and nutation and is calculated by projecting the difference between the mean and true equinoxes onto the true equator as illustrated in Figure A.4.

The *Astronomical Almanac* [3] publishes models for calculating GMST, $\Delta\Psi$, and $\bar{\epsilon}$ by year. For 2003, $$GMST = 6^h 6167774 + 0^h 0657098245 d + 1^h 00273791 t \quad (A.6)$$

where d is the day of the year and t is the time in Universal Time (UT)

$$\Delta\Psi = -0°0048 \sin(67°1 - 0.053d) - 0°0004 \sin(198°5 + 1.971d) \quad (A.7)$$

$$\bar{\epsilon} = 23°439291 - 0°0130042T - 0°00000016T^2 + 0°0000005504T^3 \quad (A.8)$$

Using the preceding equations GAST can be calculated by $$\alpha_G = GMST + EOE \quad (A.9)$$

Once GAST is determined the true of date (TOD) coordinates can be related to the pseudo-earth fixed coordinates with the following transformation $$\vec{R}_{CEP} = [G]\vec{R}_{TOD} \quad (A.10)$$

where $$G = \begin{bmatrix} \cos(\alpha_G) & \sin(\alpha_G) & 0 \\ -\sin(\alpha_G) & \cos(\alpha_G) & 0 \\ 0 & 0 & 1 \end{bmatrix}. \quad (A.11)$$

The nutation transformation accounts for the small periodic effects contributed primarily by the Moon's varying orientation with respect to the Earth's equator. Adding these effects allows for the transformation from the mean equator of date to the true equator of date. The quantities $\Delta\Psi$ and $\bar{\epsilon}$, as described in the previous section, and the true obliquity of the ecliptic, $\epsilon$ as calculated below.

$$\epsilon = \bar{\epsilon} + \Delta\epsilon \quad (A.12)$$

where $$\Delta\epsilon = -0°0026 \sin(67°1 - 0.053d) - 0°0002 \sin(198°5 + 1.971d). \quad (A.13)$$

The rotation from mean equator and equinox to the true equator and equinox is given by $$\vec{R}_{TOD} = [N]\vec{R}_{MOD} \quad (A.14)$$

where the elements of N are $\eta_{11} = \cos(\Delta\Psi)$ $\eta_{12} = -\sin(\Delta\Psi)\cos(\bar{\epsilon})$ $\eta_{13} = -\sin(\Delta\Psi)\sin(\bar{\epsilon})$ $\eta_{21} = \sin(\Delta\Psi)\cos(\epsilon)$ $\eta_{22} = \cos(\Delta\Psi)\cos(\epsilon)\cos(\bar{\epsilon}) + \sin(\epsilon)\sin(\bar{\epsilon})$ $\eta_{23} = \cos(\Delta\Psi)\cos(\epsilon)\sin(\bar{\epsilon}) - \sin(\epsilon)\cos(\bar{\epsilon})$ $\eta_{31} = \sin(\Delta\Psi)\sin(\epsilon)$ $\eta_{32} = \cos(\Delta\Psi)\sin(\epsilon)\cos(\bar{\epsilon}) - \cos(\epsilon)\sin(\bar{\epsilon})$ $\eta_{33} = \cos(\Delta\Psi)\sin(\epsilon)\sin(\bar{\epsilon}) + \cos(\epsilon)\cos(\bar{\epsilon}) \quad (A.15)$ The precession transformation represents the transformation from the mean equinox at J2000 to a mean equinox of date (MOD). This transformation is represented by three angles θ, z, and ζ which are approximated by the following relations $$\zeta = 2306"2181T + 0"30188T^2 + 0"017998T^3 \quad (A.16).$$

$$\theta = 2004"3109T - 0"42665T^2 - 0"041833T^3 \quad (A.17)$$

$$z = 2306"21817T + 1"09468T^2 + 0"018203T^3 \quad (A.18)$$

where T is the number of Julian Centuries since J2000 determined by $$T = \frac{JD - J2000}{36525}. \quad (A.19)$$

The rotation from J2000 to MOD is given by $$\vec{R}_{MOD} = [P]\vec{R}_{J2000} \quad (A.20)$$

where the elements of P are $p_{11} = -\sin(\zeta)\sin(z) + \cos(\zeta)\cos(z)\cos(\theta)$ $p_{12} = -\cos(\zeta)\sin(z) - \sin(\zeta)\cos(z)\cos(\theta)$ $p_{13} = -\cos(z)\sin(\theta)$ $p_{21} = \sin(\zeta)\cos(z) + \cos(\zeta)\sin(z)\cos(\theta)$ $p_{22} = \cos(\zeta)\cos(z) - \sin(\zeta)\sin(z)\cos(\theta)$ $p_{23} = -\sin(z)\sin(\theta)$ $p_{31} = \cos(\zeta)\sin(\theta)$ $p_{32} = -\sin(\zeta)\sin(\theta)$ $p_{33} = \cos(\theta) \quad (A.21)$ The resulting transformation from J2000 to WGS-84 is accomplished by multiplying each of these separate transformations together in the following manner.

$$\vec{R}_{WGS84} = [P_G][G][N][P]\vec{R}_{J2000} \quad (A.22)$$

The satellite coordinate system (RSW in this application) moves with the satellite and is sometimes referred to as the Gaussian coordinate system. The origin is at the center of mass of the satellite. The R-axis is always pointing from the Earth's center along the radius vector toward the satellite as it moves through the orbit. The W-axis is fixed in the direction of angular momentum normal to the orbit plane. The S-axis completes a right-handed orthogonal coordinate system. The S-axis is the direction of the velocity vector, but is only aligned with the velocity vector for circular orbits or elliptical orbits at apogee and perigee.

Relative positions and displacements from the satellite orbit are often expressed in the RSW frame. Radial displacements are parallel to the position vector along the R-axis. Along-track displacements are normal to the position vector along the S-axis. Cross-track displacements are normal to the current plane described by the position and velocity vectors along the W-axis. Figure A.5 illustrates this coordinate frame in comparison to the ECI frame.

Using position and velocity vectors in ECI coordinates, the transformation between the ECI frame and the RSW frame can be determined directly since $\hat{R}$ always points in present satellite position and $\hat{W}$ is parallel to the angular momentum vector. The following equations demonstrate these relations.

$$\hat{R} = \frac{\vec{r}}{|\vec{r}|} \quad (A.23)$$

$$\hat{W} = \frac{\vec{r} \times \vec{v}}{|\vec{r} \times \vec{v}|} \quad (A.24)$$

$$\hat{S} = \hat{W} \times \hat{R} \quad (A.25)$$

$$\vec{r}_{ECI} = [\hat{R}|\hat{S}|\hat{W}]\vec{r}_{RSW} \quad (A.26)$$

This transformation can also be computed using a 3-1-3 Euler angle rotation and the orbit elements right ascension of the ascending node ($\Omega$), inclination ($i$), and argument of latitude ($\theta$) as seen in Figure A.5. This transformation is summarized below and is utilized in Chapter 2 for computing osculating elements.

$h_{1,1} = \cos(\Omega)\cos(\theta) - \sin(\Omega)\cos(i)\sin(\theta)$ $h_{1,2} = -\cos(\Omega)\sin(\theta) - \sin(\Omega)\cos(i)\cos(\theta)$ $h_{1,3} = \sin(\Omega)\sin(i)$ $h_{2,1} = \sin(\Omega)\cos(\theta) + \cos(\Omega)\cos(i)\sin(\theta)$ $h_{2,2} = -\sin(\Omega)\sin(\theta) + \cos(\Omega)\cos(i)\cos(\theta)$ $h_{2,3} = -\cos(\Omega)\sin(i)$ $h_{3,1} = \sin(i)\sin(\theta)$ $h_{3,2} = \sin(i)\cos(\theta)$ $h_{3,3} = \cos(i) \quad (A.27)$ $$\vec{r}_{ECI} = H\vec{r}_{RSW} \quad (A.28)$$

Although the present invention and its advantages have been described in detail, it should be understood that various changes, substitutions, and alterations can be made therein without departing from the spirit and scope of the present invention, as defined by the appended claims.

What is claimed is:

1. A method for propagating ephemeris data for a satellite in Earth orbit comprising:
    receiving orbital positional data for a first time period of a satellite's Earth orbit;
    propagating the received orbital positional data to generate propagated orbital positional data for the satellite's Earth orbit during a second time period extending beyond the first time period;
    fitting a Keplerian ephemeris model to the propagated orbital positional data to estimate model coefficients; and
    sending the estimated model coefficients to receivers for determination of receiver position at a time during the second time period.

2. The method of claim 1, wherein the model fitting step comprises the steps of:
    generating velocity vectors for satellite positions in the first and the second time period; and
    generating arguments of latitude for the satellite positions from the orbital positional data for the satellite positions and the generated velocity vectors for the satellite positions.

3. The method of claim 1, wherein the reception of orbital positional data step comprises receiving orbital positional data for a satellite from International Global Positioning System Service.

4. The method of claim 2 further comprising the step of determining a dominant frequency for a long time series of the generated arguments of latitude.

5. The method of claim 4, wherein the dominant frequency determination comprises applying sinusoidal estimation to the long time series of generated arguments of latitude to identify the dominant frequency.

6. The method of claim 4, wherein the step of applying sinusoidal estimation comprises applying a Fourier transform to the long time series of generated arguments of latitude to identify the dominant frequency.

7. The method of claim 4 further comprising the step of fitting a Keplerian model to the propagated orbital positional data to determine estimates for the model coefficients.

8. The method of claim 6, wherein the model coefficient estimation step comprises iteratively adjusting a state vector for the set of Keplerian elements comprised of argument of latitude, true anomaly, argument of perigee, semi-major axis, eccentricity, inclination, and right ascension of the ascending node until an error term is less than a threshold.

9. The method of claim 8, wherein the sending of the model coefficients step comprises the steps of:
sending a mean value, secular rate, and periodic terms of harmonic frequencies for each of the argument of latitude, true anomaly, argument of perigee, semi-major axis, eccentricity, inclination, and right ascension of the ascending node;
sending a constant mean value for the argument of perigee; and
sending the secular rate and the periodic terms for the argument of latitude for an expansion of true anomaly.

10. The method of claim 7 further comprising the steps of:
computing fit residuals between the Keplerian model and the propagated orbital positional data in an Earth centered reference frame; and
transforming the fit residuals to a satellite centered reference frame.

11. The method of claim 10 further comprising the steps of:
applying a sinusoidal estimation to a set of computed fit residuals to determine dominant frequencies for the set of computed fit residuals; and
sending the dominant frequencies for the computed fit residuals with the estimated coefficients for the periodic positional model and the model coefficients for the Keplerian model.

12. The method of claim 11, wherein the step of applying sinusoidal estimation comprises applying a Fourier transform.

13. The method of claim 12 further comprising:
fitting a periodic positional model to the computed fit residuals to determine estimates for coefficients of the periodic positional model; and
sending the estimated coefficients for the periodic positional model with the model coefficients for the Keplerian model.

14. The method of claim 12 further comprising:
sending an ephemeris reference time and a sidereal time at the reference time with the dominant frequencies for the computed residuals, the estimated coefficients for the periodic positional model, and the Keplerian model coefficients.

15. A reference station for providing compressed data to represent a propagated ephemeris comprising:
a receiver for receiving orbital positional data for a first epoch of a satellite ephemeris;
an orbit propagator for propagating orbital positional data for a second epoch of an ephemeris for the satellite corresponding to the received orbital positional data;
an ephemeris compressor for fitting an ephemeris format to the propagated orbital positional data of the second epoch to generate compressed data for representing the second epoch of the satellite ephemeris; and
a transmitter for sending the compressed data to satellite receivers for computing a receiver location from a satellite position represented by the compressed data.

16. The reference station of claim 15, wherein the ephemeris compressor comprises:
a Keplerian compressor for fitting a Keplerian ephemeris model to the propagated orbital positional data to generate estimated Keplerian model coefficients.

17. The reference station of claim 16, wherein the ephemeris compressor comprises:
a positional residual generator for computing fit residuals between the Keplerian ephemeris model and the propagated orbital positional data in an Earth centered reference frame;
a frame of reference transformer for transforming the computed fit residuals to a satellite reference frame; and
a positional residual compressor for fitting a periodic positional model to the computed fit residuals to generate estimates for coefficients of the periodic positional model.

18. The reference station of claim 15, wherein the receiver comprises access to a source providing orbital positional data received from the satellites.

19. The reference station of claim 18, wherein the source is International GNSS Service.

20. A method for receiving ephemeris data for a satellite in Earth orbit at a navigation receiver, comprising the steps of:
receiving estimated model coefficients of orbital positional data for a second time period of a satellite's Earth orbit, the second time period extending beyond a first time period, the estimated model coefficients based on propagating orbital positional data for the first time period of a satellite's Earth orbital positional data, the model coefficients obtained from fitting a Keplerian ephemeris model to the propagated orbital positional data to estimate the model coefficients; and
determining the receiver position at a time during the second time period, based at least partially on the estimated model coefficients.

21. The method of claim 20, wherein the estimated model coefficients are defined by the dominant frequencies in argument of latitude and time to compute the position of a GPS satellite at a requested time, t, in at least one of the ECI and the ECEF reference frame.

22. The method of claim 21, wherein computing of the position of the GPS satellite is based on using equations:

$$t_k = t - t_{oe} \tag{6.1}$$

$$\theta^* = \beta_{19} + \beta_{20} t_k + \beta_{21} \cos(2\pi f_\theta {}^* t_k) + \beta_{22} \sin(2\pi f_\theta {}^* t_k)$$

$$\omega = \beta_{23}$$

$$\theta = \omega + \theta^*$$

$$a = \beta_1 + \beta_2 \theta + \beta_3 \cos(2\theta) + \beta_4 \sin(2\theta)$$

$$e = \beta_5 + \beta_6 \theta + \beta_7 \cos(\theta) + \beta_8 \sin(\theta) + \beta_9 \cos(3\theta) + \beta_{10} \sin(3\theta)$$

$$i = \beta_{11} + \beta_{12} \theta + \beta_{13} \cos(2\theta) + \beta_{14} \sin(2\theta)$$

$$\Omega = \beta_{15} + \beta_{16} \theta + \beta_{17} \cos(2\theta) + \beta_{18} \sin(2\theta) \tag{6.2}$$

$$r = \frac{a(1-e^2)}{1 + e\cos(\theta^*)} \tag{6.3}$$

$$\delta r = \alpha_1 \cos(2\pi t_k f_{R1}) + \alpha_2 \sin(2\pi t_k f_{R1}) + \alpha_3 \cos(2\pi t_k f_{R2}) + \alpha_4 \sin(2 t_k f_{R2})$$

$\delta_s = \beta_5 \cos(2\pi t_k f_{S1}) + \alpha_6 \sin(2\pi t_k f_{S1}) + \alpha_7 \cos(2\pi t_k f_{S2}) + \alpha_8 \sin(2\pi t_k f_{S2})$ $\delta\omega = \alpha_9 \cos(2\pi t_k f_{W1}) + \alpha_{10} \sin(2\pi t_k f_{W1})$ (6.4)

$h_{1,1} = \cos(\Omega)\cos(\theta) - \sin(\Omega)\cos(i)\sin(\theta)$ $h_{1,2} = -\cos(\Omega)\sin(\theta) - \sin(\Omega)\cos(i)\cos(\theta)$ $h_{1,3} = \sin(\Omega)\sin(i)$ $h_{2,1} = \sin(\Omega)\cos(\theta) + \cos(\Omega)\cos(i)\sin(\theta)$ $h_{2,2} = -\sin(\Omega)\sin(\theta) + \cos(\Omega)\cos(i)\cos(\theta)$ $h_{2,3} = -\cos(\Omega)\sin(i)$ $h_{3,1} = \sin(i)\sin(\theta)$ $h_{3,2} = \sin(i)\cos(\theta)$ $h_{3,3} = \cos(i)$ (6.5)

$X_{ECI} = (r+\delta r)h_{1,1} + \delta s h_{1,2} + \delta\omega h_{1,3}$ $Y_{ECI} = (r+\delta r)h_{2,1} + \delta s h_{2,2} + \delta\omega h_{2,3}$ $Z_{ECI} = (r+\delta r)h_{3,1} + \delta s h_{3,2} + \delta\omega h_{3,3}$ (6.6).

\* \* \* \* \*